United States Patent
Ang et al.

(10) Patent No.: US 11,601,961 B2
(45) Date of Patent: *Mar. 7, 2023

(54) CROSS-CARRIER SCHEDULING ENHANCEMENTS IN NEW RADIO (NR)

(71) Applicant: QUALCOMM Incorporated, San Diego, CA (US)

(72) Inventors: Peter Pui Lok Ang, San Diego, CA (US); Peter Gaal, San Diego, CA (US); Alexei Yurievitch Gorokhov, San Diego, CA (US); Tingfang Ji, San Diego, CA (US); Brian Clarke Banister, San Diego, CA (US); Wanshi Chen, San Diego, CA (US); Joseph Binamira Soriaga, San Diego, CA (US); Huilin Xu, San Diego, CA (US); John Edward Smee, San Diego, CA (US); Heechoon Lee, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/138,720

(22) Filed: Dec. 30, 2020

(65) Prior Publication Data

US 2021/0136798 A1 May 6, 2021

Related U.S. Application Data

(63) Continuation of application No. 16/536,081, filed on Aug. 8, 2019, now Pat. No. 10,887,904.

(Continued)

(51) Int. Cl.
*H04W 4/00* (2018.01)
*H04W 72/1273* (2023.01)
(Continued)

(52) U.S. Cl.
CPC ....... *H04W 72/1273* (2013.01); *H04L 5/0094* (2013.01); *H04W 72/0446* (2013.01); *H04W 72/0453* (2013.01); *H04W 72/14* (2013.01)

(58) Field of Classification Search
CPC ......... H04W 72/1273; H04W 72/0446; H04W 72/0453; H04W 72/14; H04W 72/1294; H04L 5/0094; H04L 5/001; H04L 5/0044
(Continued)

(56) References Cited

U.S. PATENT DOCUMENTS 7,263,108 B2   8/2007   Kizhepat
7,990,840 B2 * 8/2011   Laroia .................... H04H 20/72
                                                       370/328

(Continued)

FOREIGN PATENT DOCUMENTS

CN   106714322 A   5/2017
CN   107634821 A   1/2018
(Continued)

OTHER PUBLICATIONS

Taiwan Search Report—TW108128540—TIPO—dated Apr. 26, 2021.

(Continued)

*Primary Examiner* — Thai D Hoang
(74) *Attorney, Agent, or Firm* — Holland & Hart LLP/Qualcomm

(57) ABSTRACT

Methods, systems, and devices for wireless communications are described. A base station may implement cross-carrier scheduling. A user equipment (UE) may identify a minimum scheduling delay and may receive a downlink grant on a first CC. The UE may further identify the slot in which a downlink data transmission corresponding to the downlink grant will be received, and may identify the slot such that the minimum scheduling delay is satisfied. The UE may the (Continued)

receive the downlink data transmission, as indicated in the downlink grant, in the identified slot. In some examples, the UE and the base station may alternate between a long minimum scheduling delay and a short minimum scheduling delay. In some examples, the UE and the base station may alternate between a cross-carrier mode, and a self-scheduling mode.

30 Claims, 25 Drawing Sheets

Related U.S. Application Data

(60) Provisional application No. 62/717,596, filed on Aug. 10, 2018.

(51) Int. Cl.
*H04W 72/14* (2009.01)
*H04L 5/00* (2006.01)
*H04W 72/0453* (2023.01)
*H04W 72/0446* (2023.01)

(58) Field of Classification Search
USPC ............... 370/329–330, 335–345, 347–348, 370/436–439, 441–444
See application file for complete search history.

(56) References Cited

U.S. PATENT DOCUMENTS

| | | | | |
|---|---|---|---|---|
| 8,934,405 | B2* | 1/2015 | Rosenqvist | H04L 5/0064 370/336 |
| 9,949,161 | B2 | 4/2018 | Mandil et al. | |
| 10,693,610 | B2* | 6/2020 | Liu | H04L 5/0078 |
| 10,952,242 | B2* | 3/2021 | Tsai | H04L 5/0094 |
| 11,140,675 | B2* | 10/2021 | Liao | H04W 72/044 |
| 2011/0111785 | A1* | 5/2011 | Lindoff | H04W 40/16 455/509 |
| 2012/0083278 | A1* | 4/2012 | Kazmi | H04W 64/00 455/450 |
| 2014/0146703 | A1* | 5/2014 | Lindoff | H04L 5/0053 370/329 |
| 2015/0333898 | A1 | 11/2015 | Ji et al. | |
| 2015/0334686 | A1* | 11/2015 | Ji | H04L 5/14 370/280 |
| 2016/0301509 | A1* | 10/2016 | Narasimha | H04L 5/0062 |
| 2018/0007494 | A1* | 1/2018 | Yi | H04W 52/383 |
| 2018/0131482 | A1 | 5/2018 | Zhou et al. | |
| 2018/0310340 | A1* | 10/2018 | Noh | H04L 5/001 |
| 2019/0150131 | A1* | 5/2019 | Chen | H04W 72/1289 370/280 |
| 2019/0313438 | A1* | 10/2019 | Zhang | H04L 5/0044 |
| 2020/0053755 | A1* | 2/2020 | Ang | H04W 72/0453 |
| 2020/0351738 | A1* | 11/2020 | Huang | H04B 17/364 |
| 2021/0092737 | A1* | 3/2021 | Tang | H04W 4/40 |

FOREIGN PATENT DOCUMENTS

| | | |
|---|---|---|
| CN | 107889221 A | 4/2018 |
| CN | 107889221 A | 4/2018 |
| CN | 108024379 A | 5/2018 |
| CN | 108024379 A | 5/2018 |
| CN | 109150436 A | 1/2019 |
| CN | 109150436 A | 1/2019 |
| CN | 107637119 B | 4/2021 |
| WO | WO-2016122192 A1 | 8/2016 |

OTHER PUBLICATIONS

Qualcomm Incorporated: "Remaining Issues on DL/UL Resource Allocation," 3GPP Draft; R1-1807652_Remaining Issues On DL_UL Resource Allocation—REV1, 3rd Generation Partnership Project (3GPP), Mobile Competence Centre; 650, Route Des Lucioles; F-06921 Sophia-Antipolis Cedex, vol. RAN WG1, No. Busan, Korea; May 21, 2018-May 24, 2018, May 24, 2018, XP051463283, 16 pages, Retrieved from the Internet: URL: http://www.3gpp.org/ftp/tsg%5Fran/WG1%5FRL1/TSGR1%5F93/Docs [retrieved on May 24, 2018] the whole document.
International Search Report and Written Opinion—PCT/US2019/046005—ISA/EPO—dated Oct. 17, 2019.
Mediatek Inc: "Remaining Issues in Carrier Aggregation", 3GPP Draft; R1-1806776 Remaining Issues in Carrier Aggregation, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018, XP051441978, Retrieved from the Internet: URL:http://www.3gpp.org/ftp/Meetings%5F3GPP%5FSYNC/RAN1/Docs/ [retrieved onMay 20, 2018], 12 pages.
Qualcomm Incorporated: "CA with Mixed Numerology", 3GPP Draft; R1-1713456_CA Mixed Numerology, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017 (Aug. 20, 2017), XP051316258, Retrieved from the Internet: URL:http://www.3gpp.org/ftp/Meetings_3GPP_SYNC/RAN1/Docs/ [retrieved on Aug. 20, 2017], 6 pages.
Qualcomm Incorporated: "Remaining Issues on CA", 3GPP Draft; R1-1807399 Remaining Issues on CA, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018, XP051442591, Retrieved from the Internet: URL:http://www.3gpp.org/ftp/Meetings%5F3GPP%5FSYNC/RAN1/Docs/ [retrieved on May 20, 2018], 6 pages.
Qualcomm Incorporated: "Remaining Issues on DL/UL ResourceAllocation," 3GPP Draft; R1-1807652_Remaining Issues On DL_UL Resourceallocation—REV1,3rd Generation Partnership Project (3GPP), MobileCompetence Centre; 650, Route Des Lucioles; F-06921 Sophia-Antipolis Cedex,vol. RAN WG1, No. Busan, Korea; May 21, 2018-May 25, 2018, May 24, 2018,XP051463283, 16 pages, Retrieved from the Internet: URL: http://www.3gpp.org/ftp/tsg%5Fran/WG1%5FRL1/TSGR1%5F93/Docs [retrieved onMay 24, 2018] the whole document.

* cited by examiner

CROSS-CARRIER SCHEDULING ENHANCEMENTS IN NEW RADIO (NR)

CROSS REFERENCE

The present Application for patent is a Continuation of U.S. patent application Ser. No. 16/536,081 by ANG et al., entitled "CROSS-CARRIER SCHEDULING ENHANCEMENTS IN NEW RADIO (NR)" filed Aug. 8, 2019, which claims the benefit of U.S. Provisional Patent Application No. 62/717,596 by ANG, et al., entitled "CROSS-CARRIER SCHEDULING ENHANCEMENTS IN NEW RADIO (NR)," filed Aug. 10, 2018, assigned to the assignee hereof, and expressly incorporated herein.

BACKGROUND

The following relates generally to wireless communications, and more specifically cross-carrier scheduling enhancements in new radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples, wireless communications systems may utilize carrier aggregation techniques to transmit or receive information over multiple component carriers (CCs) within a system bandwidth or a wideband CC to increase throughput. In such examples, the wireless communications system may enable cross-carrier scheduling (e.g., downlink scheduling assignments may be valid for CCs other than CCs on which they are transmitted). Cross carrier scheduling may be done individually via radio resource control (RRC) signaling on a per-terminal and per-CC basis. For example, a base station may transmit a downlink grant on a first CC, and the downlink grant may indicate available physical downlink shared channel (PDSCH) resource on a second CC. In some wireless communications systems (e.g., a new radio (NR) system), a scheduling CC and a scheduled CC may have different subcarrier spacing or different transmission time intervals (TTIs). Current cross-carrier scheduling may be insufficient, and may result in reduced throughput, or increased buffering requirements.

SUMMARY

A method of wireless communications is described. The method may include identifying a minimum scheduling delay (e.g., a slot delay threshold), receiving, on a first component carrier, a first downlink grant indicating a first downlink data transmission on a second component carrier, identifying a slot of the first downlink data transmission based on the first downlink grant and the minimum scheduling delay, and receiving the first downlink data transmission on the second component carrier during the identified slot of the first downlink data transmission in accordance with the first downlink grant.

A method of wireless communications by a UE is described. The method may include identifying a minimum scheduling delay when a numerology of a first component carrier is different than a numerology of a second component carrier, where the first component carrier and the second component carrier are included in a carrier aggregation configuration of the UE, receiving, on the first component carrier, a first downlink grant indicating a first downlink data transmission on the second component carrier, identifying a timing of the first downlink data transmission on the second component carrier based on the first downlink grant, where the identified timing is at least the minimum scheduling delay after a timing of the downlink grant received on the first component carrier, and receiving the first downlink data transmission on the second component carrier during the identified timing of the first downlink data transmission in accordance with the first downlink grant. Advantages of the described method may include increased or more efficient throughput, decreased power expenditure, decreased overhead, and improved user experience.

An apparatus for a method of wireless communications by a UE is described. The apparatus may include a processor, memory coupled with the processor, and instructions stored in the memory. The instructions may be executable by the processor to cause the apparatus to identify a minimum scheduling delay when a numerology of a first component carrier is different than a numerology of a second component carrier, where the first component carrier and the second component carrier are included in a carrier aggregation configuration of the UE, receive, on the first component carrier, a first downlink grant indicating a first downlink data transmission on the second component carrier, identify a timing of the first downlink data transmission on the second component carrier based on the first downlink grant, where the identified timing is at least the minimum scheduling delay after a timing of the downlink grant received on the first component carrier, and receive the first downlink data transmission on the second component carrier during the identified timing of the first downlink data transmission in accordance with the first downlink grant. Advantages of the described apparatus may include increased or more efficient throughput, decreased power expenditure, decreased overhead, and improved user experience.

Another apparatus for wireless communications by a UE is described. The apparatus may include means for identifying a minimum scheduling delay when a numerology of a first component carrier is different than a numerology of a second component carrier, where the first component carrier and the second component carrier are included in a carrier aggregation configuration of the UE, receiving, on the first component carrier, a first downlink grant indicating a first downlink data transmission on the second component carrier, identifying a timing of the first downlink data transmission on the second component carrier based on the first downlink grant, where the identified timing is at least the minimum scheduling delay after a timing of the downlink grant received on the first component carrier, and receiving the first downlink data transmission on the second component carrier during the identified timing of the first downlink data transmission in accordance with the first downlink grant. Advantages of the described apparatus may include increased or more efficient throughput, decreased power expenditure, decreased overhead, and improved user experience.

A non-transitory computer-readable medium storing code for wireless communications by a UE is described. The code may include instructions executable by a processor to identify a minimum scheduling delay when a numerology of a first component carrier is different than a numerology of a second component carrier, where the first component carrier and the second component carrier are included in a carrier aggregation configuration of the UE, receive, on the first component carrier, a first downlink grant indicating a first downlink data transmission on the second component carrier, identify a timing of the first downlink data transmission on the second component carrier based on the first downlink grant, where the identified timing is at least the minimum scheduling delay after a timing of the downlink grant received on the first component carrier, and receive the first downlink data transmission on the second component carrier during the identified timing of the first downlink data transmission in accordance with the first downlink grant. Advantages of the described non-transitory computer-readable medium may include increased or more efficient throughput, decreased power expenditure, decreased overhead, and improved user experience.

In some examples of the method, apparatuses, and non-transitory computer-readable medium described herein, identifying the minimum scheduling delay may include operations, features, means, or instructions for receiving a configuration message from the base station indicating the minimum scheduling delay. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the minimum scheduling delay may include operations, features, means, or instructions for identifying a preconfigured value indicating the minimum scheduling delay based, at least in part, on subcarrier spacing (SCS) of the first component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for transmitting the first downlink grant wherein the first downlink grant includes a first timing delay parameter associated with the first downlink data transmission. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the timing of the first downlink data transmission may include operations, features, means, or instructions for determining that the first timing delay parameter satisfies the minimum scheduling delay. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for receiving, on the first component carrier, a second downlink grant indicating a second downlink data transmission on the second component carrier and a second timing delay parameter associated with the second downlink data transmission, determining that the second timing delay parameter does not satisfy the minimum scheduling delay, identifying a timing of the second downlink data transmission as an earliest slot that satisfies the minimum scheduling delay following the second downlink grant, and receiving the second downlink data transmission during the identified timing of the second downlink data transmission in accordance with the second downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the timing of the first downlink data transmission may be based on the minimum scheduling delay or the first timing delay parameter or a combination thereof. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the first timing delay parameter may be with reference to a last symbol of a physical downlink control channel carrying the first downlink grant on the first component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for receiving, on the first component carrier, a second downlink grant indicating a second downlink data transmission on the second component carrier and a second timing delay parameter associated with the second downlink data transmission, determining that the second timing delay parameter does not satisfy the minimum scheduling delay, and ignoring at least a portion of the second downlink grant based on the determining. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay includes a minimum value resulting in the timing of the first downlink data transmission being different from a timing of the first downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, a number of downlink control symbols of the first component carrier or a subcarrier spacing of the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay may be based on a modem reconfiguration latency associated with transitioning a wireless modem from a low power state to a higher power state capable of supporting data reception on the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the minimum scheduling delay further may include operations, features, means, or instructions for switching the minimum scheduling delay from a first value to a second value in response to a triggering condition. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition may include operations, features, means, or instructions for receiving the first downlink grant or receiving a wakeup downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes an expiration of an inactivity timer. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay may be specific to the second component carrier, and where the minimum scheduling delay may be determined from a table using a subcarrier spacing (SCS) of the first component carrier and an SCS of the second component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying a triggering condition, and switching between a cross-carrier scheduling mode and a self-scheduling mode based on the triggering condition. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the triggering condition may include operations, features, means, or instructions for receiving downlink grants for the second component carrier subsequent to the first downlink grant on the first component carrier for a threshold number of consecutive slots, and where the switching includes switching from the cross-carrier scheduling mode to the self-scheduling mode for the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the triggering condition may include operations, features, means, or instructions for receiving a threshold number of downlink grants for the second component carrier subsequent to the first downlink grant on the first component carrier during timing window including a threshold number of slots, and where the switching includes switching from the cross-carrier scheduling mode to the self-scheduling mode for the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes a HARQ signal. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes an absence of downlink grants during a threshold number of slots for the second component carrier which may be in the self-scheduling mode, and where the switching includes switching from the self-scheduling mode to the cross-carrier scheduling mode. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition may include operations, features, means, or instructions for a DCI signal, an RRC signal, or a MAC control element (MAC-CE). Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for operating in the cross-carrier scheduling mode based on the switching, and receiving, in a carrier indication field (CIF) of a DCI signal, carrier information indicating that the first component carrier may be a scheduling component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for operating in the self-scheduling mode based on the switching, and receiving, in a carrier indication field (CIF) of a DCI signal, carrier information indicating that the second component carrier may be a scheduling component carrier for the second component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for receiving, on the second component carrier, a second downlink grant indicating a second downlink data transmission on the second component carrier, where receiving the first downlink data transmission on the second component carrier may be based on the first downlink grant, or the second downlink grant, or a combination thereof. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying first stage control information in the first downlink grant and second stage control information in the second downlink grant, where receiving the first downlink data transmission may be based on the first stage control information and the second stage control information. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the first downlink grant as a dummy grant, where receiving the first downlink data transmission may be based on the second downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for overriding the first downlink grant, where receiving the first downlink data transmission may be based on the second downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the second downlink grant as redundant; or, and validating the first downlink grant based on the first downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for receiving, on a third component carrier, a third downlink grant indicating a third downlink data transmission on the second component carrier, where receiving the first downlink data transmission on the second component carrier may be based on the first downlink grant, or the second downlink grant, or the third downlink grant, or a combination thereof. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the timing of the first downlink data transmission includes a slot of the first downlink data transmission, and where the identified slot of the first downlink data transmission may be at least the minimum scheduling delay after a slot of the downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the numerology of the first component carrier includes a first subcarrier spacing, and where the numerology of the second component carrier includes a second subcarrier spacing that may be less than the subcarrier spacing of the first subcarrier spacing. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for buffering, based on the minimum scheduling delay, the first downlink data transmission on the second component carrier. Advantages of the described method, apparatus, and non-transitory computer-readable medium may include increased or more efficient throughput, decreased power expenditure, decreased overhead, and improved user experience.

A method of wireless communications by a base station is described. The method may include identifying a minimum scheduling delay, transmitting, on a first component carrier, a first downlink grant indicating a first downlink data transmission on a second component carrier, where the first component carrier and the second component carrier are included in a carrier aggregation configuration for the base station, identifying a timing of the first downlink data transmission on the second component carrier based on the first downlink grant and the minimum scheduling delay, and transmitting the first downlink data transmission on the second component carrier during the identified timing of the first downlink data transmission in accordance with the first downlink grant transmitted on the first component carrier. Advantages of the described method may include increased or more efficient throughput, decreased power expenditure, decreased overhead, and improved user experience.

An apparatus for wireless communications by a base station is described. The apparatus may include a processor, memory coupled with the processor, and instructions stored in the memory. The instructions may be executable by the processor to cause the apparatus to identify a minimum scheduling delay, transmit, on a first component carrier, a first downlink grant indicating a first downlink data transmission on a second component carrier, where the first component carrier and the second component carrier are included in a carrier aggregation configuration for the base station, identify a timing of the first downlink data transmission on the second component carrier based on the first downlink grant and the minimum scheduling delay, and transmit the first downlink data transmission on the second component carrier during the identified timing of the first downlink data transmission in accordance with the first downlink grant transmitted on the first component carrier. Advantages of the described apparatus may include increased or more efficient throughput, decreased power expenditure, decreased overhead, and improved user experience.

Another apparatus for wireless communications by a base station is described. The apparatus may include means for identifying a minimum scheduling delay, transmitting, on a first component carrier, a first downlink grant indicating a first downlink data transmission on a second component carrier, where the first component carrier and the second component carrier are included in a carrier aggregation configuration for the base station, identifying a timing of the first downlink data transmission on the second component carrier based on the first downlink grant and the minimum scheduling delay, and transmitting the first downlink data transmission on the second component carrier during the identified timing of the first downlink data transmission in accordance with the first downlink grant transmitted on the first component carrier. Advantages of the described apparatus may include increased or more efficient throughput, decreased power expenditure, decreased overhead, and improved user experience.

A non-transitory computer-readable medium storing code for wireless communications by a base station is described. The code may include instructions executable by a processor to identify a minimum scheduling delay, transmit, on a first component carrier, a first downlink grant indicating a first downlink data transmission on a second component carrier, where the first component carrier and the second component carrier are included in a carrier aggregation configuration for the base station, identify a timing of the first downlink data transmission on the second component carrier based on the first downlink grant and the minimum scheduling delay, and transmit the first downlink data transmission on the second component carrier during the identified timing of the first downlink data transmission in accordance with the first downlink grant transmitted on the first component carrier. Advantages of the described non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for transmitting a configuration message to a UE indicating the minimum scheduling delay. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the first downlink grant includes a first timing delay parameter associated with the first downlink data transmission. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the timing of the first downlink data transmission may include operations, features, means, or instructions for determining that the first timing delay parameter satisfies the minimum scheduling delay. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the timing of the first downlink data transmission may be based on the minimum scheduling delay or the first timing delay parameter or a combination thereof. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the first timing delay parameter may be with reference to a last symbol of a physical downlink control channel carrying the first downlink grant on the first component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for transmitting, on the first component carrier, a second downlink grant indicating a second downlink data transmission on the second component carrier and a second timing delay parameter associated with the second downlink data transmission, determining that the second timing delay parameter does not satisfy the minimum scheduling delay, identifying a timing of the second downlink data transmission as a timing (e.g., an earliest timing) that satisfies the minimum scheduling delay following the second downlink grant, and transmitting the second downlink data transmission during the identified timing of the second downlink data transmission in accordance with the second downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay includes a minimum value resulting in the timing of the first downlink data transmission being different from a timing of the first downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, a number of downlink control symbols of the first component carrier or a subcarrier spacing of the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay may be based on a modem reconfiguration latency associated with transitioning a wireless modem from a low power state to a higher power state capable of supporting data reception on the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the minimum scheduling delay further may include operations, features, means, or instructions for switching the minimum scheduling delay from a first value to a second value in response to a triggering condition. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition may include operations, features, means, or instructions for transmitting the first downlink grant or receiving a wakeup downlink grant. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes an expiration of an inactivity timer. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the minimum scheduling delay may be specific to the second component carrier, and where the minimum scheduling delay may be determined from a table using a subcarrier spacing (SCS) of the first component carrier and an SCS of the second component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying a triggering condition, and switching between a cross-carrier scheduling mode and a self-scheduling mode based on the triggering condition. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the triggering condition may include operations, features, means, or instructions for transmitting downlink grants for the second component carrier subsequent to the first downlink grant on the first component carrier for a threshold number of consecutive slots, and where the switching includes switching from the cross-carrier scheduling mode to the self-scheduling mode for the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, identifying the triggering condition may include operations, features, means, or instructions for transmitting a threshold number of downlink grants for the second component carrier subsequent to the first downlink grant on the first component carrier during timing window including a threshold number of slots, and where the switching includes switching from the cross-carrier scheduling mode to the self-scheduling mode for the second component carrier. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes a HARQ signal. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition includes an absence of downlink grants during a threshold number of slots for the second component carrier which may be in the self-scheduling mode, and where the switching includes switching from the self-scheduling mode to the cross-carrier scheduling mode. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the triggering condition may include operations, features, means, or instructions for a DCI signal, an RRC signal, or a MAC control element (MAC-CE). Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for operating in the cross-carrier scheduling mode based on the switching, and transmitting, in a carrier indication field (CIF) of a DCI signal, carrier information indicating that the first component carrier may be a scheduling component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for operating in the self-scheduling mode based on the switching, and transmitting, in a carrier indication field (CIF) of a DCI signal, carrier information indicating that the second component carrier may be a scheduling component carrier for the second component carrier. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for transmitting, on the second component carrier, a second downlink grant indicating a second downlink data transmission on the second component carrier, where transmitting the first downlink data transmission on the second component carrier may be based on the first downlink grant, or the second downlink grant, or a combination thereof. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for including first stage control information in the first downlink grant and second stage control information in the second downlink grant, where transmitting the first downlink data transmission may be based on the first stage control information and the second stage control information. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the first downlink grant as a dummy grant, where transmitting the first downlink data transmission may be based on the second downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for overriding the first downlink grant, where transmitting the first downlink data transmission may be based on the second downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for identifying the second downlink grant as redundant; or, and validating the first downlink grant based on the first downlink grant. Advantages of the described method, apparatus, and non-transitory computer-readable medium may include increased or more efficient throughput, decreased power expenditure, decreased overhead, and improved user experience.

Some examples of the method, apparatuses, and non-transitory computer-readable medium described herein may further include operations, features, means, or instructions for transmitting, on a third component carrier, a third downlink grant indicating a third downlink data transmission on the second component carrier, where transmitting the first downlink data transmission on the second component carrier may be based on the first downlink grant, or the second downlink grant, or the third downlink grant, or a combination thereof. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the timing of the first downlink data transmission includes a slot of the first downlink data transmission. Advantages of the described method, apparatus, and non-transitory computer-readable medium may include increased or more efficient throughput, decreased power expenditure, decreased overhead, and improved user experience.

In some examples of the method, apparatuses, and non-transitory computer-readable medium described herein, the numerology of the first component carrier includes a first subcarrier spacing, and where the numerology of the second component carrier includes a second subcarrier spacing that may be less than the subcarrier spacing of the first subcarrier spacing. Advantages of the described method, apparatus, and non-transitory computer-readable medium may include increased or more efficient throughput, decreased power expenditure, decreased overhead, and improved user experience.

DETAILED DESCRIPTION

Figure 1:
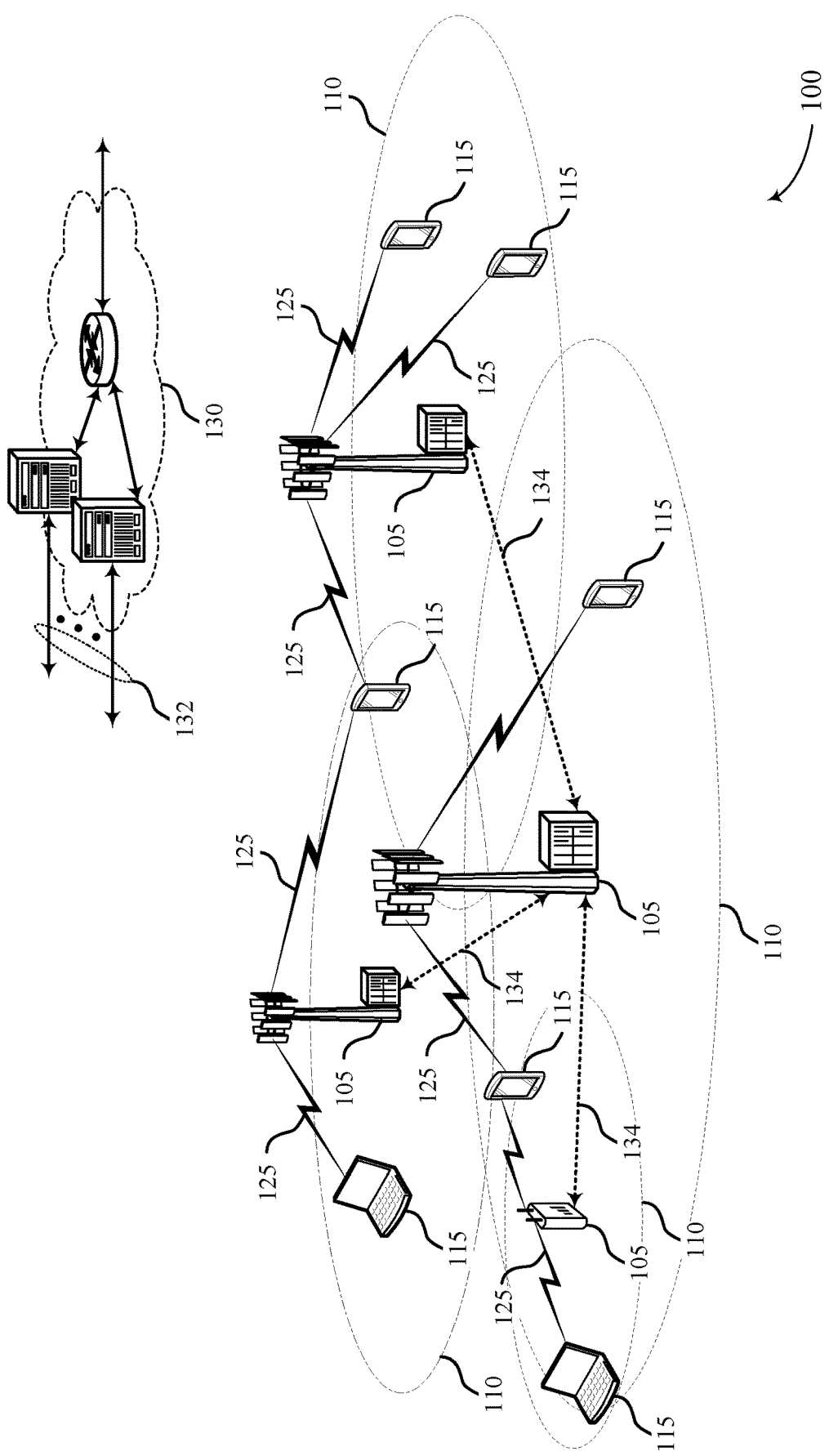
FIG. 1 illustrates an example of a system for wireless communications that supports cross-carrier scheduling enhancements in new radio (NR) in accordance with aspects of the present disclosure.

Some wireless communications systems (e.g., a new radio (NR) system) may support cross-carrier scheduling. In such examples, a base station may transmit a downlink grant on a first component carrier (CC) (e.g., a scheduling CC). The downlink grant may be included in a physical downlink control channel (PDCCH) on the scheduling CC. The downlink grant may indicate a set of physical downlink shared channel (PDSCH) resources for receiving a downlink data transmission on a scheduled CC (e.g., a second CC that is different from the first CC).

In some examples, the UE may process the PDCCH that includes the downlink grant, and the processing may take a minimum amount of time (e.g., a processing delay). In some cases, the scheduling CC may have a different numerology than the scheduled CC. For instance, the scheduling CC may have a different subcarrier spacing (SCS) than the scheduled CC, or the scheduling CC may have different transmission time intervals (TTIs) than the scheduled CC, or both. The processing delay, the different subcarrier spacing, or the different TTIs, or any combination thereof, may result in reduced throughput on the scheduled CC, or unnecessary power expenditures and overhead at the UE because of additional buffering requirements. For example, if some of the PDSCH symbols on the scheduled CC are not scheduled (e.g., the downlink grant only indicates causal PDSCH symbols on the scheduled CC that are subsequent to the PDCCH and the processing delay) then the non-causal symbols (symbols that are concurrent with one or more of the PDCCH symbols or the processing delay) on the scheduled CC may be wasted, which may be an inefficient use of resources. Alternatively, if the downlink grant indicates both causal and non-causal PDSCH symbols on the scheduled CC, the UE may have to meet increased buffering requirements because in order to receive data on each non-causal PDSCH symbol, the UE must be constantly buffering during the non-causal PDSCH symbols. Such decreased throughput or increased buffering requirements may result in inefficient throughput, inefficient power expenditure, increased overhead, and decreased user experience.

To improve throughput and avoid violating or being required to meet heightened buffering requirements, a minimum scheduling delay (e.g., a slot delay threshold) may be implemented for cross-carrier scheduling. The minimum scheduling delay may define a minimum number of slots between a slot carrying the PDCCH that schedules a downlink data transmission and a slot carrying the scheduled downlink data transmission. By receiving the data transmission in a slot that satisfies the minimum scheduling delay, the UE may avoid non-causal symbol processing. That is, the UE may receive the downlink data transmission in a slot subsequent to the slot in which the PDCCH is received, and thus without any buffering requirements. In such cases, the system may also utilize each PDSCH symbol in a given slot. A UE may identify the slot delay by receiving a configuration message indicating the minimum scheduling delay. In some examples, the UE may identify the slot delay by receiving a slot delay parameter. The slot delay parameter may be, for example, a timing offset (e.g., K0) equal to a certain number of slots, which may or may not satisfy the minimum scheduling delay.

In some examples, the base station may explicitly indicate the slot delay parameter (K0) as an entry in a table. In some examples, the table may be configured such that each table entry satisfies the minimum scheduling delay. In some examples, the UE may receive a K0 value from the base station, and may ensure that regardless of the received K0 value the minimum scheduling delay is satisfied by applying the minimum scheduling delay to the received K0 value (e.g., identifying the slot in which to receive the downlink data transmission as the sum of K0 and the minimum scheduling delay). In some examples, if the received K0 value is less than the threshold, the UE may identify the nearest subsequent slot to a received downlink grant that satisfies the minimum scheduling delay as the slot in which to receive the PDSCH. In some examples, the UE may identify the slot that satisfies the minimum scheduling delay as the slot that overlaps with the end of the last PDCCH symbol of the scheduling carrier, or the earliest slot subsequent to the end of the last PDCCH symbol of the scheduling carrier. In some examples, instead of receiving an explicit indication of K0 or the minimum scheduling delay, the UE may be preconfigured with the K0 or minimum scheduling delay values based on one or more values defined by a specification. Such pre-configurations may include rule-based or table-based values. In some cases, a UE and a base station may alternate between a long K0 value and a short K0 value. In some examples, a UE and a base station may alternate between a cross-carrier mode and a self-scheduling mode, or may operate in a mode where multiple scheduling carriers can schedule one scheduled carrier.

Aspects of the disclosure are initially described in the context of a wireless communications system. Aspects of the disclosure are further illustrated by and described with reference to CC configurations, and process flows. Aspects of the disclosure are further illustrated by and described with reference to apparatus diagrams, system diagrams, and flowcharts that relate cross-carrier scheduling enhancements in NR.

FIG. 1 illustrates an example of a wireless communications system 100 that supports cross-carrier scheduling enhancements in NR in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may implement cross-carrier scheduling, and downlink scheduling assignments may be valid for CCs other than CCs on which they are transmitted. A UE 115 may identify a minimum scheduling delay (e.g., a minimum K0 value) and may receive a downlink grant on a first CC (e.g., scheduling CC). The UE 115 may further identify the slot in which a downlink data transmission corresponding to the downlink grant will be received, and may identify the slot such that the minimum scheduling delay is satisfied. The UE 115 may the receive the downlink data transmission, as indicated in the downlink grant, in the identified slot. In some examples, the UE 115 and the base station 105 may alternate between a long minimum scheduling delay and a short minimum scheduling delay. In some examples, the UE 115 and the base station 105 may alternate between a cross-carrier mode, and a self-scheduling mode. Advantages of the described method, apparatus, and non-transitory computer-readable medium may include increased or more efficient throughput, decreased power expenditure, decreased overhead, and improved user experience.

Figure 2:
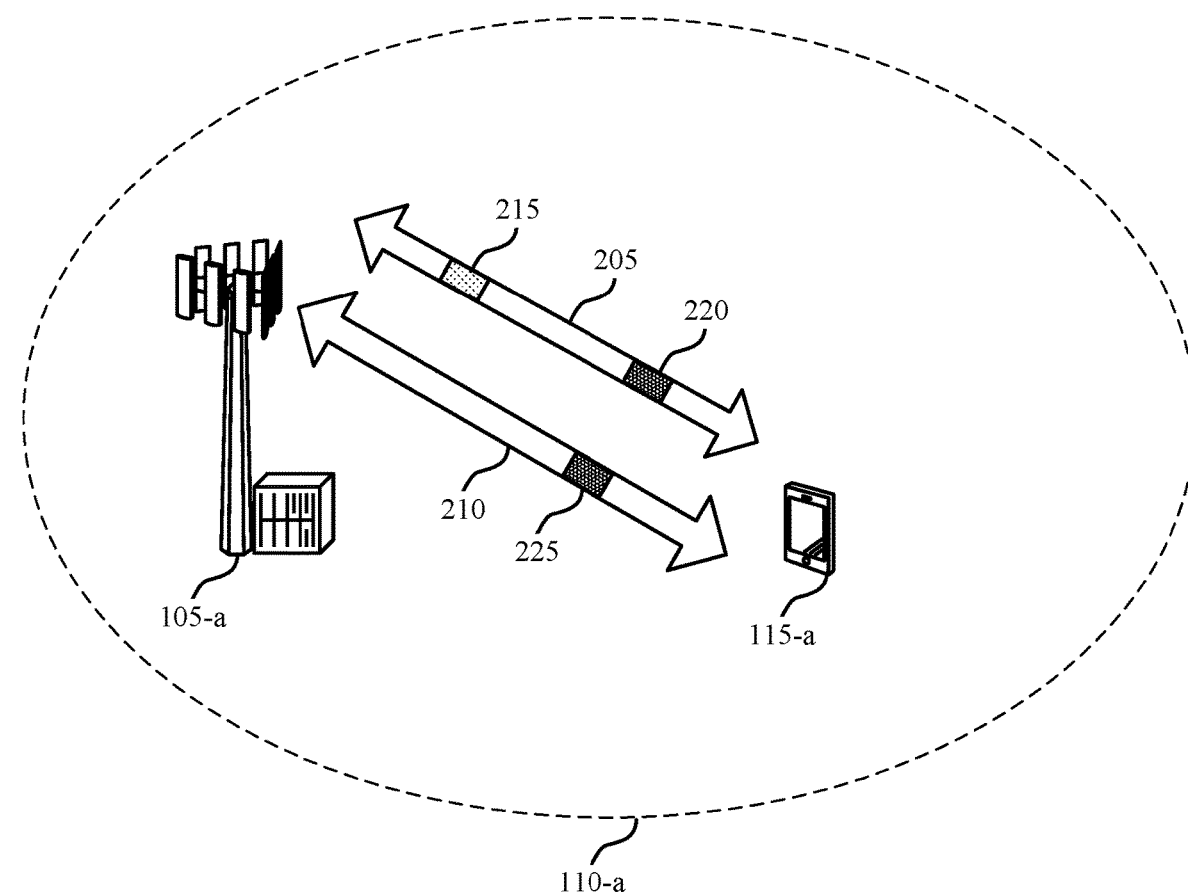
FIG. 2 illustrates an example of a wireless communications system that supports cross-carrier scheduling enhancements in NR in accordance with aspects of the present disclosure.

FIG. 2 illustrates an example of a wireless communications system 200 that supports cross-carrier scheduling enhancements in NR in accordance with aspects of the present disclosure. In some examples, wireless communications system 200 may implement aspects of wireless communications system 100. Aspects of wireless communications system 200 may be implemented by a base station 105 and a UE 115, which may be examples of similar devices described with respect to wireless communications systems 100 and 200.

A base station 105-a may communicate with UEs 115 such as UE 115-a within a geographic coverage area 110-a. In some examples, base station 105-a and UE 115-a may support cross-carrier scheduling. UE 115-a may receive downlink data transmission 220 and downlink data transmission 225 across multiple CCs. In such examples, base station 105-a may transmit a downlink grant 215 on a scheduling CC 205. The downlink grant 215 may be included in a physical downlink control channel (PDCCH) on scheduling CC 205. The downlink grant may indicate a set of physical downlink shared channel (PDSCH) resources for receiving a downlink data transmission 225 on a scheduled CC 210.

In some examples, UE 115-a may process the PDCCH that includes downlink grant 215, and the processing may take a minimum amount of time (e.g., a processing delay). In some cases, scheduling CC 205 may have a different subcarrier spacing (SCS) than scheduled CC 210. In some cases, scheduling CC 205 may have different transmission time intervals (TTIs) than scheduled CC 210. The processing delay, the different subcarrier spacing, or the different TTIs, or any combination thereof, may result in reduced throughput on scheduled CC 210, or unnecessary power expenditures and overhead at UE 115-a because of additional buffering requirements. For example, if some of the PDSCH symbols of downlink data transmission 225 on scheduled CC 210 are not scheduled (e.g., the downlink grant only indicates causal PDSCH symbols on scheduled CC 210 that are subsequent to the PDCCH and the processing delay) then the non-causal symbols (symbols that are concurrent with one or more of the PDCCH symbols or the processing delay) on scheduled CC 210 may be wasted, which may be an inefficient use of resources. Alternatively, if downlink grant 215 indicates both causal and non-causal PDSCH symbols on scheduled CC 210, UE 115-a may have to meet increased buffering requirements because in order to receive downlink data transmission 225 on each non-causal PDSCH symbol, UE 115-a must be constantly buffering during the non-causal PDSCH symbols. Such decreased throughput or increased buffering requirements may result in inefficient throughput, inefficient power expenditure, increased overhead, and decreased user experience.

To improve throughput and avoid violating or being required to meet heightened buffering requirements, a UE 115-a operating in a cross-carrier scheduling mode may identify a slot delay threshold. That is, UE 115-a may determine a minimum number of slots between receiving the downlink grant 215 on the PDCCH and receiving scheduled downlink data transmission 225. By receiving downlink data transmission 225 in a slot that satisfies the slot delay threshold, UE 115-a may avoid non-causal symbol processing. UE 115-a may receive the downlink data transmission 225 in a slot subsequent to the slot in which the PDCCH is received, and thus without any buffering requirements. In such cases, the system may also utilize each PDSCH symbol in a given slot. UE 115-a may identify the slot delay by receiving a configuration message indicating the slot delay threshold. In some examples, UE 115-a may identify the slot delay by receiving a slot delay parameter. The slot delay parameter may be, for example, a timing offset (e.g., K0) equal to a certain number of slots, which may or may not satisfy the slot delay threshold.

K0, as described and recited throughout the specification, refers to the number of slots between a slot in which a downlink grant is received and the slot in which the corresponding downlink data transmission will be located. The minimum K0 threshold (e.g., the slot delay threshold or minimum scheduling delay) refers to the minimum value that K0 can be to reduce buffering requirements at the UE. In most cases, a default value for K0 is preconfigured at or transmitted to the UE from the base station. The slot delay threshold may also be preconfigured at the UE 115, signaled explicitly to the UE 115, or determined at the UE 115 by one or more rules or conditions. In some wireless communications systems, a UE 115 may also transmit a parameter that may be referred to as a k0 parameter to a base station as a UE capability based on how long it takes the UE to switch beams. This k0 parameter should not be confused with K0 or the slot delay threshold (e.g., minimum K0 threshold) as described herein. The k0 parameter referring to beam switching timings is not the same as a minimum time between receiving a downlink grant and receiving a corresponding downlink data transmission to reduce buffering requirements.

In some examples, base station 105 may explicitly indicate the slot delay parameter (K0) as an entry in a table. In some examples, the table may be configured such that each table entry satisfies the slot delay threshold. In some examples, UE 115-a may receive a K0 value from the base station, and may ensure that regardless of the received K0 value the slot delay threshold is satisfied by applying the slot delay threshold to the received K0 value (e.g., identifying the slot in which to receive downlink data transmission 225 as the sum of K0 and the slot delay threshold). In some examples, if the received K0 value is less than the threshold, the UE may identify the nearest subsequent slot to a received downlink grant that satisfies the slot delay threshold as the slot in which to receive downlink data transmission 225. In some examples, UE 115-a may identify the slot that satisfies the slot delay threshold as the slot that overlaps with the end of the last PDCCH symbol of the scheduling carrier, or the earliest slot subsequent to the end of the last PDCCH symbol of scheduling CC 205. In some examples, instead of receiving an explicit indication of K0 or the slot delay threshold, UE 115-a may be preconfigured with the K0 or slot delay threshold values based on one or more values defined by a specification. Such pre-configurations may include rule-based or table-based values. In some cases, UE 115-a and a base station 105-a may alternate between a long K0 value and a short K0 value. In some examples, UE 115-a and base station 105-a may alternate between a cross-carrier mode and a self-scheduling mode, or may operate in a mode where multiple scheduling CCs 205 can schedule one scheduled CC 210.

Figure 3:
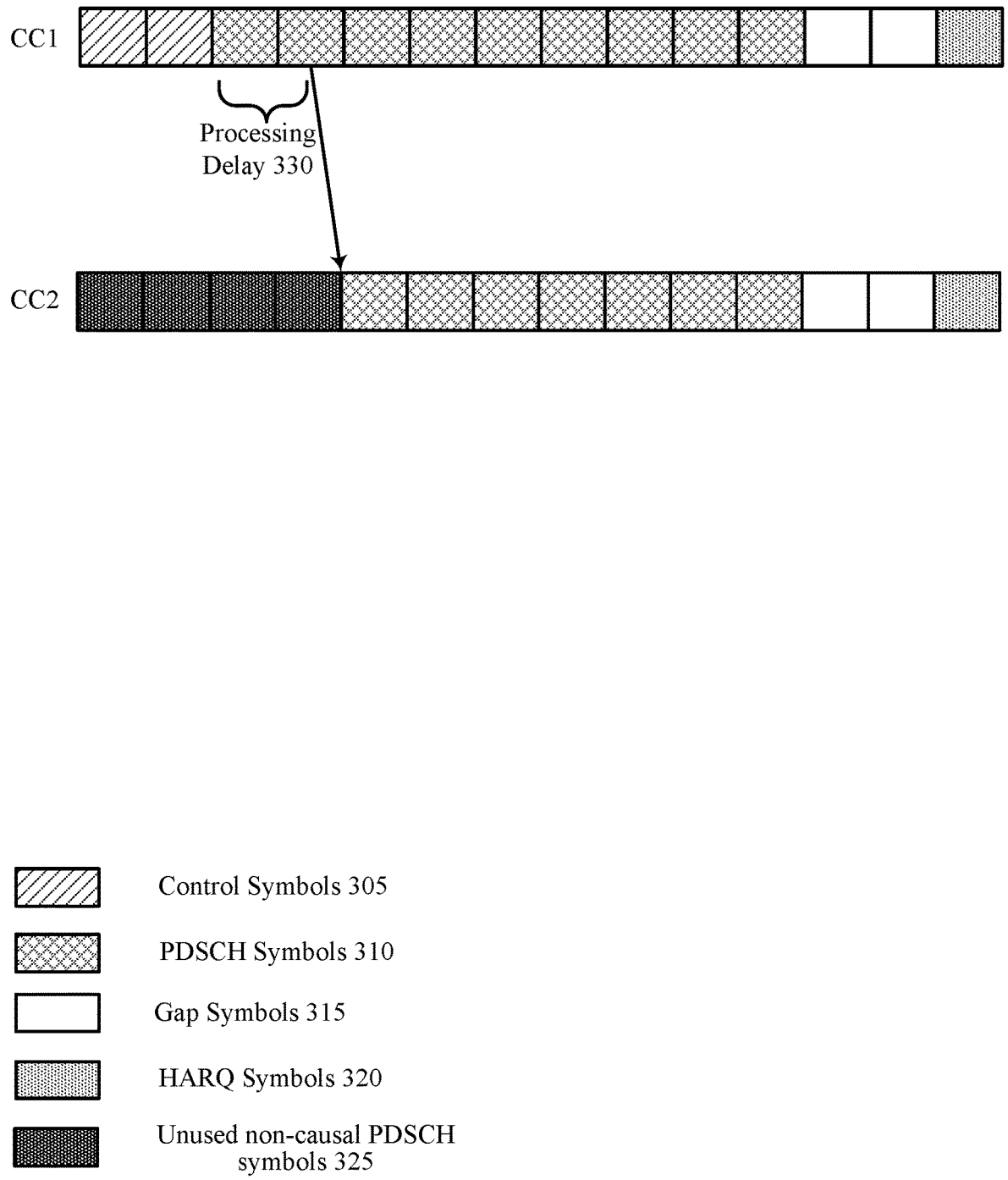
FIG. 3 illustrates an example of a component carrier (CC) configuration that supports cross-carrier scheduling enhancements in NR in accordance with aspects of the present disclosure.

FIG. 3 illustrates an example of a CC configuration 300 that supports cross-carrier scheduling enhancements in NR in accordance with aspects of the present disclosure. In some examples, CC configuration 300 may implement aspects of wireless communications system 100. Aspects of CC configuration 300 may be implemented by a base station 105 and a UE 115, which may be examples of similar devices described with respect to wireless communications systems 100 and 200.

In some examples, a base station 105 and a UE 115 may communicate via multiple CCs (e.g., CC1 and CC2). CC1 may be a scheduling carrier, and CC2 may be a scheduled carrier. In some examples, CC1 may include, for example, control symbols 305, PDSCH symbols 310, gap symbols 315, and HARQ symbols 320. Base station 105 may include one or more downlink grants in control symbols 305, which may indicate PDSCH resources on PDSCH symbols 310 for one or more downlink data transmissions.

In some examples, a downlink grant included in control symbols 305 may indicate PDSCH resources on PDSCH symbols 310 for a downlink data transmission on CC2. UE 115 may take a minimum amount of time (e.g., processing delay 330) to process the received downlink grant. UE 115 may receive the downlink grant in control symbols 305 on CC1. UE 115 may process the received downlink grant during processing delay 330. Processing delay 330 may include one or multiple symbols (e.g., 1.5 symbols). The symbols of CC2 that are concurrent with or prior to the end of the processing delay 330 and control symbols 305 on CC1 may be referred to as non-causal symbols. To receive data concurrently on CC2 with control symbols 305 and during processing delay 330, constant buffering may be required on non-causal symbols. The nearest symbols on which the UE 115 may receive an indicated downlink data transmission on PDSCH symbols 310 of CC2 without meeting increased buffering requirements may be referred to as causal symbols (e.g., PDSCH symbols 310 on CC2). In an illustrative example, where control symbols 305 include a first and second symbol of a slot, and where processing delay 330 includes 1.5 symbols, the first four symbols of CC2 may be non-causal symbols 325, and the subsequent PDSCH symbols of CC2 310 may be causal symbols.

In some examples, PDSCH symbols 310 may be strictly located over causal symbols. That is, the indicated downlink data transmission may only be located on PDSCH symbols 310 on CC2, and may not include unused non-causal symbols 325. In such cases, because the number of available symbols for a downlink data transmission is limited to causal symbols, throughput may be reduced. In other examples, downlink data transmissions may be sent on non-causal symbols. In such examples, heightened buffering requirements may be met (e.g., constant buffering may be accomplished) during non-causal symbols, as described in greater detail with respect to FIG. 4.

Figure 4:
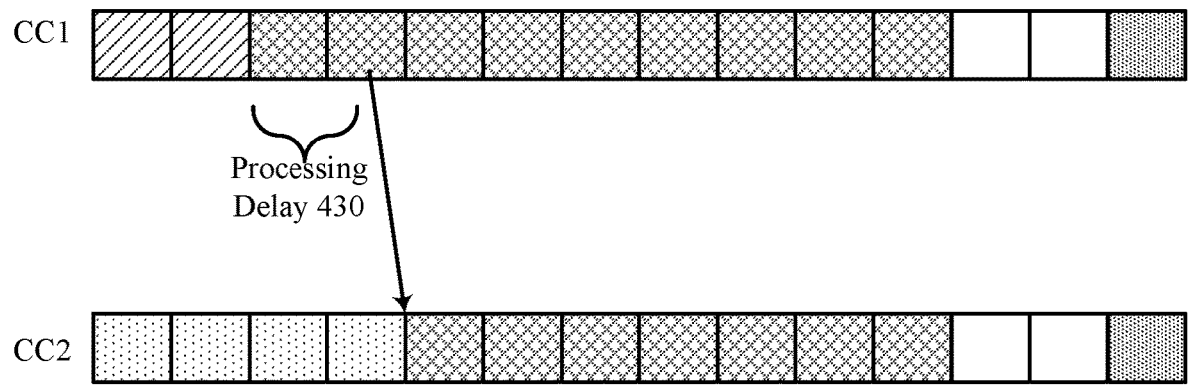
FIG. 4 illustrates an example of a CC configuration that supports cross-carrier scheduling enhancements in NR in accordance with aspects of the present disclosure.

FIG. 4 illustrates an example of a CC configuration 400 that supports cross-carrier scheduling enhancements in NR in accordance with aspects of the present disclosure. In some examples, CC configuration 400 may implement aspects of wireless communications system 100. Aspects of CC configuration 400 may be implemented by a base station 105 and a UE 115, which may be examples of similar devices described with respect to wireless communications systems 100 and 200.

In some examples, as described in FIG. 3, a base station 105 and a UE 115 may communicate via multiple CCs (e.g., CC1 and CC2). CC1 may be a scheduling carrier, and CC2 may be a scheduled carrier. In some examples, CC1 may include, for example, control symbols 405, PDSCH symbols 410, gap symbols 415, and HARQ symbols 420. Base station 105 may include one or more downlink grants in control symbols 405, which may indicate PDSCH resources on PDSCH symbols 410 for one or more downlink data transmissions.

In some examples, a downlink grant included in control symbols 405 may indicate PDSCH resources on PDSCH symbols 410 for a downlink data transmission on CC2. However, UE 115 may take a minimum amount of time (e.g., processing delay 430) to process the received downlink grant. UE 115 may process the received downlink grant during processing delay 430. Processing delay 430 may include one or multiple symbols (e.g., 1.5 symbols). To receive data concurrently on CC2 with control symbols 305 and during processing delay 330, constant buffering may be required on non-causal symbols.

In some examples, non-causal symbols may be utilized in the indicated downlink data transmission. In such cases, UE 115 may need to always buffer during utilized non-causal PDSCH symbols 425. That is, the indicated downlink data transmission may include one or more of PDSCH symbols 410 and utilized non-causal PDSCH symbols 425 on CC2. In such cases, because the number of available symbols for a downlink data transmission is not limited to causal symbols, throughput may be increased. However, the heightened buffering requirements (e.g. constant buffering on all of utilized non-causal PDSCH symbols 425) may result in unnecessarily high power expenditures, and increased overhead.

Figure 5:
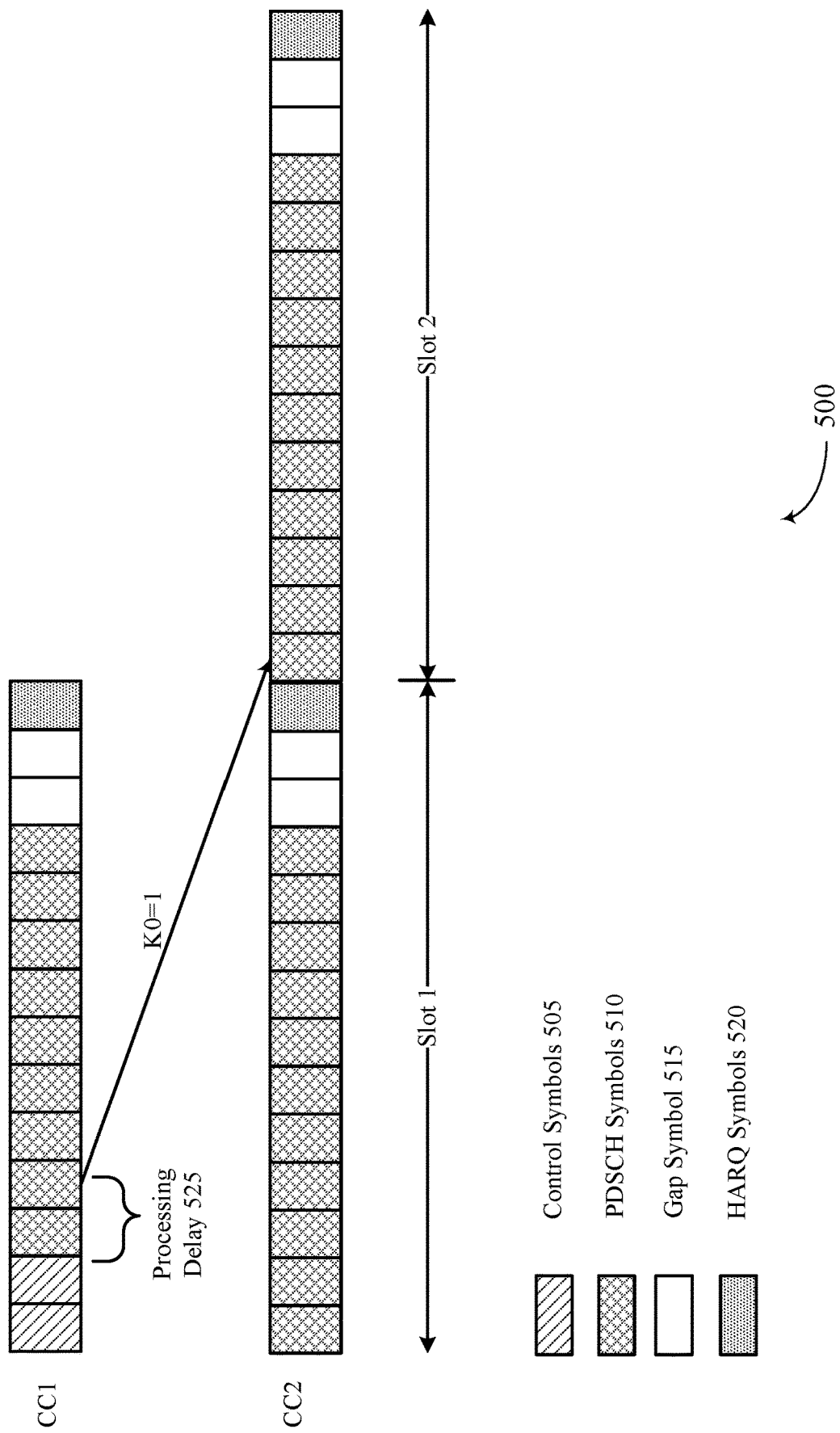
FIG. 5 illustrates an example of a CC configuration that supports cross-carrier scheduling enhancements in NR in accordance with aspects of the present disclosure.
Figure 6:
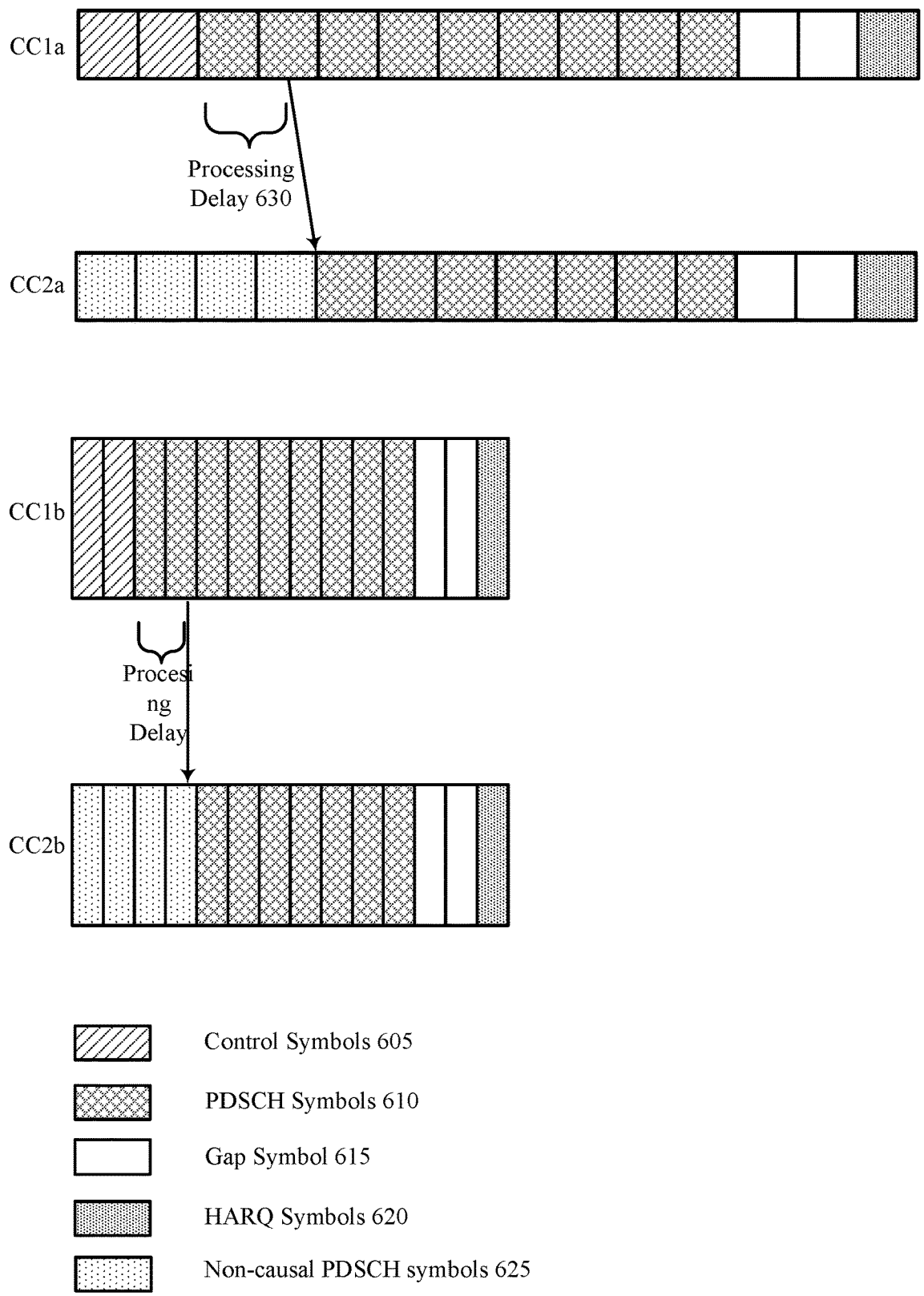
FIG. 6 illustrates an example of a CC configuration that supports cross-carrier scheduling enhancements in NR in accordance with aspects of the present disclosure.
Figure 7:
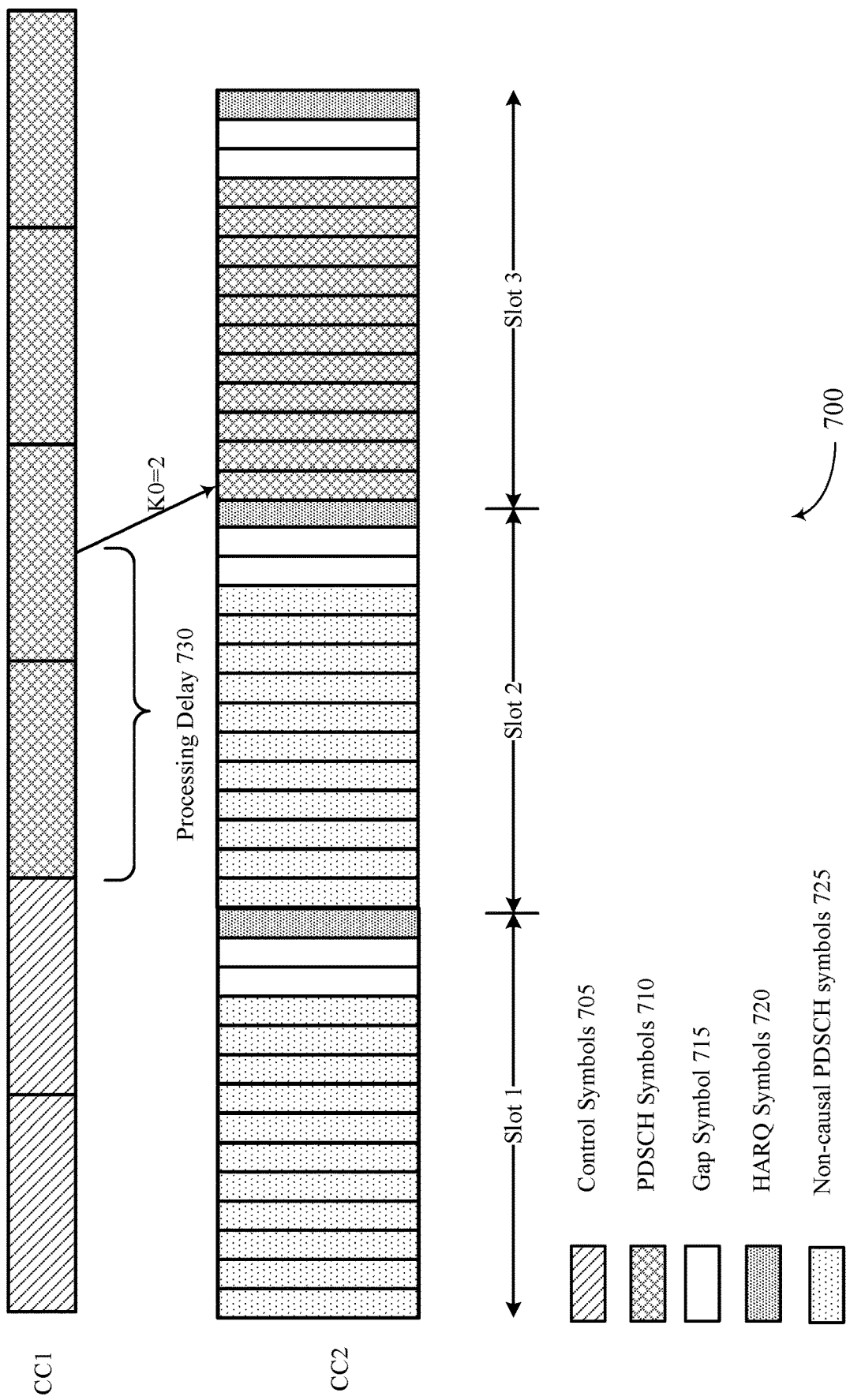
FIG. 7 illustrates an example of a CC configuration that supports cross-carrier scheduling enhancements in NR in accordance with aspects of the present disclosure.

As described in greater detail with respect to FIGS. 5-7, considerations for reducing buffering and defining buffering requirements may improve throughput, power expenditure, and user experience. In some cases, a UE 115 may operate in a self-scheduling mode (e.g., CC1 may schedule itself and CC2 may schedule itself). In such cases, PDCCH and PDSCH resources may be multiplexed (e.g., via frequency division multiplexing (FDM)) such that the first and second symbol of each slot on each CC includes both a downlink grant and PDSCH resources for receiving an indicated downlink data transmission. For instance, a PDSCH with a type A demodulation reference signal (DMRS) may be located at the beginning of a slot and may FDM with downlink control information. In such cases, constant buffering will still be necessary for the non-causal symbols (e.g., the multiplexed PDSCH resources in the first two symbols, and the following symbols included in the processing delay 430). A UE in such examples may already buffer the first one or more symbols of a slot for all activated carriers. In such cases, the increased buffering requirements discussed above may have no impact on the UE because the UE is already constantly buffering each symbol of the slot. That is, for self-scheduling, the UE may have to buffer the first few symbols for all activated carriers anyway, and the buffering requirement for cross-carrier scheduling may cost extra or may be the same.

In some examples, to avoid the buffering requirements in cross-carrier scheduling on non-causal symbols, a UE 115 and a base station 105 may identify a minimum slot delay between receiving a PDCCH on control symbols 405 and the identified downlink data transmission to avoid buffering requirements, as described in greater detail with respect to FIG. 5.

FIG. 5 illustrates an example of a CC configuration 500 that supports cross-carrier scheduling enhancements in NR in accordance with aspects of the present disclosure. In some examples, CC configuration 500 may implement aspects of wireless communications system 100. Aspects of CC configuration 500 may be implemented by a base station 105 and a UE 115, which may be examples of similar devices described with respect to wireless communications systems 100 and 200.

In some examples, as described with reference to FIGS. 3 and 4, a base station 105 and a UE 115 may utilize cross-carrier scheduling. For example, CC1 may include control symbols 505, PDSCH symbols 510, gap symbols 515, and HARQ symbols 520. In some examples, base station 105 may send a downlink grant in control symbols 505 on CC1, indicating a downlink data transmission on PDSCH symbols 510 on CC2.

In some examples, the downlink data transmission may be scheduled for a slot that is subsequent to the slot in which the downlink grant is received. For instance, UE 115 may receive the downlink grant in control symbols 505 on CC1 at the beginning of slot 1. However, the grant may indicate a downlink data transmission on PDSCH symbols 510 during slot 2.

In some examples, the downlink data transmission may be located after a timing offset (e.g., K0). K0 may be a timing offset defined as a slot delay from the scheduling PDCCH (e.g., control symbols 505) to the scheduled PDSCH (e.g., the downlink data transmission on PDSCH symbols 510). In cases where the PDCCH and the PDSCH are in the same slot, K0=0. For instance, if the downlink grant in control symbols 505 is located in slot 1, and the indicated downlink data transmission is located in the PDSCH symbols 510 of slot 1, then K0=0. As described with reference to FIG. 4, if cross carrier scheduling for K0=0 buffering requirements can be accommodated by self-scheduling, then there may be no need to impose a constraint where K0>0.

In some examples, K0 may be constrained to be greater than 0. In such examples, there may be no buffering requirement due to non-causality. For instance, if K0=1, then the downlink data transmission indicated in the downlink grant received by UE 115 in slot 1 may be received on PDSCH symbols 510 in slot 2. That is, where K0=1, UE 115 may receive a downlink grant on control symbols 505 of CC1 in slot 1, and may determine that the indicated downlink grant is to be received on the PDSCH symbols 510 in slot 2. Because the processing delay 525 occurs during slot 1, there are no non-causal symbols in slot 2, and no buffering requirement.

In some examples, cross-carrier cross-slot scheduling as shown in FIG. 5 may result in increased micro sleep and improved power savings. That is, where there are no non-causal symbols in the slot subsequent to the slot in which the PDCCH is received, the PDCCH processing may be out of the critical path. In such examples, UE 115 may more often enter micro sleep, resulting in decreased power expenditures. That is, UE 115 may enter micro sleep for the remainder of a slot (e.g., slot 1), and during the micro sleep may refrain from monitoring for, receiving, or processing subsequent PDCCH symbols on one or both CCs.

In some examples, CCs in a wireless communications system may have different subcarrier spacings (SCS). For instance, a first scheduling CC and a first scheduled CC may have the same SCS, and a second scheduling CC and a second scheduled CC may have a different SCS, as shown with respect to FIGS. 6 and 7. In some examples, the scheduling CC and the scheduled CC may have different SCS, as shown with respect to FIG. 8.

FIG. 6 illustrates an example of a CC configuration 600 that supports cross-carrier scheduling enhancements in NR in accordance with aspects of the present disclosure. In some examples, CC configuration 600 may implement aspects of wireless communications system 100. Aspects of CC configuration 600 may be implemented by a base station 105 and a UE 115, which may be examples of similar devices described with respect to wireless communications systems 100 and 200.

As described with respect to FIGS. 3-5, base station 105 and UE 115 may perform cross-carrier scheduling. A downlink grant in control symbols 605 on CC1a may schedule a downlink data transmission on PDSCH symbols 610 on CC2a, and similarly a downlink grant on control symbols 605 on CC1b may schedule a downlink data transmission on PDSCH symbols 610 on CC2b. Scheduling and scheduled CCs may also include gap symbols 615, and HARQ symbols 620. In some cases, non-causal PDSCH symbols 625 on a scheduled carrier (e.g., CC2a and CC2b) may be concurrent with control symbols 605 and processing delay 630, as described in greater detail with respect to FIGS. 3-4. CC1a and CC2a may have a first SCS and CC1b and CC2b may have a second SCS that is greater than the first SCS.

In some cases, a timeline for carriers, such as CC1 and CC2, may scale perfectly versus SCS. In such cases, buffering requirements may be similar, regardless of the SCS, and becomes only a function of the operating BW. Although the SCS of CC1a and CC2a and the SCS of CC1b and CC2b are different, the buffering requirements for the carriers with a first SCS may be the same or similar for the carriers with the second SCS on the first order. That is, for carriers operating in the same BW, the amount of resource elements transferred per unit time may be invariant to the SCS. If an SCS for a carrier is larger, then the TTI may be smaller, resulting in the same amount of resource elements transferred per unit time. Similarly, if the SCS is smaller, then the TTI may be larger, resulting in the same amount of resource elements transferred per unit time. For instance, the SCS for CC1b and CC2b may be twice the SCS of CC1a and CC1b, and the TTIs of CC1b and CC2b may be half that of CC1a and CC2a. In a case where K0=0, the amount of resource elements to buffer may be dependent on the time in which a PDCCH is decoded, as described in greater detail with respect to FIG. 4.

In some cases, implementation difference between carriers may result in deviations between carriers. For instance, a sample bit width may be different between CC1*a* and CC2*a*, and CC1*b* and CC2*b*. This may result in a difference between the amount of resource elements per unit time, and thus a difference in buffering requirements between CCs of different SCS. In such cases, PDCCH processing time may not scale perfectly or at with SCS. For instance, control channel elements (CCE) or blind decoding (BD) limits may not scale down linearly according to a standard or specification. The actual amount of processing may be similar. That is, for CC1*b* and CC2*b*, where the SCS is twice that of CC1*a* and CC2*a*, the PDCCH processing time may not scale down by a factor of two, but by some smaller amount in practice. In some examples, the SCS of a scheduling CC may be different than the SCS of a scheduled CC, as described in greater detail with respect to FIG. 7.

FIG. 7 illustrates an example of a CC configuration 700 that supports cross-carrier scheduling enhancements in NR in accordance with aspects of the present disclosure. In some examples, CC configuration 700 may implement aspects of wireless communications system 100. Aspects of CC configuration 700 may be implemented by a base station 105 and a UE 115, which may be examples of similar devices described with respect to wireless communications systems 100 and 200.

As described above, CC1 may be a scheduling CC and CC2 may be a scheduled CC. Scheduled CC2 may include PDSCH symbols 710, gap symbols 715, and HARQ symbols 720. Base station 105 may send a downlink grant on control symbols 705 on CC1. The downlink grant may indicate PDSCH symbols 710 on CC2 for receiving a downlink data transmission. In some examples, CC1 may have a first SCS, and CC2 may have a second SCS, and the second SCS may be greater than the first SCS. In some examples, CC1 may have a TTI that is longer than the TTI of CC2.

In some examples, disparity between the first SCS and the second SCS may be extreme. In an illustrative example, the SCS of CC1 may be 15 kHz, and the SCS of CC2 may be 120 KHz. In such cases, slot-level causality may result. In some examples, entire downlink slots corresponding to K0=0 and K0=1 may have to be buffered where non-causal PDSCH symbols are indicated in the downlink grant. For instance, a downlink grant may be included in the first two symbols (e.g., control symbols 705) of a slot on CC1. The processing delay 730 may have a duration of, for example, 1.5 symbols on CC1. The first four symbols of CC1, however, may have a duration that is comparable to or greater than the entirety of slot 1 and slot 2 on CC2. Thus, the next slot in which a downlink data signal could be received without constant buffering on each of the non-causal PDSCH symbols 725 of slot 1 and slot 2, may be the PDSCH symbols 710 in slot 3.

In some examples, as described in greater detail with reference to FIGS. 8 and 13, UE 115 may determine in which slot to receive a downlink data transmission from base station 105 based at least in part on a minimum k0 threshold (e.g., a slot delay threshold). For example, given the SCS disparity between CC1 and CC2, a minimum K0 threshold of 2 slots (i.e., K0=2) may be applied. In such cases, UE 115 may receive the downlink grant on control symbols 705 on CC1, and may determine that a corresponding downlink data transmission may be received on PDSCH symbols 710 on CC2 during slot 3 based at least in part on identifying the minimum K0 threshold (K0=2). Base station 105 may similarly identify K0=2, and may transmit the corresponding PDSCH symbols 710 on CC2 during slot 3. The application of a minimum K0 threshold in such examples may reduce or eliminate the extent of non-causal processing on non-causal PDSCH symbols 725 in slot 1 and slot 2 of CC2. In other examples, a UE 115 may indicate to a base station that cross-carrier scheduling between CC1 and CC2 is not supported at the UE 115 if the SCS disparity exceeds a threshold.

In some examples, cross-carrier cross-numerology uplink scheduling may be performed in a similar manner to the downlink cross-carrier scheduling described above. A slot delay (e.g., K2) may be configured, and K2 may be configured to satisfy a slot delay threshold. In some examples, K2 may be larger than zero for cross-carrier scheduling, or self-scheduling, or both. In some examples of uplink cross-carrier scheduling, a timing offset may already be configured (e.g., N2). Similar requirements may be set for cross-carrier scheduling. If N2 does not reduce or eliminate buffering, then a minimum K2 threshold may be applied in the same manner as the minimum K0 threshold described in greater detail with respect to FIG. 8. In some examples, maximum uplink timing differences for uplink carrier aggregation may be considered. Maximum transmission timing differences in microseconds may correspond to preconfigured or otherwise known frequency ranges (e.g., frequency range 1 may correspond to a maximum transmission timing difference of 35.21 microseconds, frequency range 1 may correspond to a maximum transmission timing difference of 8.5 microseconds, and intra-band carrier aggregation frequency ranges between frequency range 1 and frequency range two may have a difference maximum transmission timing difference (e.g., 3 microseconds). A minimum K2 threshold may account for the maximum uplink timing difference corresponding to the utilized carriers, and the timing advance for the scheduled carrier.

Figure 8:
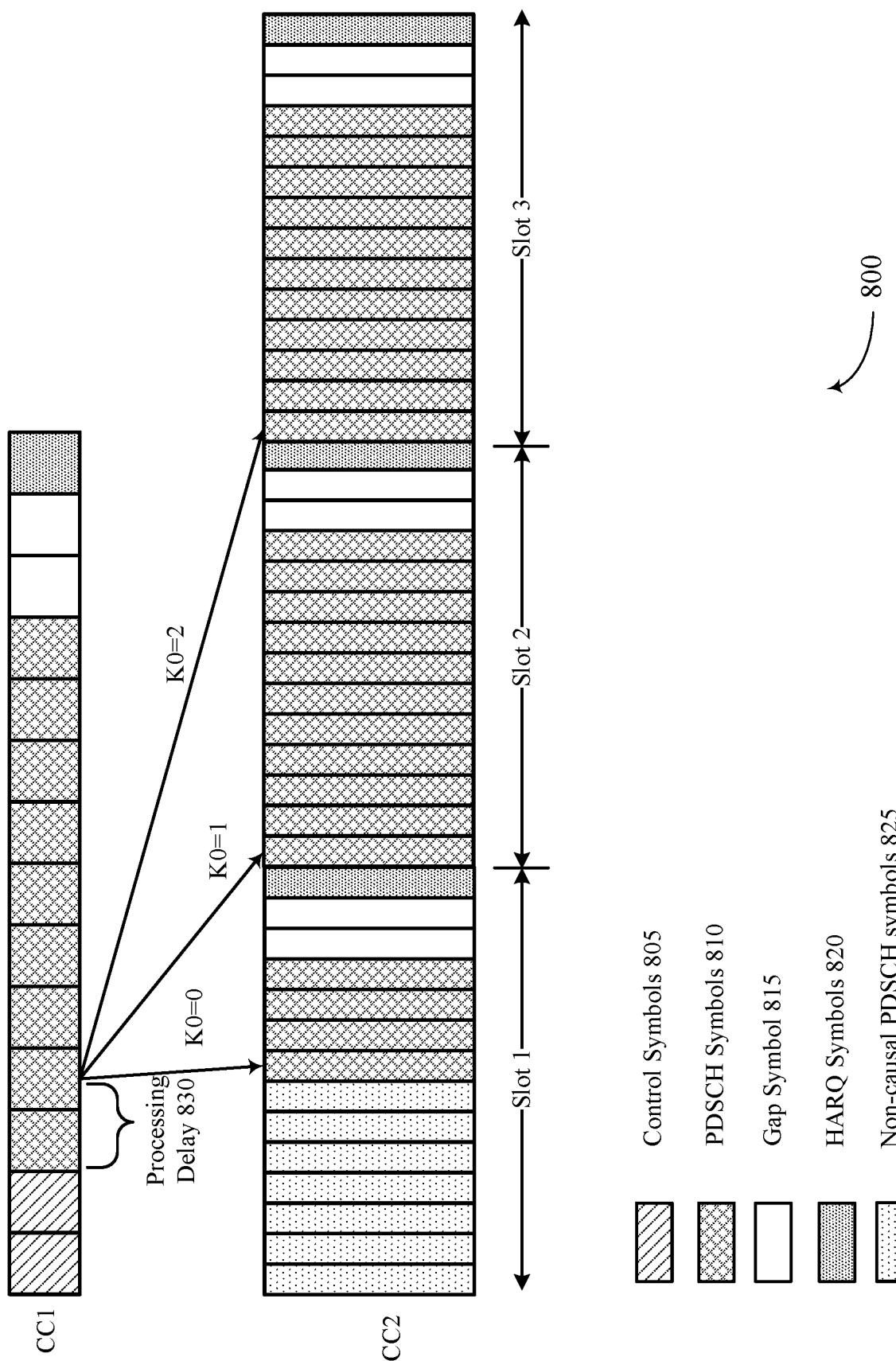
FIG. 8 illustrates an example of a CC configuration that supports cross-carrier scheduling enhancements in NR in accordance with aspects of the present disclosure.

FIG. 8 illustrates an example of a CC configuration 800 that supports cross-carrier scheduling enhancements in NR in accordance with aspects of the present disclosure. In some examples, CC configuration 800 may implement aspects of wireless communications system 100. Aspects of CC configuration 800 may be implemented by a base station 105 and a UE 115, which may be examples of similar devices described with respect to wireless communications systems 100 and 200.

In some examples, CC1 may be a scheduling carrier, and CC2 may be a scheduled carrier. UE 115 may receive a downlink grant on control symbols 805 of CC1 indicating a downlink data transmission on PDSCH symbols 810 on CC2. CC2 may also include gap symbols 815, HARQ symbols 820, and non-causal PDSCH symbols 825. Non-causal PDSCH symbols 825 may correspond to symbols that are concurrent with control symbols 805 or processing delay 830 on CC1. In some cases, CC1 may have a small SCS compared to the SCS of CC2. In such cases, buffering requirements may increase for slot 1 on CC2. Buffering requirements may be additional requirements, in addition to buffering requirements for a self-scheduling case.

In some examples, buffering requirements may be reduced or eliminated by applying a minimum K0 threshold (e.g., a slot delay threshold, minimum scheduling delay, etc.). For instance, K0 may be equal to 1 slot, 2 slot, 3 slots, etc. If K0=0, then UE 115 may continuously buffer on non-causal PDSCH symbols 825 of slot 1 CC2. However, if K0>0, then UE 115 may not have to perform any buffering. When K0=1, UE 115 may determine that the downlink data transmission corresponding to a downlink grant received in slot 1 will be received in slot 2 (e.g., the slot including the first PDSCH symbols 810 that satisfy a slot delay of 1 slot after the slot in which the downlink grant is received). Similarly, when K0=2, UE 115 may determine that the downlink data transmission corresponding to a downlink grant received in slot 1 will be received in slot 3.

In some examples, base station 105 may indicate a slot delay parameter (e.g., a timing delay parameter which may be referred to as K0) to UE 115. For instance, base station 105 may transmit to UE 115 a slot delay parameter in the form of and index indicating an entry in a table (e.g., pdsch-symbolAllocation table). In some examples, the K0 threshold may be implicitly configured to UE 115. Each entry in the table may be a K0 value. In one example, the table may be configured to include only K0 values that satisfy the minimum K0 threshold (e.g., the slot delay threshold). In some examples, the minimum K0 threshold may be explicitly configured to UE 115 for error checking. Base station 105 and UE 115 may observe that the entry selected for time-domain allocation field in a cross-carrier scheduling downlink control information (DCI) satisfies the minimum K0 threshold. That is, control symbols 805 in CC1 may include a DCI, which may include an index to select an entry in the table. If the table entry indicates a K0 greater than the minimum K0 threshold, then the minimum K0 threshold is satisfied and the UE 115 may receive the corresponding downlink data transmission at the indicated slot.

In some cases, the entry selected for time-domain allocation field in the cross-carrier scheduling DCI may not satisfy the minimum K0 threshold. In such examples, UE 115 may consider the DCI to be invalid and may discard the invalid DCI. That is, UE 115 may ignore part or all of the downlink grant and the DCI in which it is included if the indicated K0 does not satisfy the minimum K0 threshold. For example, the K0 threshold may be configured via signaling from the base station 105, or the K0 threshold may be standardized (e.g., defined in a specification) and known at UE 115. In such examples, UE 115 may consider that the entries in the pdsch-symbolAllocation table that do not satisfy minimum K0 threshold are ignored. In some examples, UE 115 may consider the DCI that indicates a K0 value that does not satisfy the minimum K0 threshold to be a dummy grant. The PDSCH corresponding to the dummy grant may be dropped (e.g., ignored). However, UE 115 may utilize other functionalities related to the dummy DCI.

In some examples, UE 115 may apply the minimum K0 threshold to an indicated K0 value to ensure that any identified K0 value satisfies the threshold. That is, UE 115 may determine the slot in which a downlink data transmission corresponding to a received downlink grant is to be received (e.g., K0'). UE 115 may determine K0' by finding the sum of an indicated K0 value and the minimum K0 threshold. For instance, base station 105 may indicate a K0 equal to 1 slot, and the minimum K0 threshold may be equal to 2 slots. UE 115 may apply the minimum K0 threshold of 2 slots to the indicated K0 of 1 slot, resulting in a K0' of 3 slots. Because 3 slots is greater than the minimum K0 threshold of 2 slots, K0' satisfies the threshold. In another example, base station 105 may indicate a K0 value of 0 slots. UE 115 may apply the minimum K0 threshold of 2 slots to the indicated K0 value of 1 slot, resulting in a K0' of 2 slots. Because 2 slots is equal to the minimum K0 threshold of 2 slots, K0' satisfies the minimum K0 threshold. Thus, regardless of what K0 value is indicated by the base station 105, UE 115 may consistently receive the downlink data transmission corresponding to the received downlink grant in a slot that satisfies the minimum K0 threshold. That is, applying the minimum K0 threshold to an indicated K0 value from the pdsch-symbolAllocation table does not require the pdsch-symbolAllocation table to contain only entries that satisfy the minimum K0 value threshold. Further, the minimum K0 threshold may be explicitly configured to the UE. Base station 105 may configure UE 115 with the K0 threshold via, for example, an RRC signal, a MAC CE signal, a DCI, or the like. In some examples, the minimum K0 threshold may be configured per cross-scheduled CC.

In some examples, devices may floor the indicated K0 to satisfy the minimum K0 threshold. That is, if the indicated K0 value is less than the threshold, the UE may identify the nearest subsequent slot to a received downlink grant that satisfies the slot delay threshold as the slot in which to receive the PDSCH. For instance, if the indicated K0 is 0 slots, and the minimum K0 threshold is 1 slot, UE 115 may receive the downlink grant in slot 1, and may determine that slot 2 is the nearest subsequent slot to a received downlink grant that satisfies the minimum K0 threshold. Base station 105 may configure UE 115 with the K0 threshold via, for example, an RRC signal, a MAC CE signal, a DCI, or the like. In some examples, the minimum K0 threshold may be configured per cross-scheduled CC. Base station 105 may make the same determination based on the configured minimum K0 threshold and identify the slot in which to transmit the downlink data transmission.

In some examples, UE 115 may identify the slot in which to receive the downlink data transmission based on a redefined K0 value. K0' may be defined based on the SCS (i.e., slot definition) of an indicated bandwidth part (BWP) on CC2. K0' may be further based at least in part on the last PDCCH symbol (e.g., the last control symbol 805) of CC1. In one example, K0'=0 may be the slot that overlaps with the end of the last PDCCH symbol of CC1. For instance, UE 115 may receive the downlink grant on control symbols 805 in slot 1. K0' may be identified as the same slot (e.g., slot 1). In cases with a greater disparity between the SCS of the CC1 and CC2 (as shown in FIG. 7), the last control symbols 805 may align with PDSCH symbols 810 in, for example, slot 2. In such cases, K0' may be identified as the subsequent slot (e.g., slot 2). Alternatively, K0'=0 may be the earliest slot after the end of the last PDCCH symbol of CC1. For instance, UE 115 may receive the downlink grant on control symbols 805 in slot 1. K0' may be identified as the subsequent slot (e.g., slot 2). In either case, the redefined K0' may reduce the extent of non-causality. In these cases, K0' may be redefined to satisfy the minimum K0 threshold.

In some examples, the minimum K0 threshold may be preconfigured or defined in a specification instead of by explicitly configuration. The defined minimum K0 threshold may be rule based or table based. In a rule based case, the threshold may be defined as the minimum K0 value such that cross-carrier grant always applies to the slot containing the scheduled PDSCH that starts later in time. For instance, UE 115 may receive a downlink grant in control symbols 805 during slot 1. If K0=0, then UE 115 may receive the indicated downlink data transmission in slot 1, but if K0=1, then UE 115 may receive the indicated downlink data transmission in slot 2. Because PDSCH symbols 810 in slot 2 start later in time than PDSCH symbols 810 in slot 1, UE 115 may determine based on the rules, to receive the downlink data transmission in slot 2. In the table-based case, where CC1 has an SCS of, for example, 15 kHz and CC2 has an SCS of 120 kHz, the minimum K0 threshold may be related to the number of control symbols 805. For instance, where UE 115 receives two control symbols 805 in the first slot, the minimum K0 threshold may be equal to 2 slots.

Alternatively, if UE 115 receives a downlink grant on a single control symbol 805, then the minimum K0 threshold may be equal to 1.

Figure 9:
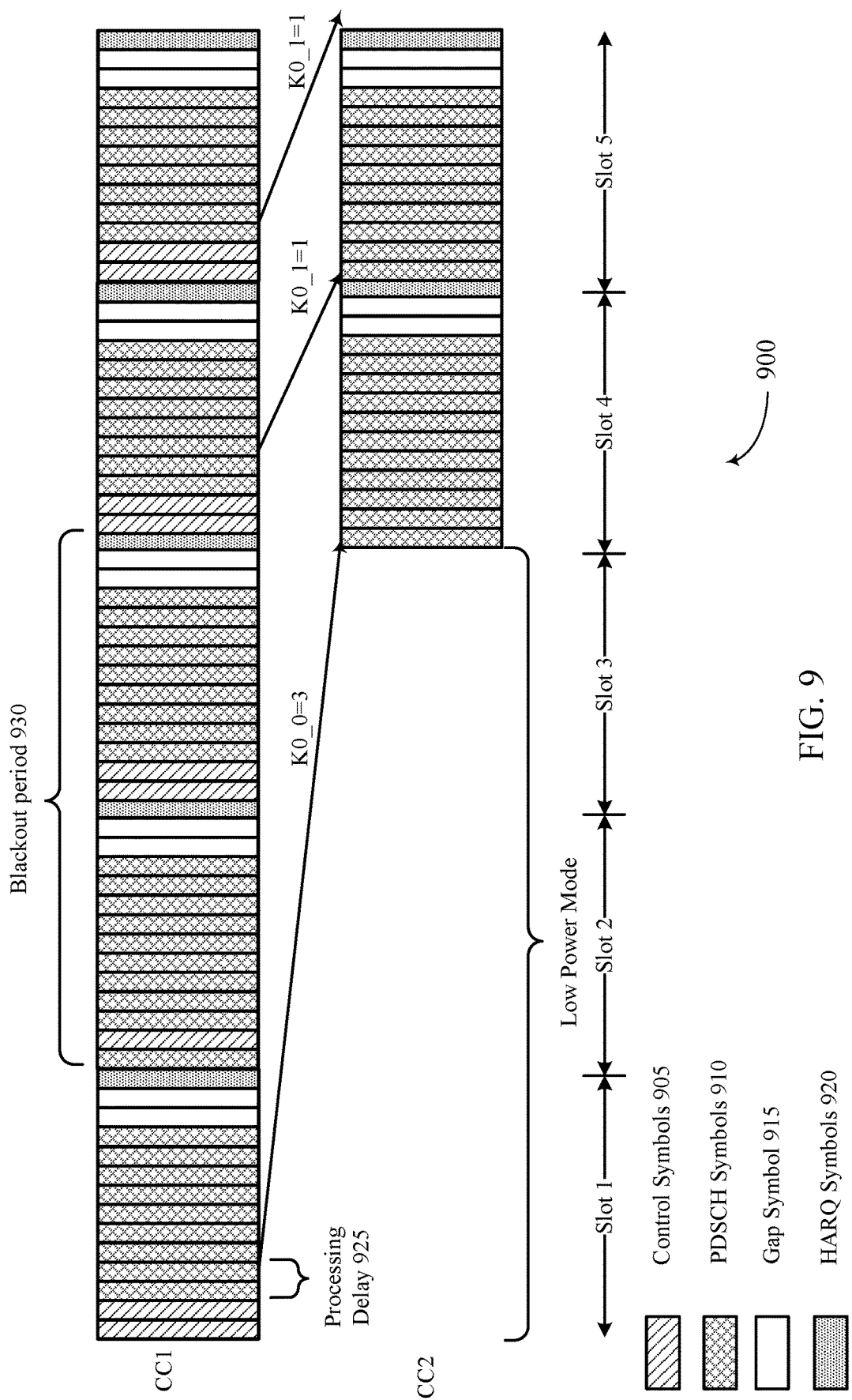
FIG. 9 illustrates an example of a CC configuration that supports cross-carrier scheduling enhancements in NR in accordance with aspects of the present disclosure.

FIG. 9 illustrates an example of a CC configuration 900 that supports cross-carrier scheduling enhancements in NR in accordance with aspects of the present disclosure. In some examples, CC configuration 900 may implement aspects of wireless communications system 100. Aspects of CC configuration 900 may be implemented by a base station 105 and a UE 115, which may be examples of similar devices described with respect to wireless communications systems 100 and 200.

In some examples, CC1 may be a scheduling carrier, and CC2 may be a scheduled carrier. UE 115 may receive a downlink grant on control symbols 905 of CC1 indicating a downlink data transmission on PDSCH symbols 910 on CC2. CC2 may also include gap symbols 915, and HARQ symbols 920. Processing delay 925 may represent the time UE 115 needs to process a PDCCH on control symbols 905.

In some examples, the minimum K0 threshold may also be used to accommodate latency for modem reconfiguration from a low power state to support data reception on a secondary cell (Scell). In such cases, the minimum K0 threshold may be larger than when such accommodations are not considered. In some cases, it may be beneficial to switch from a larger K0 to a smaller K0 after an Scell has been scheduled. For example, a UE 115 may be configured with two minimum K0 thresholds: a larger threshold (e.g., K0_0) and a default threshold (K0_1) that is smaller.

When a triggering condition is met, UE 115 and base station 105 may initiate minimum K0 threshold adaptation. In one example, the triggering condition may be scheduling an Scell with K0_0. Thus, base station 105 may transmit a downlink grant in slot 1, and may schedule the Scell. UE 115 may be operating in low power mode at slot 1. UE 115 may be operating in low power mode because only CC1 is active. Upon receiving the downlink grant, UE 115 may activate, and because of the large K0_0 value, UE 115 may have enough time for ramp up from low power mode to normal power mode to handle a PDSCH scheduled for CC2

UE 115 may determine that the downlink grant corresponds to a larger K0_0 value (e.g., K0_0=3). For instance, after a long period of not receiving any scheduling on CC2, UE 115 may have activated the K0_0 value (as described in greater detail with respect to FIG. 10). UE 115 may exit low power mode and, in slot 4 may wake up to receive the downlink data transmission scheduled in slot 1. Upon exiting low power mode, UE 115 may switch from K0_0 to the default K0_1 (e.g., K0_1=1) and may receive subsequent grants in slot 4 corresponding to downlink data transmissions in slot 5, grants in slot 5 corresponding to downlink data transmission in subsequent slot 6, etc.

In other examples, the triggering condition may be identifying a point defined to be the earliest slot for which the PDSCH scheduled with K0_1 (the smaller K0 value) that does not overlap with previously scheduled PDSCH with K0_0 (the larger K0 value). For instance, base station 105 may transmit a downlink grant in slot 1, and may schedule the Scell. UE 115 may determine that the downlink grant corresponds to a larger K0_0 value (e.g., K0_0=3). UE 115 may wake up in slot 4 to receive the downlink data transmission scheduled in slot 1. UE 115 may receive another downlink grant in slot 4. UE 115 may determine that a downlink data transmission is currently scheduled to be received in slot 4 (based on K0_0=3). UE 115 may switch from K0_0 to the default K0_1 (e.g., K0_1=1) and may receive the second scheduled downlink data transmission in the first slot that does not overlap with slot 4 (e.g., slot 5).

In some examples, the triggering condition may be a number of scheduling grants received within a number of consecutive slots. For instance, UE 115 may transition from K0_0 to K0_1 on CC2 if a scheduling grant is received from base station 105 on CC1 in a threshold number of consecutive slots. That is, if in N consecutive slots, a downlink grant is received in each of them, then UE 115 may transition from K0_0 to K0_1. In some examples, UE 115 may transition from K0_0 to K0_1 if a scheduling grant is received in a threshold number of slots within a window of consecutive slots. That is, if M downlink grants are received in N consecutive slots, then UE 115 may transition from K0_0 to K0_1.

In some examples, a PDSCH scheduled with K0_0 may be a dummy grant. For instance, UE 115 may receive a dummy grant in slot 1. The dummy grant may wake up UE 115 so that it exits the low power mode, but may not actually indicate a downlink data transmission. Upon waking up and exiting the low power mode in slot 4 according to K0_0=3, UE 115 may transition to K0_1, and may receive subsequent downlink data transmissions in slots determined by K0_1.

In some examples, an active K0 threshold may be configured for each CC that is configured to be cross-carrier scheduled. In some examples, there may be a blackout period for scheduling to CC2 on CC1. That is, during blackout period 930, base station 105 may refrain from scheduling CC2 on CC1, subject to K0_0. When base station 105 sends a downlink grant in slot 1 on CC1, scheduling UE 115 to receive a downlink data transmission in slot 4 per K0_0=3, then base station 105 may refrain from sending downlink grants during slot 2 and slot 3, where UE 115 and base station 105 may transition from K0_0 to K0_1.

In some examples, smaller K0_1 values may be restricted, or another K0 value (e.g., K0_2) may be included as well. K0_2 may be used for self-scheduling. In some examples, two or more K0 values (e.g., K0_1, K0_2, and K0_3) may support dynamically switching between cross-carrier scheduling and self-scheduling, which is discussed in greater detail with respect to FIG. 11. K0_1 and K0_0 may have different values (e.g., K0_0=3 and K0_1=1) or may have the same value. In some cases, cross-carrier scheduling with K0_1 may be skipped.

Figure 10:
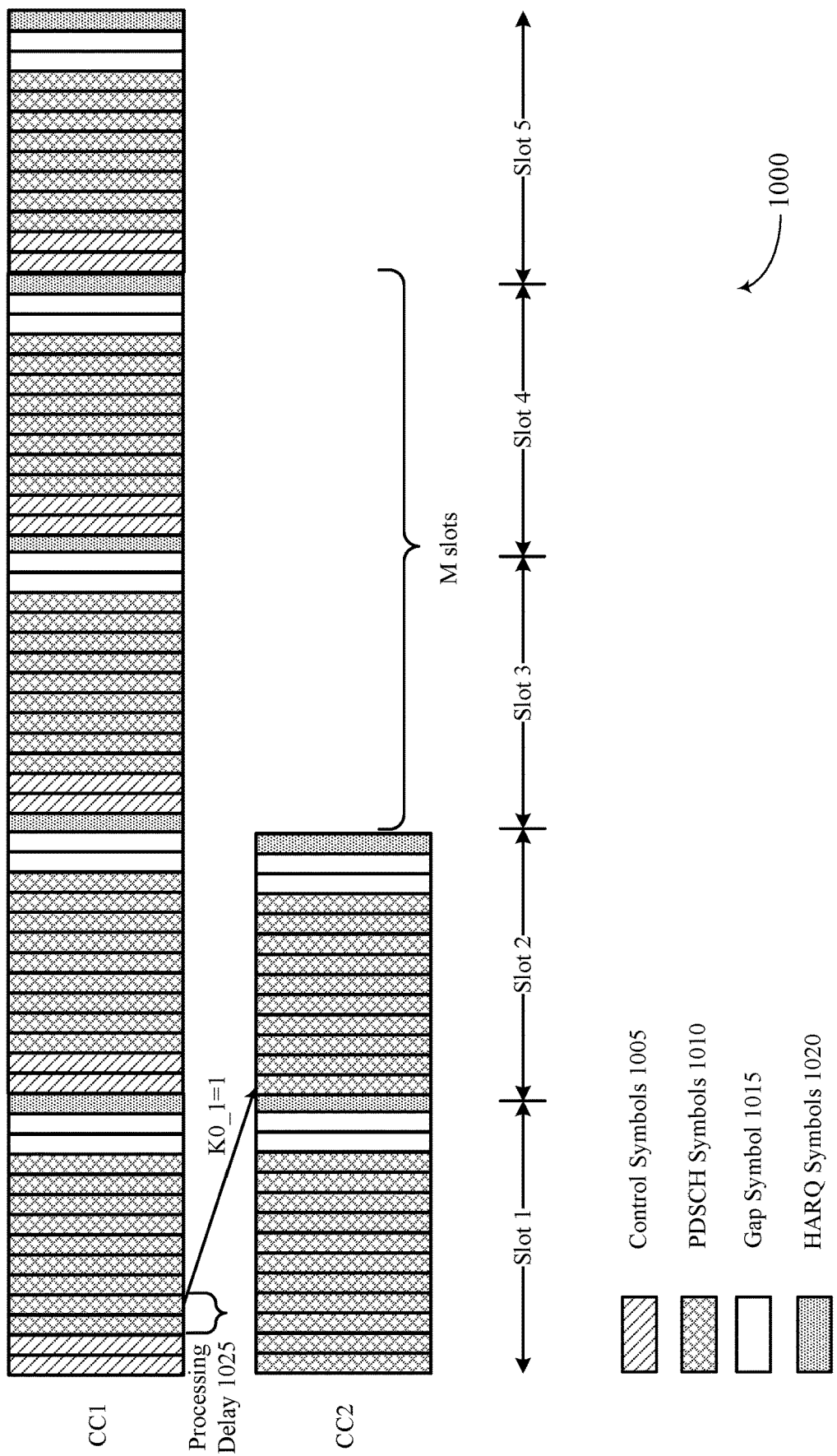
FIG. 10 illustrates an example of a CC configuration that supports cross-carrier scheduling enhancements in NR in accordance with aspects of the present disclosure.

FIG. 10 illustrates an example of a CC configuration 1000 that supports cross-carrier scheduling enhancements in NR in accordance with aspects of the present disclosure. In some examples, CC configuration 1000 may implement aspects of wireless communications system 100. Aspects of CC configuration 1000 may be implemented by a base station 105 and a UE 115, which may be examples of similar devices described with respect to wireless communications systems 100 and 200.

In some cases, UE 115 and base station 105 may transition from K0_0 to K0_1 for a given scheduled CC. In some examples, CC1 may be a scheduling carrier, and CC2 may be a scheduled carrier. UE 115 may receive a downlink grant on control symbols 1005 of CC1 indicating a downlink data transmission on PDSCH symbols 1010 on CC2. CC2 may also include gap symbols 1015, and HARQ symbols 1020. Processing delay 1025 may represent the time UE 115 needs to process a PDCCH on control symbols 1005.

In some examples, when operating an active K0 K0_1 (e.g., K0_1=1), UE 115 may be constantly prepared to be scheduled by CC1 with a small K0 value K0_1 for CC2. In some examples, UE 115 may initiate micro sleep in cases of cross-slot scheduling. However, in many cases, UE 115 may remain in active mode for all or most of the time when the active K0 value is K0_1.

In some cases, UE 115 and base station 105 may initiate a switch between K0_1 and K0_0 based on a triggering condition. The triggering condition may be the expiration of an inactivity timer. After consecutive M slots of no scheduling to CC2 on CC1, UE 115 and base station 105 may transition to the larger K0_0. For instance, if M=2, and UE 115 and base station 105 are operating with active K0_1=1, UE 115 may receive a grant in slot 1 on control symbols 1005 and may receive a corresponding downlink data transmission in slot 2. However, UE 115 may receive no downlink grant in slot 3 or slot 4. Because M=2 slots, the inactivity timer may expire and UE 115 and base station 105 may switch to K0_1=1 in slot 5. In this condition, UE 115 may consider a downlink grant to be a dummy grant. In some cases, instead of waiting for the expiration of a timer, UE 115 and base station 105 may switch between K0_0 and K0-1 when UE 115 receives a command to switch from base station 105. The switch may be explicitly signaled in DCI or MAC CE.

Figure 11:
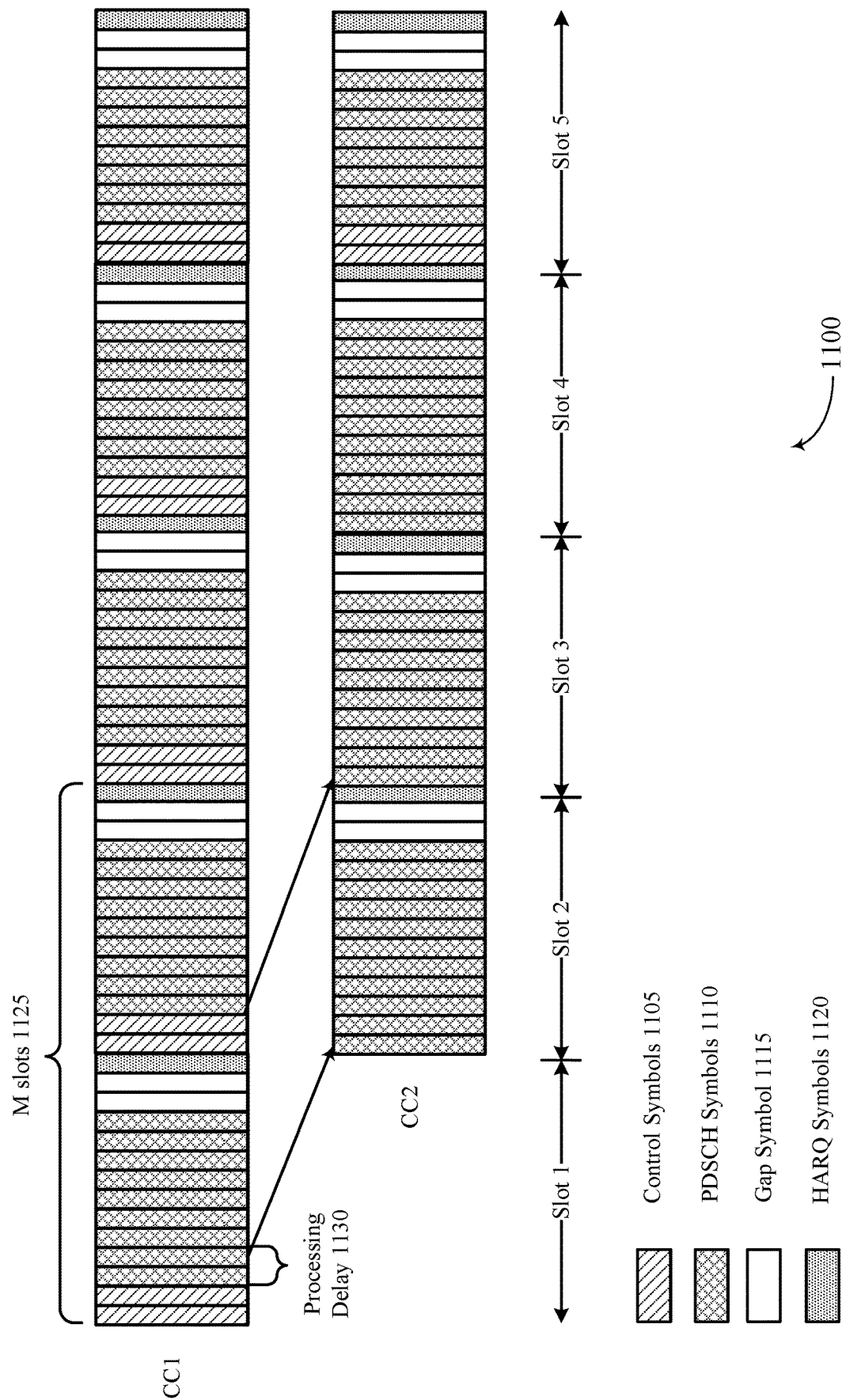
FIG. 11 illustrates an example of a CC configuration that supports cross-carrier scheduling enhancements in NR in accordance with aspects of the present disclosure.

FIG. 11 illustrates an example of a CC configuration 1100 that supports cross-carrier scheduling enhancements in NR in accordance with aspects of the present disclosure. In some examples, CC configuration 1100 may implement aspects of wireless communications system 100. Aspects of CC configuration 1100 may be implemented by a base station 105 and a UE 115, which may be examples of similar devices described with respect to wireless communications systems 100 and 200.

In some examples, UE 115 and base station 105 may switch a CC between cross-carrier scheduling mode and self-scheduling mode. In some examples, CC1 may be a scheduling carrier, and CC2 may be a scheduled carrier. UE 115 may receive a downlink grant on control symbols 1105 of CC1 indicating a downlink data transmission on PDSCH symbols 1110 on CC2. CC2 may also include gap symbols 1115, and HARQ symbols 1120. Processing delay 1130 may represent the time UE 115 needs to process a PDCCH on control symbols 1105.

In some examples, switching between cross-carrier scheduling mode and self-scheduling mode may be based on a triggering condition. In some examples, switching between cross-carrier scheduling mode and self-scheduling mode may allow base station 105 to cross-carrier schedule UE 115 when downlink data transmissions are relatively uncommon, or bursty. However, when downlink data traffic increases, it may be beneficial to switch to self-scheduling mode. For instance, UE 115 and base station 105 may switch from cross-carrier scheduling mode to self-scheduling mode based on a consecutive N number of slots that send downlink grants on CC1 that schedule downlink data transmissions on CC2. Base station 105 may transmit a downlink grant on control symbols 1105 of CC1 in slot 1, and another downlink grant on control symbols 1105 of CC1 in slot 2, scheduling respective downlink data transmissions on PDSCH symbols 1110 on CC2 in slot 2 and slot 3. If the condition is met during M slots 1125 (e.g., a downlink grant was transmitted in M=2 consecutive slots) then base station and UE 115 may switch CC2 from cross-carrier scheduling mode to self-scheduling mode.

In some examples, the trigger condition may also include transmitting, from UE 115 to base station 105 on CC2, HARQ acknowledgement (ACK) signals. For instance, UE 115 may receive the downlink grants on CC1 in slot 1 and slot 2, and may receiving respective downlink data transmissions in slot 2 and slot 3. UE 115 may transmit an ACK signal on HARQ symbol 1120 of slot 2 and another ACK signal on HARQ symbol 1120 of slot 3 corresponding to the first downlink grant in slot 1 and the second downlink grant in slot 2, respectively. Upon successful transmission and reception of the ACK signals, base station 105 and UE 115 may transition to self-scheduling on CC2.

In some examples, the transition to self-scheduling make take place a pre-defined number of slots after the condition is met. For instance, where the consecutive slot scheduling of M=2 is met during slot 2, the transition may occur 2 slots later during slot 5. At slot 5, base station 105 may send a downlink grant on control symbols 1105 of CC2, and UE 115 may receive the downlink grant and the corresponding downlink data transmission during slot 5. IN some examples, upon transitioning to a self-scheduling mode on CC2, the search space on CC2 may be activated upon switching.

When operating in a self-scheduling mode, CC2 may utilize a third K0 value (e.g., K0_2). K0_2 may be, for example, equal to 0, because the buffering requirements may be more easily met in a self-scheduling mode. In some examples, instead of switching between cross-carrier scheduling mode and self-scheduling mode based on a period of no scheduling (e.g., M slots 1125), the transition can be explicitly signaled by DCI signal, a media access control (MAC) control element (MAC-CE) signal, an RRC signal, or the like.

Figure 12:
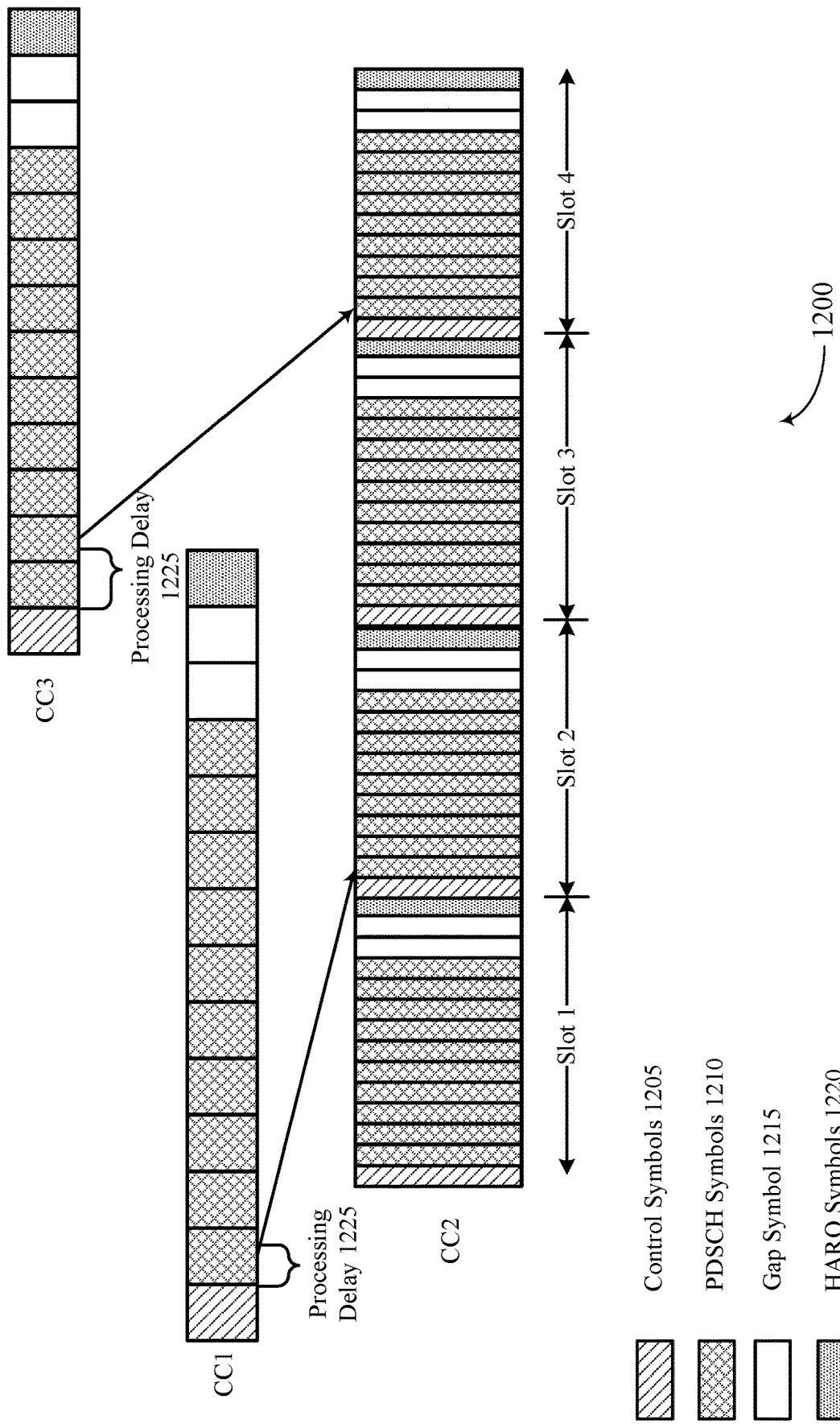
FIG. 12 illustrates an example of a CC configuration that supports cross-carrier scheduling enhancements in NR in accordance with aspects of the present disclosure.

FIG. 12 illustrates an example of a CC configuration 1200 that supports cross-carrier scheduling enhancements in NR in accordance with aspects of the present disclosure. In some examples, CC configuration 1200 may implement aspects of wireless communications system 100. Aspects of CC configuration 1200 may be implemented by a base station 105 and a UE 115, which may be examples of similar devices described with respect to wireless communications systems 100 and 200.

In some examples, UE 115 and base station 105 may switch a CC between cross-carrier scheduling mode and self-scheduling mode. In some examples, CC1 may be a scheduling carrier, and CC2 may be a scheduled carrier. UE 115 may receive a downlink grant on control symbols 1205 of CC1 indicating a downlink data transmission on PDSCH symbols 1210 on CC2. CC2 may also include gap symbols 1215, and HARQ symbols 1220. Processing delays 1225 may represent the time UE 115 needs to process a PDCCH on control symbols 1205.

In some examples, cross-carrier scheduling may be semi-statically enabled or configured (e.g., via RRC signaling or the like). A scheduling CC and a scheduled CC may be paired such that they are one-to-one and fixed. A CC may be configured to be cross-carrier scheduled by another CC, and in such cases the scheduled CC may not monitor a downlink control channel on its one CC. In some cases, a common search space (CSS) may include a group common signal.

In some examples, multiple scheduling CCs may cross-schedule a single scheduled CC (e.g., many-to-one cross-carrier scheduling). For instance, CC1 and CC3 may be scheduling carriers, and CC2 may be a scheduled carrier capable of being scheduled by both or either of CC1 and CC3. In some examples, on a scheduling CC1, the search space (SS) for cross-scheduling CC2 may be configured separately, and may have a longer or shorter periodicity.

In some examples, CC2 may support both self-scheduling and cross-carrier scheduling. UE 115 may receive, for example, a downlink grant from base station 105 on control symbols 1205 of CC1, and on control symbols 1205 of CC2.

In such cases, UE 115 may resolve the potentially conflicting scheduling information. In one example, UE 115 may receive first stage control information in the downlink grant on CC1 and second stage control information in the downlink grant on CC2. In some examples, a downlink grant received on a scheduling carrier (e.g., CC1 or CC3) may be a dummy grant, which may initiate self-scheduling on CC2 or provide other useful information. However, the dummy grant may not include actual scheduling information. Instead, UE 115 may receive a downlink grant on the control symbols 1205 of CC2. In some examples, one grant may override the other. For instance, UE 115 may receive a downlink data transmission corresponding to the downlink grant that was received first in time, last in time, or as explicitly indicated by the base station or as preconfigured. In some examples, the first and second downlink grants received respectively on CC1 and CC2 may provide redundancy and validation. That is, the same downlink grant may be included on both CC1 and on CC2, and may both indicate the same downlink grant. If one of the two grants is not successfully received or decoded by UE 115, UE 115 may utilize the other of the two grants to ensure successfully reception of the grant and the corresponding downlink data transmission. Each of the above described methods and techniques for resolving conflicting control information may be applied for conflicting grants between self-scheduling and cross-carrier scheduling as well as conflicting grants between CC1 and C3.

Figure 13:
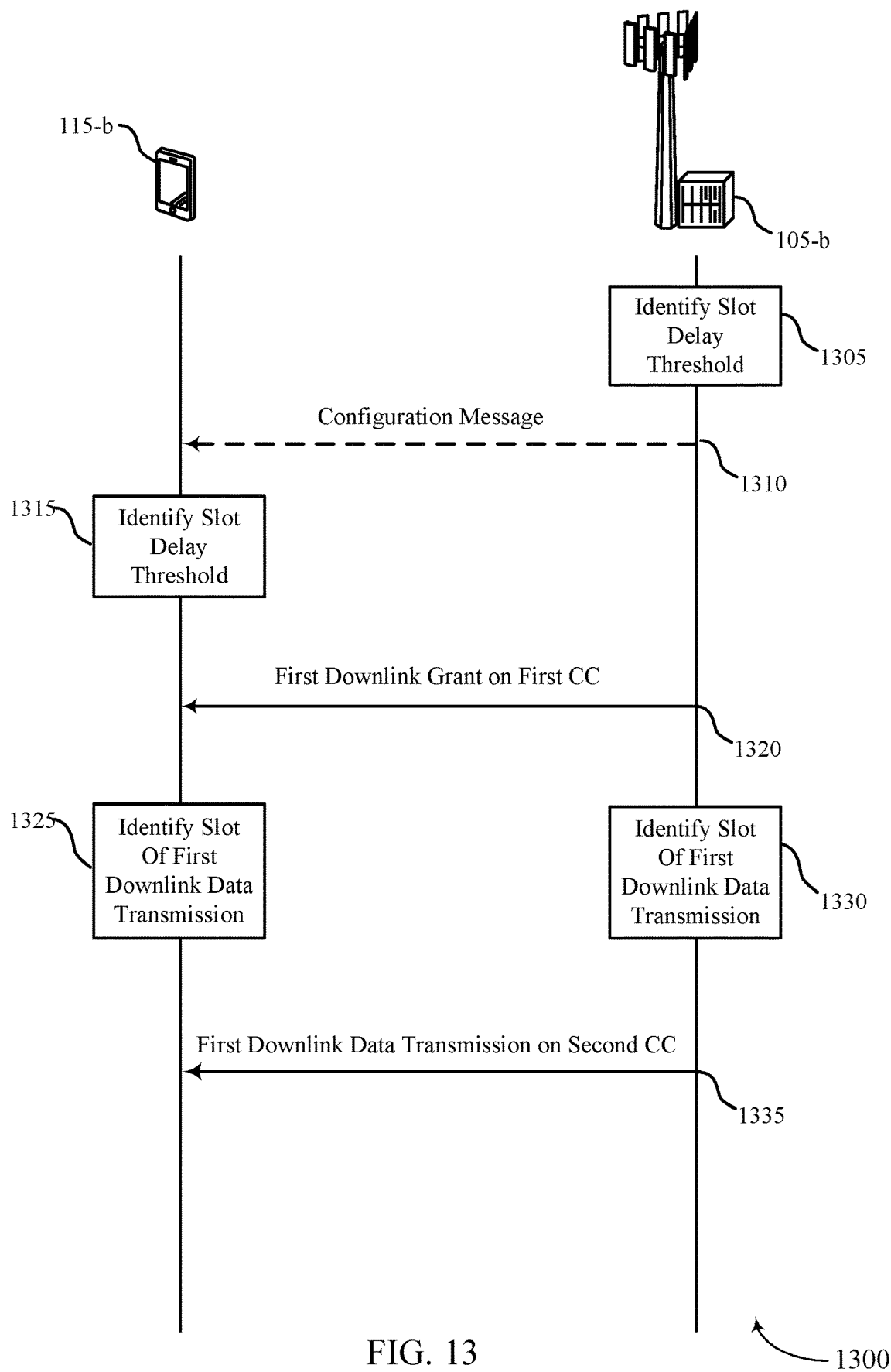
FIG. 13 illustrates an example of process flow that supports cross-carrier scheduling enhancements in NR in accordance with aspects of the present disclosure.

FIG. 13 illustrates an example of a process flow 1300 that supports cross-carrier scheduling enhancements in NR in accordance with aspects of the present disclosure. In some examples, process flow 1300 may implement aspects of wireless communications system 100. Aspects of process flow 1300 may be implemented by a base station 105 and a UE 115, which may be examples of similar devices described with respect to wireless communications systems 100 and 200

At 1305, base station 105-*b* may identify a minimum scheduling delay. The minimum scheduling delay may be the minimum K0 threshold. In some examples, the K0 or minimum scheduling delay values may be standardized (e.g., may be based on one or more values which are predefined by a specification). Such definitions may include rule-based or table-based values.

At 1310, in some cases, base station 105-*b* may transmit a configuration message to UE 115-*b*. UE 115-*b* may receive the configuration message. The configuration message may indicate the slot delay threshold. The configuration message at 1310 may be transmitted once, or multiple times. The configuration message may be transmitted statically (e.g., in system information (SI), semi-statically (e.g., in an RRC signal), or dynamically (e.g., in a DCI).

In some examples, the configuration message may include a first slot delay parameter (e.g., a default or initial K0 value). The slot delay parameter may indicate a minimum number of slots between the slot that carries the first downlink grant and a corresponding downlink data transmission. In other examples, the slot delay parameter may be included in the first downlink grant or another downlink grant.

At 1315, UE 115-*b* may identify the minimum scheduling delay. The identifying may be performed when a numerology of a first component carrier is different than a numerology of a second component carrier, wherein the first component carrier and the second component carrier are included in a carrier aggregation configuration of the UE. That is, a first numerology may include a first subcarrier spacing (SCS) or tone duration, a first TTI duration, or both, and the second numerology may include a second SCS or tone duration, a second TTI duration, or both. In some examples, the identifying may be based on the received configuration message at 1310. In some examples, identifying the minimum scheduling delay may be based on a number of downlink control symbols of the first CC or a subcarrier spacing of the second CC, or other component carriers. In some examples, identifying the minimum scheduling delay may include switching the minimum scheduling delay from a first value to a second value in response to a triggering condition.

At 1320, base station 105-*b* may transmit a first downlink grant on the first CC. The first CC may be a scheduling CC. The first downlink grant may indicate a first downlink data transmission on the second CC (e.g., a scheduled CC).

At 1325 and 1330, UE 115-*b* and base station 105-*b* may identify a slot of the first downlink data transmission based at least in part on the first downlink grant and the minimum scheduling delay. In some examples, identifying the slot of the first downlink data transmission may include determining that the received slot delay parameter satisfies the minimum scheduling delay. In other examples, the identifying of 1325 and 1330 may include receiving a second downlink grant indicating a second downlink data transmission on the second CC and a second slot delay parameter associated with the second downlink data transmission, determining that the second slot delay parameter does not satisfy the minimum scheduling delay, and ignoring at least a portion of the second downlink grant based at least in part on the determining. That is, UE 115-*b* may ignore part or all of a second DCI if the K0 value (slot delay parameter) corresponding to the DCI does not satisfy the minimum scheduling delay.

In some examples, identifying the slot may include receiving a second downlink grant indicating a second downlink data transmission on the second CC and a second slot delay parameter associated with the second downlink data transmission, determining that the second slot delay parameter does not satisfy the minimum scheduling delay, and identifying a slot of the second downlink data transmission as a timing (e.g., an earliest slot) that satisfies the minimum scheduling delay following the second downlink grant.

In some examples, identifying the slot may include determining a sum of the minimum scheduling delay and the first timing delay parameter. In some examples, the first timing delay parameter is with reference to a last symbol of a physical downlink control channel carrying the first downlink grant on the first CC, and identifying the slot may be based on the first timing delay parameter. In some examples, minimum scheduling delay comprises a minimum value resulting in the slot of the first downlink data transmission being different from a slot of the first downlink grant.

At 1335, base station 105-*b* may transmit the first downlink data transmission on the second CC in the identified slot in accordance with the first downlink grant. Receiving the downlink data transmission on the second CC may be based on identifying the appropriate slot at 1325 and 1330.

Figure 14:
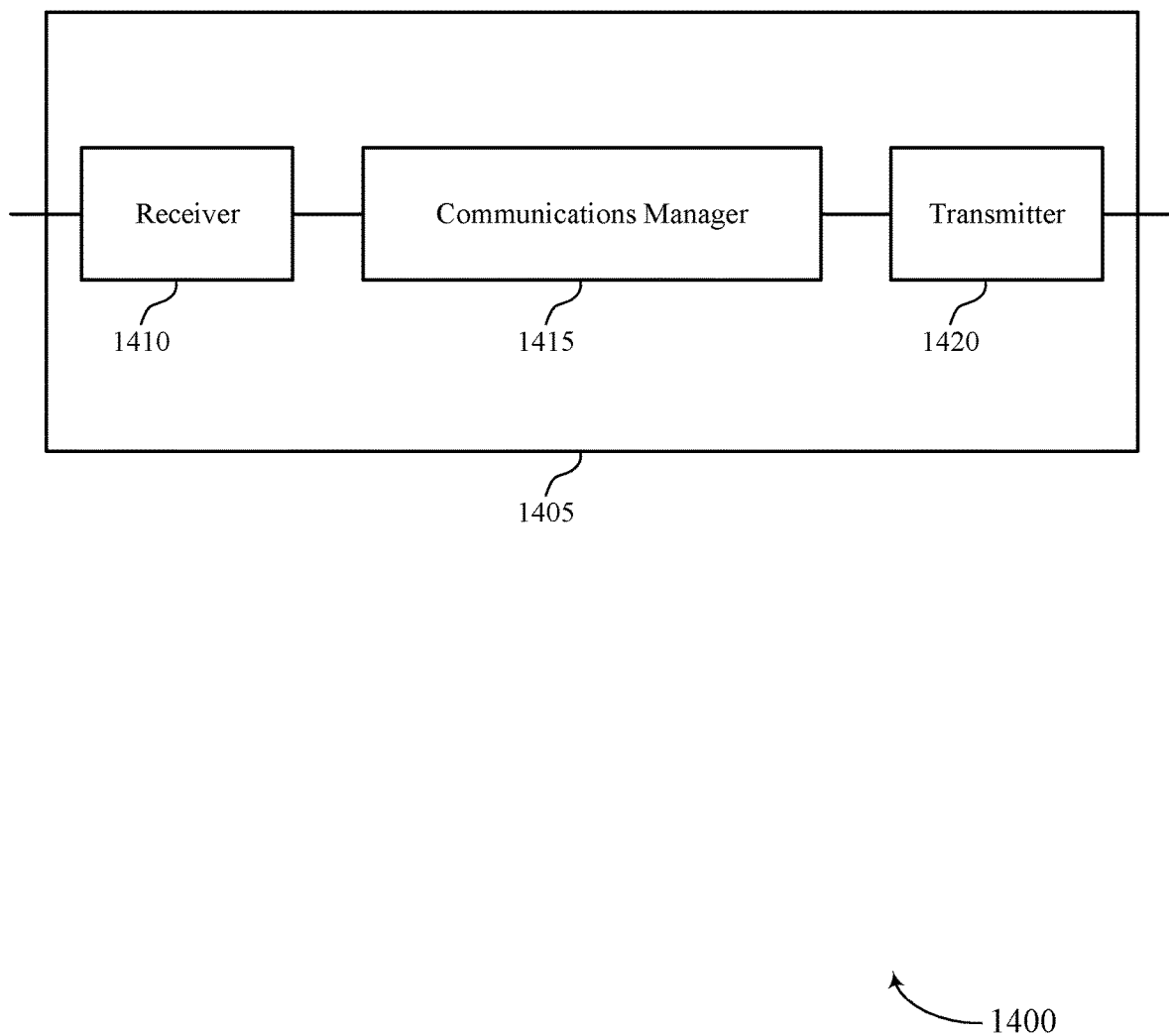
FIGS. 14 and 15 show block diagrams of devices that support cross-carrier scheduling enhancements in NR in accordance with aspects of the present disclosure.

FIG. 14 shows a block diagram 1400 of a device 1405 that supports cross-carrier scheduling enhancements in NR in accordance with aspects of the present disclosure. The device 1405 may be an example of aspects of a UE 115 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related cross-carrier scheduling enhancements in NR, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify a minimum scheduling delay when a numerology of a first component carrier is different than a numerology of a second component carrier, wherein the first component carrier and the second component carrier are included in a carrier aggregation configuration of the UE, receive, on the first CC, a first downlink grant indicating a first downlink data transmission on the second CC, identify a timing of the first downlink data transmission on the second component carrier based at least in part on the first downlink grant, wherein the identified timing is at least the minimum scheduling delay after a timing of the downlink grant received on the first component carrier, and receive the first downlink data transmission on the second component carrier during the identified timing of the first downlink data transmission in accordance with the first downlink grant. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
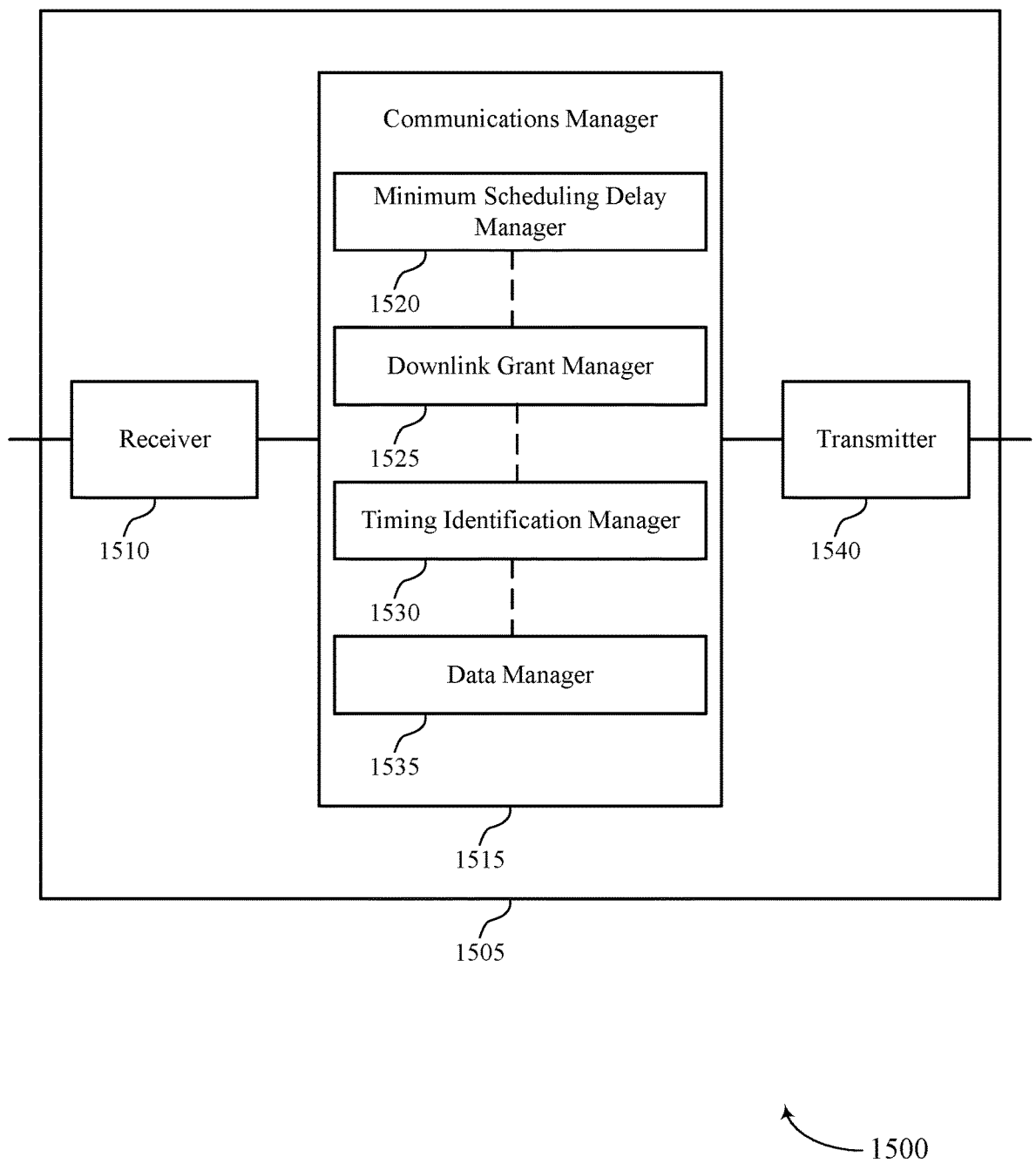

FIG. 15 shows a block diagram 1500 of a device 1505 that supports cross-carrier scheduling enhancements in NR in accordance with aspects of the present disclosure. The device 1505 may be an example of aspects of a device 1405 or a UE 115 as described herein. The device 1505 may include a receiver 1510, a communications manager 1515, and a transmitter 1540. The device 1505 may also include a processor. Each of these components may be in communication with one another (e.g., via one or more buses).

The receiver 1510 may receive information such as packets, user data, or control information associated with various information channels (e.g., control channels, data channels, and information related cross-carrier scheduling enhancements in NR, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a minimum scheduling delay manager 1520, a downlink grant manager 1525, a timing identification manager 1530, and a data manager 1535. The communications manager 1515 may be an example of aspects of the communications manager 1710 described herein.

The minimum scheduling delay manager 1520 may identify a minimum scheduling delay when a numerology of a first component carrier is different than a numerology of a second component carrier, wherein the first component carrier and the second component carrier are included in a carrier aggregation configuration of the UE. The downlink grant manager 1525 may receive, on the first CC, a first downlink grant indicating a first downlink data transmission on the second CC. The timing identification manager 1530 may identify a timing of the first downlink data transmission on the second component carrier based at least in part on the first downlink grant, wherein the identified timing is at least the minimum scheduling delay after a timing of the downlink grant received on the first component carrier. The data manager 1535 may receive the first downlink data transmission on the second CC during the identified timing of the first downlink data transmission in accordance with the first downlink grant.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
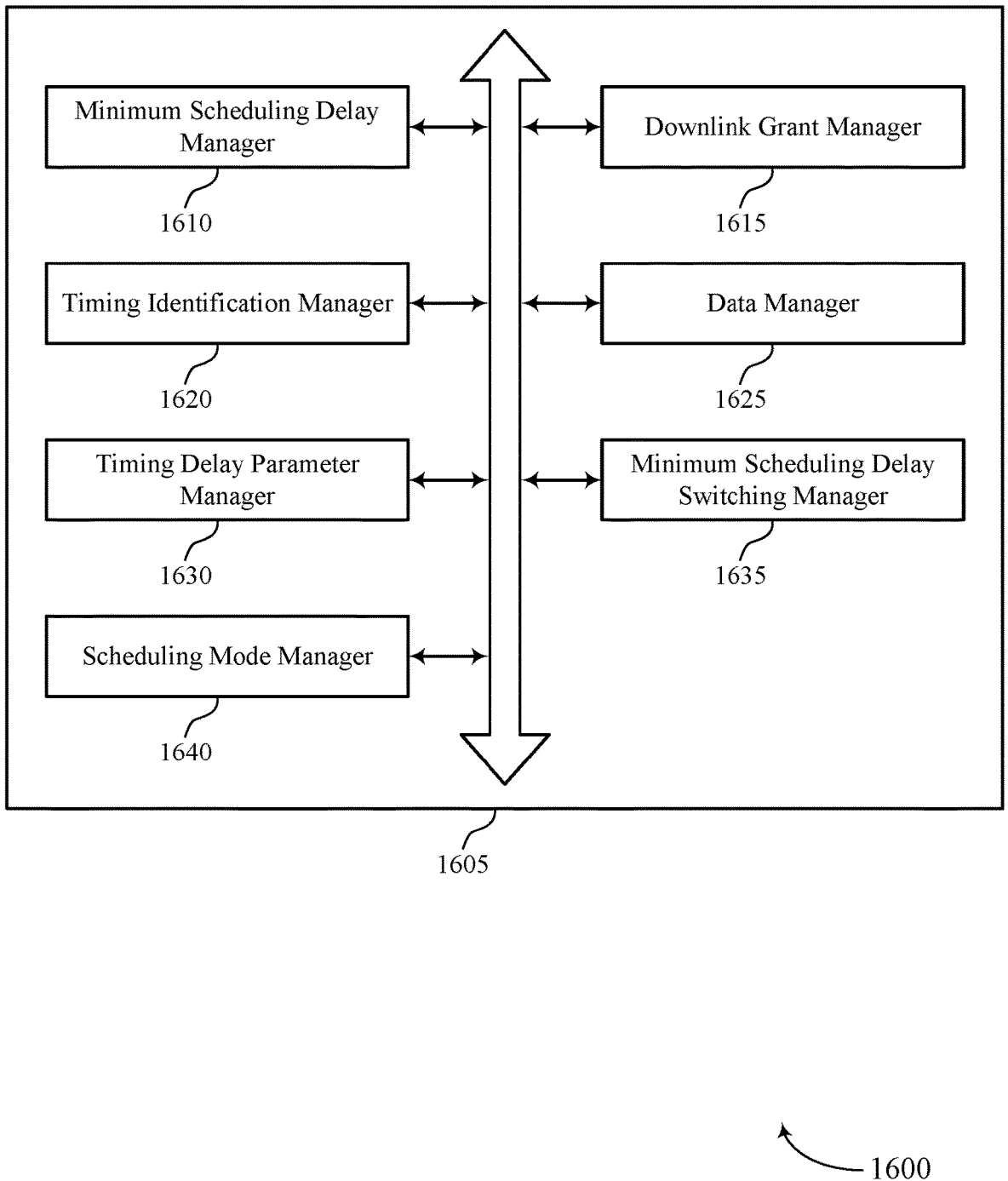
FIG. 16 shows a block diagram of a communications manager that supports cross-carrier scheduling enhancements in NR in accordance with aspects of the present disclosure.

FIG. 16 shows a block diagram 1600 of a communications manager 1605 that supports cross-carrier scheduling enhancements in NR in accordance with aspects of the present disclosure. The communications manager 1605 may be an example of aspects of a communications manager 1415, a communications manager 1515, or a communications manager 1710 described herein. The communications manager 1605 may include a minimum scheduling delay manager 1610, a downlink grant manager 1615, a timing identification manager 1620, a data manager 1625, a timing delay parameter manager 1630, a minimum scheduling delay switching manager 1635, and a scheduling mode manager 1640. Each of these modules may communicate, directly or indirectly, with one another (e.g., via one or more buses).

The minimum scheduling delay manager 1610 may identify a minimum scheduling delay when a numerology of a first component carrier is different than a numerology of a second component carrier, wherein the first component carrier and the second component carrier are included in a carrier aggregation configuration of the UE. In some examples, the minimum scheduling delay manager 1610 may receive a configuration message indicating the minimum scheduling delay. In some examples, the minimum scheduling delay manager 1610 may identify a preconfigured value indicating the minimum scheduling delay based, at least in part, on SCS spacing of the first component carrier. In some examples, the minimum scheduling delay manager 1610 may determine that the second timing delay parameter does not satisfy the minimum scheduling delay.

In some cases, a number of downlink control symbols of the first CC or a subcarrier spacing of the second CC or other component carriers. In some cases, the minimum scheduling delay is based on a modem reconfiguration latency associated with transitioning a wireless modem from a low power state to a higher power state capable of supporting data reception on the second CC. In some cases, the minimum scheduling delay is specific to the second CC.

The downlink grant manager 1615 may receive, on the first CC, a first downlink grant indicating a first downlink data transmission on the second CC. In some examples, the downlink grant manager 1615 may receive a second downlink grant indicating a second downlink data transmission on the second CC and a second timing delay parameter associated with the second downlink data transmission. In some examples, the downlink grant manager 1615 may ignore at least a portion of the second downlink grant based on the determining.

In some examples, the downlink grant manager 1615 may receive, on the second CC, a second downlink grant indicating a second downlink data transmission on the second CC, where receiving the first downlink data transmission on the second CC is based on the first downlink grant, or the second downlink grant, or a combination thereof. In some examples, the downlink grant manager 1615 may identify first stage control information in the first downlink grant and second stage control information in the second downlink grant, where receiving the first downlink data transmission is based on the first stage control information and the second stage control information.

In some examples, the downlink grant manager 1615 may identify the first downlink grant as a dummy grant, where receiving the first downlink data transmission is based on the second downlink grant. In some examples, the downlink grant manager 1615 may override the first downlink grant, where receiving the first downlink data transmission is based on the second downlink grant. In some examples, the downlink grant manager 1615 may identify the second downlink grant as redundant. In some examples, the downlink grant manager 1615 may validate the first downlink grant based on the second downlink grant. In some examples, the downlink grant manager 1615 may receive, on a third CC, a third downlink grant indicating a third downlink data transmission on the second CC, where receiving the first downlink data transmission on the second CC is based on the first downlink grant, or the second downlink grant, or the third downlink grant, or a combination thereof.

The timing identification manager 1620 may identify a slot of the first downlink data transmission based on the first downlink grant and the minimum scheduling delay. In some examples, the timing identification manager 1620 may identify a slot of the second downlink data transmission as an earliest slot that satisfies the minimum scheduling delay following the second downlink grant. In some examples, the timing identification manager 1620 may identify the slot of the first downlink data transmission is based on the minimum scheduling delay or the first timing delay parameter.

The data manager 1625 may receive the first downlink data transmission on the second CC during the identified timing of the first downlink data transmission in accordance with the first downlink grant. In some examples, the data manager 1625 may receive the second downlink data transmission during the identified timing of the second downlink data transmission in accordance with the second downlink grant.

The timing delay parameter manager 1630 may receive a first timing delay parameter associated with the first downlink data transmission. In some examples, the timing delay parameter manager 1630 may determine that the first timing delay parameter satisfies the minimum scheduling delay. In some examples, the timing delay parameter manager 1630 may determine that the second timing delay parameter does not satisfy the minimum scheduling delay. In some cases, the timing delay parameter is with reference to a last symbol of a physical downlink control channel carrying the first downlink grant on the first CC. In some cases, the minimum scheduling delay includes a minimum value resulting in the slot of the first downlink data transmission being different from a slot of the first downlink grant.

The minimum scheduling delay switching manager 1635 may switch the minimum scheduling delay from a first value to a second value in response to a triggering condition. In some examples, the minimum scheduling delay switching manager 1635 may receive the first downlink grant or receiving a wakeup downlink grant. In some cases, the condition includes an expiration of an inactivity timer.

The scheduling mode manager 1640 may identify a triggering condition. In some examples, the scheduling mode manager 1640 may switch between a cross-carrier scheduling mode and a self-scheduling mode based on the triggering condition. In some examples, the triggering condition may include receiving downlink grants for the second CC subsequent to the first downlink grant on the first CC for a threshold number of consecutive slots, and where the switching includes switching from the cross-carrier scheduling mode to the self-scheduling mode for the second component carrier. In some examples, the triggering condition may include receiving a threshold number of downlink grants for the second CC subsequent to the first downlink grant on the first CC during timing window including a threshold number of slots, and where the switching includes switching from the cross-carrier scheduling mode to the self-scheduling mode for the second component carrier.

In some examples, the scheduling mode manager 1640 may operate in the cross-carrier scheduling mode based on the switching. In some examples, the scheduling mode manager 1640 may receive, in a carrier indication field (CIF) of a DCI signal, carrier information indicating that the first CC is a scheduling CC. In some examples, the scheduling mode manager 1640 may operate in the self-scheduling mode based on the switching. In some examples, the scheduling mode manager 1640 may receive, in a CIF of a DCI signal, carrier information indicating that the second CC is a scheduling CC for the second CC. In some cases, the triggering condition includes a HARQ signal. In some cases, the triggering condition includes an absence of downlink grants during a threshold number of slots for the second CC which is in the self-scheduling mode, and where the switching includes switching from the self-scheduling mode to the cross-carrier scheduling mode. In some cases, the triggering condition includes a DCI signal, an RRC signal, or a MAC control element (MAC-CE).

Figure 17:
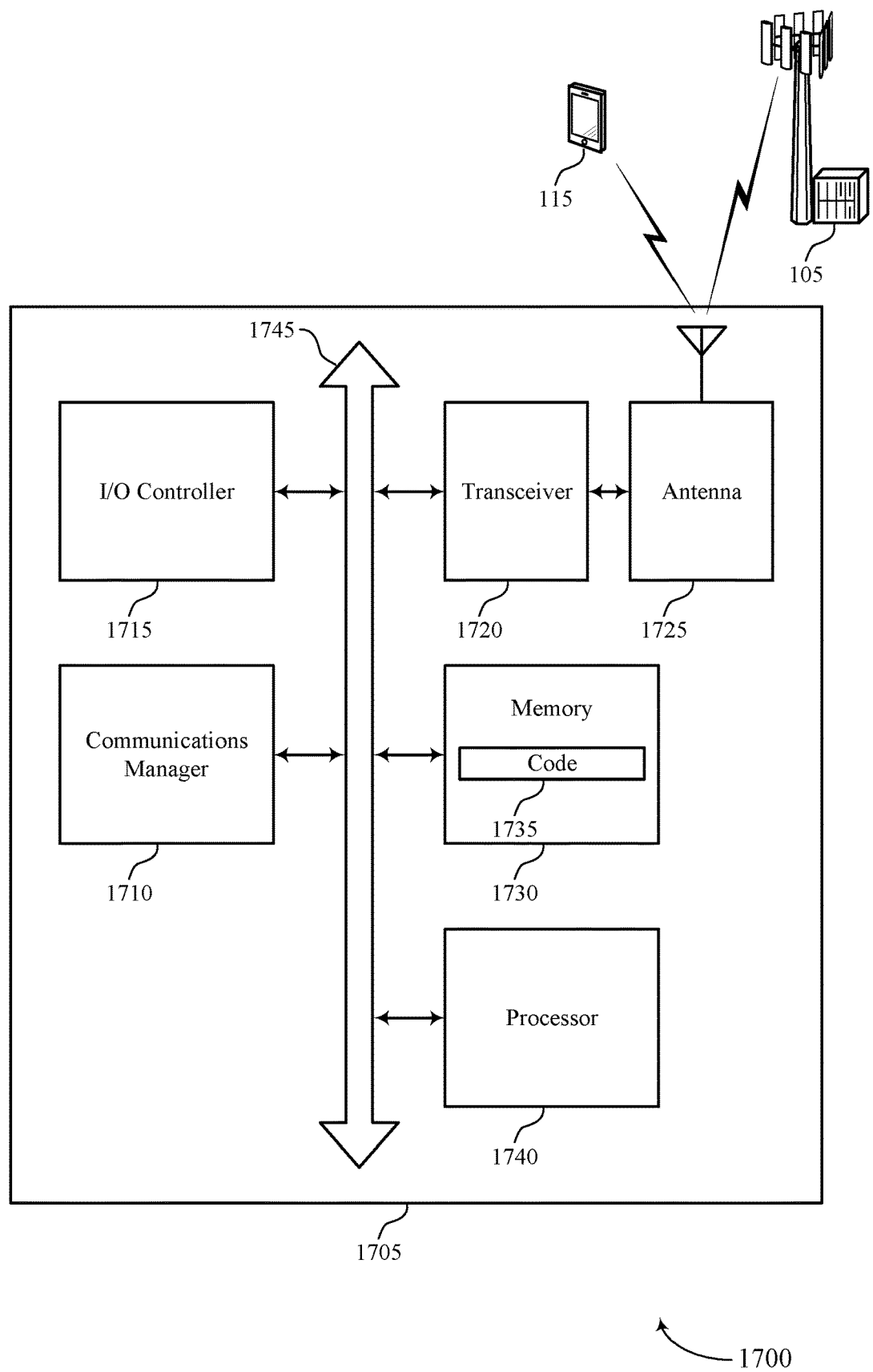
FIG. 17 shows a diagram of a system including a device that supports cross-carrier scheduling enhancements in NR in accordance with aspects of the present disclosure.

FIG. 17 shows a diagram of a system 1700 including a device 1705 that supports cross-carrier scheduling enhancements in NR in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may identify a minimum scheduling delay when a numerology of a first component carrier is different than a numerology of a second component carrier, wherein the first component carrier and the second component carrier are included in a carrier aggregation configuration of the UE, receive, on the first CC, a first downlink grant indicating a first downlink data transmission on the second CC, identify a timing of the first downlink data transmission on the second component carrier based at least in part on the first downlink grant, wherein the identified timing is at least the minimum scheduling delay after a timing of the downlink grant received on the first component carrier, and receive the first downlink data transmission on the second CC during the identified timing of the first downlink data transmission in accordance with the first downlink grant.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include random-access memory (RAM) and read-only memory (ROM). The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting cross-carrier scheduling enhancements in NR).

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
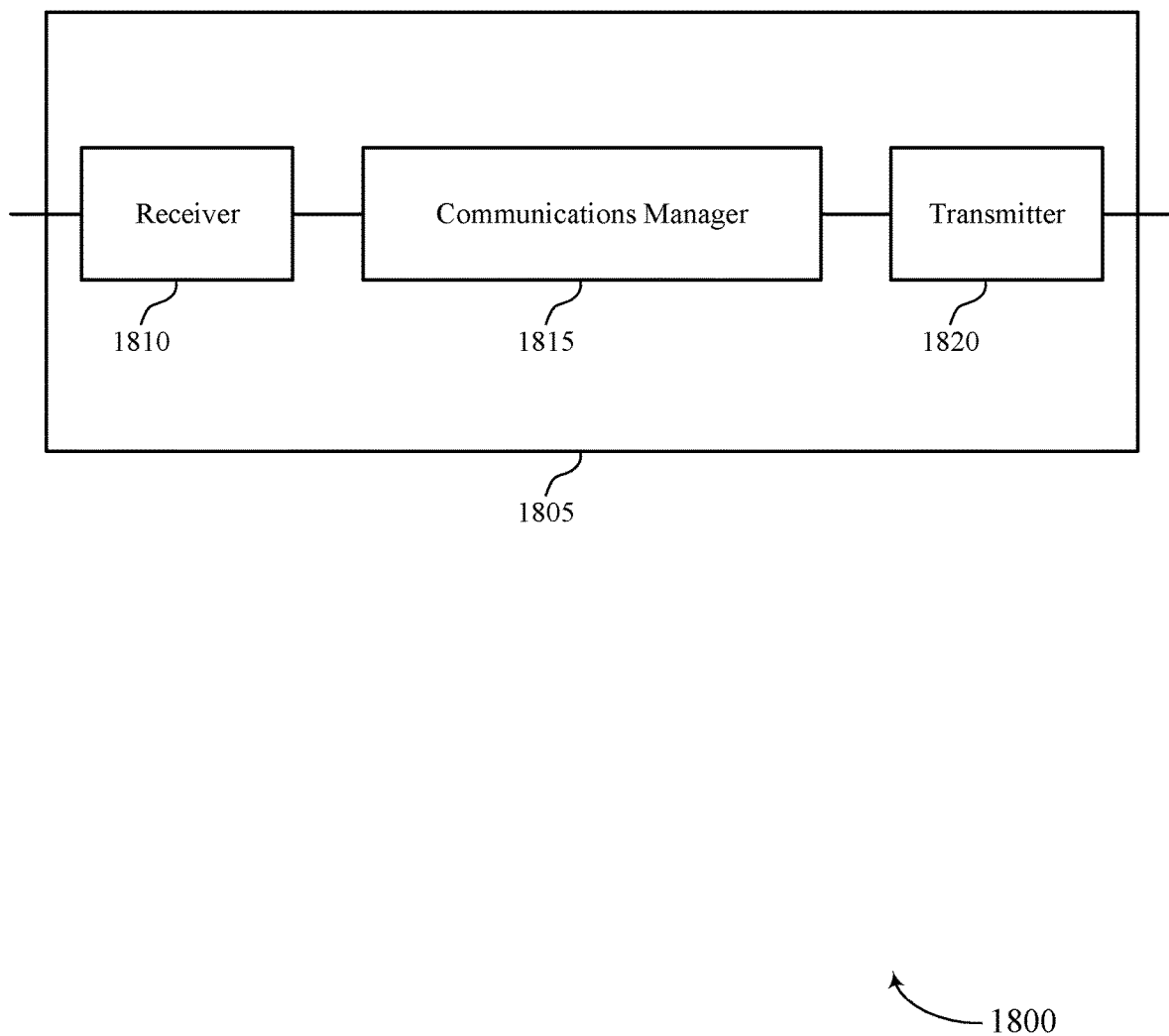
FIGS. 18 and 19 show block diagrams of devices that support cross-carrier scheduling enhancements in NR in accordance with aspects of the present disclosure.

FIG. 18 shows a block diagram 1800 of a device 1805 that supports cross-carrier scheduling enhancements in NR in accordance with aspects of the present disclosure. The device 1805 may be an example of aspects of a base station 105 as described herein. The device 1805 may include a receiver 1810, a communications manager 1815, and a transmitter 1820. The device 1805 may also include a processor. Each of these components may be in communication with one another (e.g., via one or more buses).

The receiver 1810 may receive information such as packets, user data, or control information associated with various information channels (e.g., control channels, data channels, and information related cross-carrier scheduling enhancements in NR, etc.). Information may be passed on to other components of the device 1805. The receiver 1810 may be an example of aspects of the transceiver 2120 described with reference to FIG. 21. The receiver 1810 may utilize a single antenna or a set of antennas.

The communications manager 1815 may identify a minimum scheduling delay, when a numerology of a first component carrier is different than a numerology of a second component carrier, wherein the first component carrier and the second component carrier are included in a carrier aggregation configuration of the UE, transmit, on the first CC, a first downlink grant indicating a first downlink data transmission on the second CC, identifying a timing of the first downlink data transmission on the second component carrier based at least in part on the first downlink grant and the minimum scheduling delay, and transmit the first downlink data transmission on the second CC during the identified timing of the first downlink data transmission in accordance with the first downlink grant. The communications manager 1815 may be an example of aspects of the communications manager 2110 described herein.

The communications manager 1815, or its sub-components, may be implemented in hardware, code (e.g., software or firmware) executed by a processor, or any combination thereof. If implemented in code executed by a processor, the functions of the communications manager 1815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1815, or its sub-components, may be physically located at various positions, including being distributed such that portions of functions are implemented at different physical locations by one or more physical components. In some examples, the communications manager 1815, or its sub-components, may be a separate and distinct component in accordance with various aspects of the present disclosure. In some examples, the communications manager 1815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1820 may transmit signals generated by other components of the device 1805. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
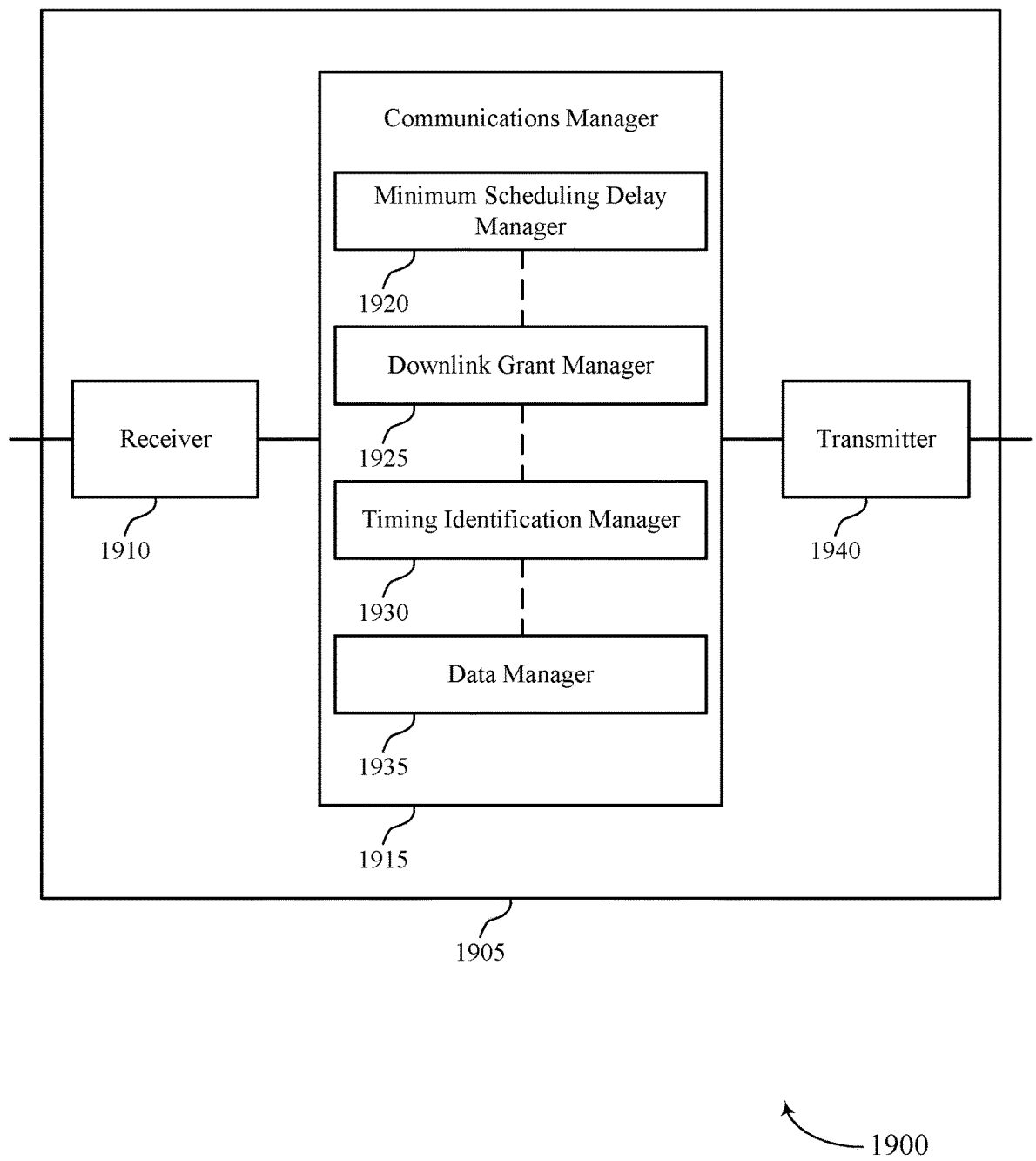

FIG. 19 shows a block diagram 1900 of a device 1905 that supports cross-carrier scheduling enhancements in NR in accordance with aspects of the present disclosure. The device 1905 may be an example of aspects of a device 1805 or a base station 105 as described herein. The device 1905 may include a receiver 1910, a communications manager 1915, and a transmitter 1940. The device 1905 may also include a processor. Each of these components may be in communication with one another (e.g., via one or more buses).

The receiver 1910 may receive information such as packets, user data, or control information associated with various information channels (e.g., control channels, data channels, and information related cross-carrier scheduling enhancements in NR, etc.). Information may be passed on to other components of the device 1905. The receiver 1910 may be an example of aspects of the transceiver 2120 described with reference to FIG. 21. The receiver 1910 may utilize a single antenna or a set of antennas.

The communications manager 1915 may be an example of aspects of the communications manager 1815 as described herein. The communications manager 1915 may include a minimum scheduling delay manager 1920, a downlink grant manager 1925, a timing identification manager 1930, and a data manager 1935. The communications manager 1915 may be an example of aspects of the communications manager 2110 described herein.

The minimum scheduling delay manager 1920 may identify a minimum scheduling delay, when a numerology of a first component carrier is different than a numerology of a second component carrier, wherein the first component carrier and the second component carrier are included in a carrier aggregation configuration of the UE. The downlink grant manager 1925 may transmit, on the first CC, a first downlink grant indicating a first downlink data transmission on the second CC. The timing identification manager 1930 may identify a timing of the first downlink data transmission on the second component carrier based at least in part on the first downlink grant and the minimum scheduling delay.

The data manager 1935 may transmit the first downlink data transmission on the second v during the identified timing of the first downlink data transmission in accordance with the first downlink grant. The transmitter 1940 may transmit signals generated by other components of the device 1905. In some examples, the transmitter 1940 may be collocated with a receiver 1910 in a transceiver module. For example, the transmitter 1940 may be an example of aspects of the transceiver 2120 described with reference to FIG. 21. The transmitter 1940 may utilize a single antenna or a set of antennas.

Figure 20:
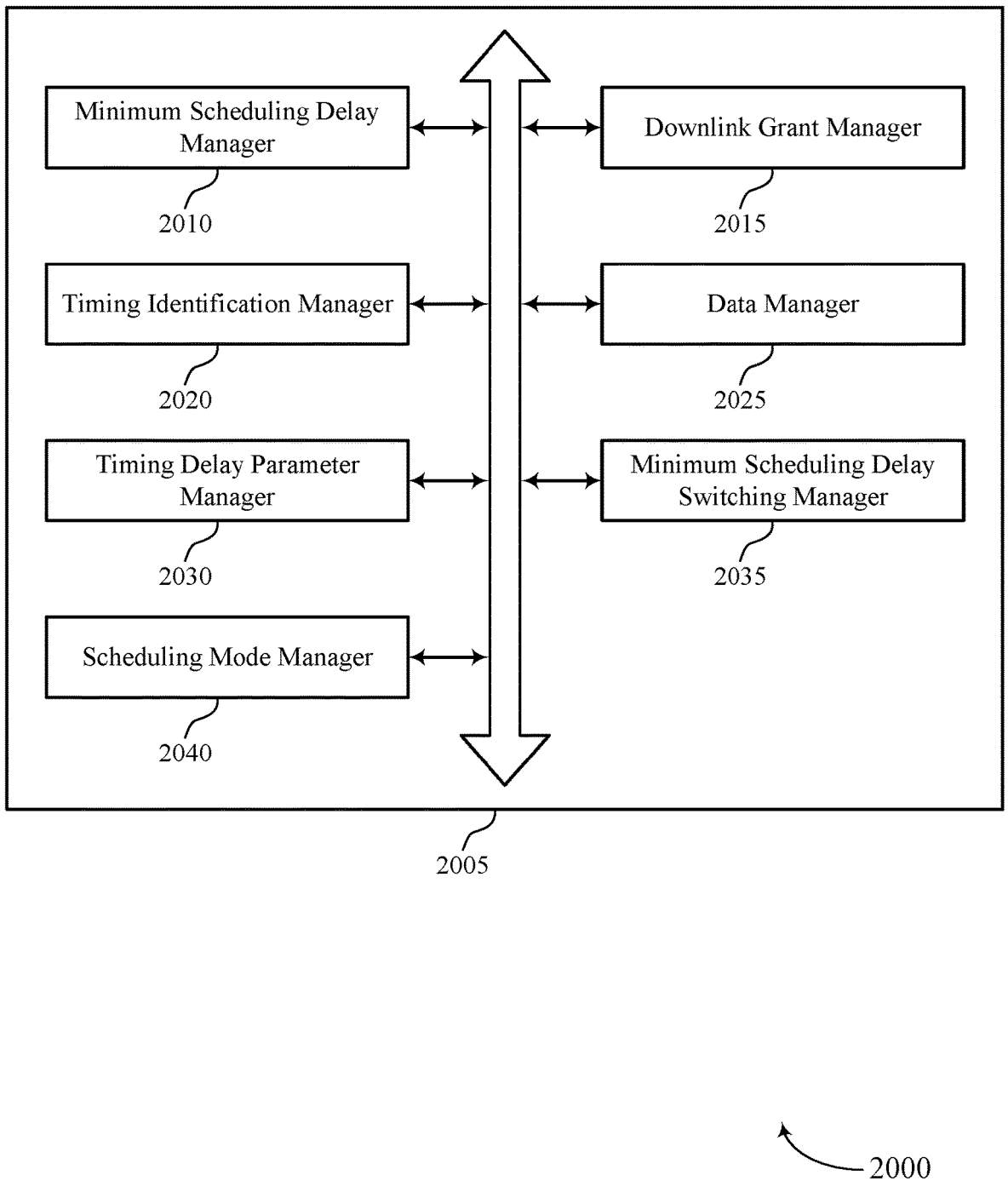
FIG. 20 shows a block diagram of a communications manager that supports cross-carrier scheduling enhancements in NR in accordance with aspects of the present disclosure.

FIG. 20 shows a block diagram 2000 of a communications manager 2005 that supports cross-carrier scheduling enhancements in NR in accordance with aspects of the present disclosure. The communications manager 2005 may be an example of aspects of a communications manager 1815, a communications manager 1915, or a communications manager 2110 described herein. The communications manager 2005 may include a minimum scheduling delay manager 2010, a downlink grant manager 2015, a timing identification manager 2020, a data manager 2025, a timing delay parameter manager 2030, a minimum scheduling delay switching manager 2035, and a scheduling mode manager 2040. Each of these modules may communicate, directly or indirectly, with one another (e.g., via one or more buses).

The minimum scheduling delay manager 2010 may identify a minimum scheduling delay, when a numerology of a first component carrier is different than a numerology of a second component carrier, wherein the first component carrier and the second component carrier are included in a carrier aggregation configuration of the UE. In some examples, the minimum scheduling delay manager 2010 may transmit a configuration message indicating the minimum scheduling delay. In some examples, the minimum scheduling delay manager 2010 may identify a preconfigured value indicating the minimum scheduling delay based, at least in part, on SCS spacing of the first component carrier. In some cases, a number of downlink control symbols of the first CC or a subcarrier spacing of the second CC or other component carriers. In some cases, the minimum scheduling delay is based on a modem reconfiguration latency associated with transitioning a wireless modem from a low power state to a higher power state capable of supporting data reception on the second CC. In some cases, the minimum scheduling delay is specific to the second CC.

The downlink grant manager 2015 may transmit, on the first CC, a first downlink grant indicating a first downlink data transmission on the second CC. In some examples, the downlink grant manager 2015 may transmit a second downlink grant indicating a second downlink data transmission on the second CC and a second timing delay parameter associated with the second downlink data transmission. In some examples, the downlink grant manager 2015 may transmit, on the second CC, a second downlink grant indicating a second downlink data transmission on the second CC, where transmitting the first downlink data transmission on the second CC is based on the first downlink grant, or the second downlink grant, or a combination thereof. In some examples, the downlink grant manager 2015 may include first stage control information in the first downlink grant and second stage control information in the second downlink grant, where transmitting the first downlink data transmission is based on the first stage control information and the second stage control information.

In some examples, the downlink grant manager 2015 may identify the first downlink grant as a dummy grant, where transmitting the first downlink data transmission is based on the second downlink grant. In some examples, the downlink grant manager 2015 may override the first downlink grant, where transmitting the first downlink data transmission is based on the second downlink grant. In some examples, the downlink grant manager 2015 may identify the second downlink grant as redundant. In some examples, the downlink grant manager 2015 may validate the first downlink grant based on the second downlink grant. In some examples, the downlink grant manager 2015 may transmit, on a third CC, a third downlink grant indicating a third downlink data transmission on the second CC, where transmitting the first downlink data transmission on the second CC is based on the first downlink grant, or the second downlink grant, or the third downlink grant, or a combination thereof.

The timing identification manager 2020 may identify a timing of the first downlink data transmission on the second component carrier based on the first downlink grant and the minimum scheduling delay. In some examples, the timing identification manager 2020 may determine that the first timing delay parameter satisfies the minimum scheduling delay. In some examples, the timing identification manager 2020 may identify a slot of the second downlink data transmission as a timing (e.g., an earliest slot or timing) that satisfies the minimum scheduling delay following the second downlink grant. In some examples, the timing identification manager 2020 may identify the slot of the first downlink data transmission is based on the minimum scheduling delay or the first timing delay parameter.

The data manager 2025 may transmit the first downlink data transmission on the second CC during the identified timing of the first downlink data transmission in accordance with the first downlink grant. In some examples, the data manager 2025 may transmit the second downlink data transmission during the identified timing of the second downlink data transmission in accordance with the second downlink grant. In some examples, the triggering condition may include transmitting downlink grants for the second CC subsequent to the first downlink grant on the first CC for a threshold number of consecutive slots, and where the switching includes switching from the cross-carrier scheduling mode to the self-scheduling mode for the second component carrier.

The slot delay parameter manager 2030 may transmit a first timing delay parameter associated with the first downlink data transmission. In some examples, the timing delay parameter manager 2030 may determine that the second timing delay parameter does not satisfy the minimum scheduling delay. In some cases, the timing delay parameter is with reference to a last symbol of a physical downlink control channel carrying the first downlink grant on the first CC. In some cases, the minimum scheduling delay includes a minimum value resulting in the slot of the first downlink data transmission being different from a slot of the first downlink grant.

The minimum scheduling delay switching manager 2035 may switch the minimum scheduling delay from a first value to a second value in response to a triggering condition. In some examples, the minimum scheduling delay switching manager 2035 may transmit the first downlink grant or receiving a wakeup downlink grant. In some cases, the condition includes an expiration of an inactivity timer.

The scheduling mode manager 2040 may identify a triggering condition. In some examples, the scheduling mode manager 2040 may switch between a cross-carrier scheduling mode and a self-scheduling mode based on the triggering condition. In some examples, the triggering condition may include transmitting a threshold number of downlink grants for the second CC subsequent to the first downlink grant on the first CC during timing window including a threshold number of slots, and where the switching includes switching from the cross-carrier scheduling mode to the self-scheduling mode for the second component carrier.

In some examples, the scheduling mode manager 2040 may operate in the cross-carrier scheduling mode based on the switching. In some examples, the scheduling mode manager 2040 may operate in the self-scheduling mode based on the switching. In some examples, the scheduling mode manager 2040 may transmit, in a CIF of a DCI signal, carrier information indicating that the second CC is a scheduling CC for the second CC. In some cases, the triggering condition includes a HARQ signal. In some cases, the triggering condition includes an absence of downlink grants during a threshold number of slots for the second CC which is in the self-scheduling mode, and where the switching includes switching from the self-scheduling mode to the cross-carrier scheduling mode. In some cases, the triggering condition may include a DCI signal, an RRC signal, or a MAC control element (MAC-CE).

Figure 21:
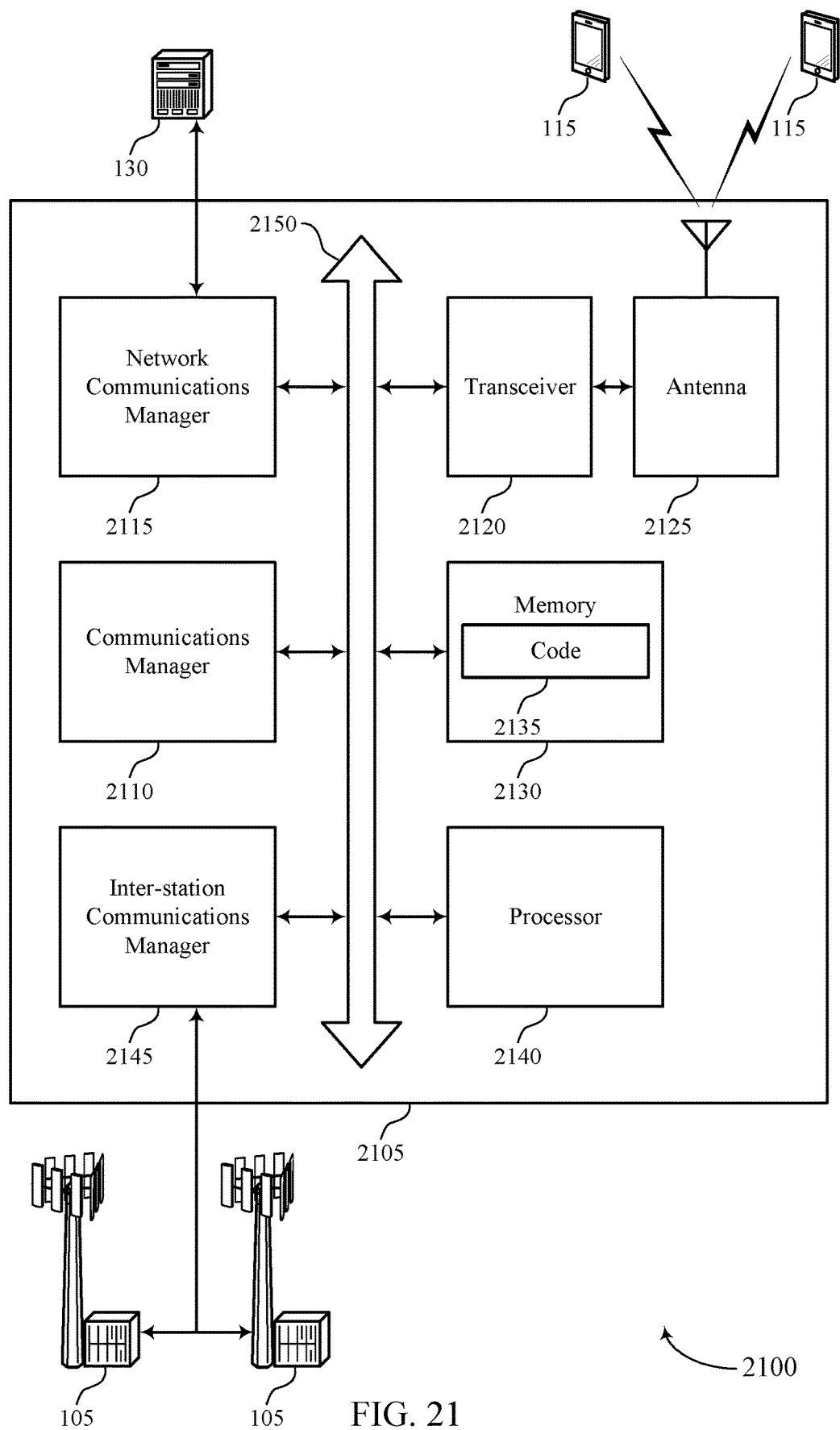
FIG. 21 shows a diagram of a system including a device that supports cross-carrier scheduling enhancements in NR in accordance with aspects of the present disclosure.

FIG. 21 shows a diagram of a system 2100 including a device 2105 that supports cross-carrier scheduling enhancements in NR in accordance with aspects of the present disclosure. The device 2105 may be an example of or include the components of device 1805, device 1905, or a base station 105 as described herein. The device 2105 may include components for bi-directional voice and data communications including components for transmitting and receiving communications, including a communications manager 2110, a network communications manager 2115, a transceiver 2120, an antenna 2125, memory 2130, a processor 2140, and an inter-station communications manager 2145. These components may be in electronic communication via one or more buses (e.g., bus 2150).

The communications manager 2110 may identify a minimum scheduling delay, when a numerology of a first component carrier is different than a numerology of a second component carrier, wherein the first component carrier and the second component carrier are included in a carrier aggregation configuration of the UE, transmit, on the first CC, a first downlink grant indicating a first downlink data transmission on the second CC, identify a timing of the first downlink data transmission on the second component carrier based at least in part on the first downlink grant and the minimum scheduling delay, and transmit the first downlink data transmission on the second CC during the identified timing of the first downlink data transmission in accordance with the first downlink grant.

The network communications manager 2115 may manage communications with the core network (e.g., via one or more wired backhaul links). For example, the network communications manager 2115 may manage the transfer of data communications for client devices, such as one or more UEs 115.

The transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

The memory 2130 may include RAM, ROM, or a combination thereof. The memory 2130 may store computer-readable code 2135 including instructions that, when executed by a processor (e.g., the processor 2140) cause the device to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some cases, a memory controller may be integrated into processor 2140. The processor 2140 may be configured to execute computer-readable instructions stored in a memory (e.g., the memory 2130) to cause the device to perform various functions (e.g., functions or tasks supporting cross-carrier scheduling enhancements in NR).

The inter-station communications manager 2145 may manage communications with other base station 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communication network technology to provide communication between base stations 105.

The code 2135 may include instructions to implement aspects of the present disclosure, including instructions to support wireless communications. The code 2135 may be stored in a non-transitory computer-readable medium such as system memory or other type of memory. In some cases, the code 2135 may not be directly executable by the processor 2140 but may cause a computer (e.g., when compiled and executed) to perform functions described herein.

Figure 22:
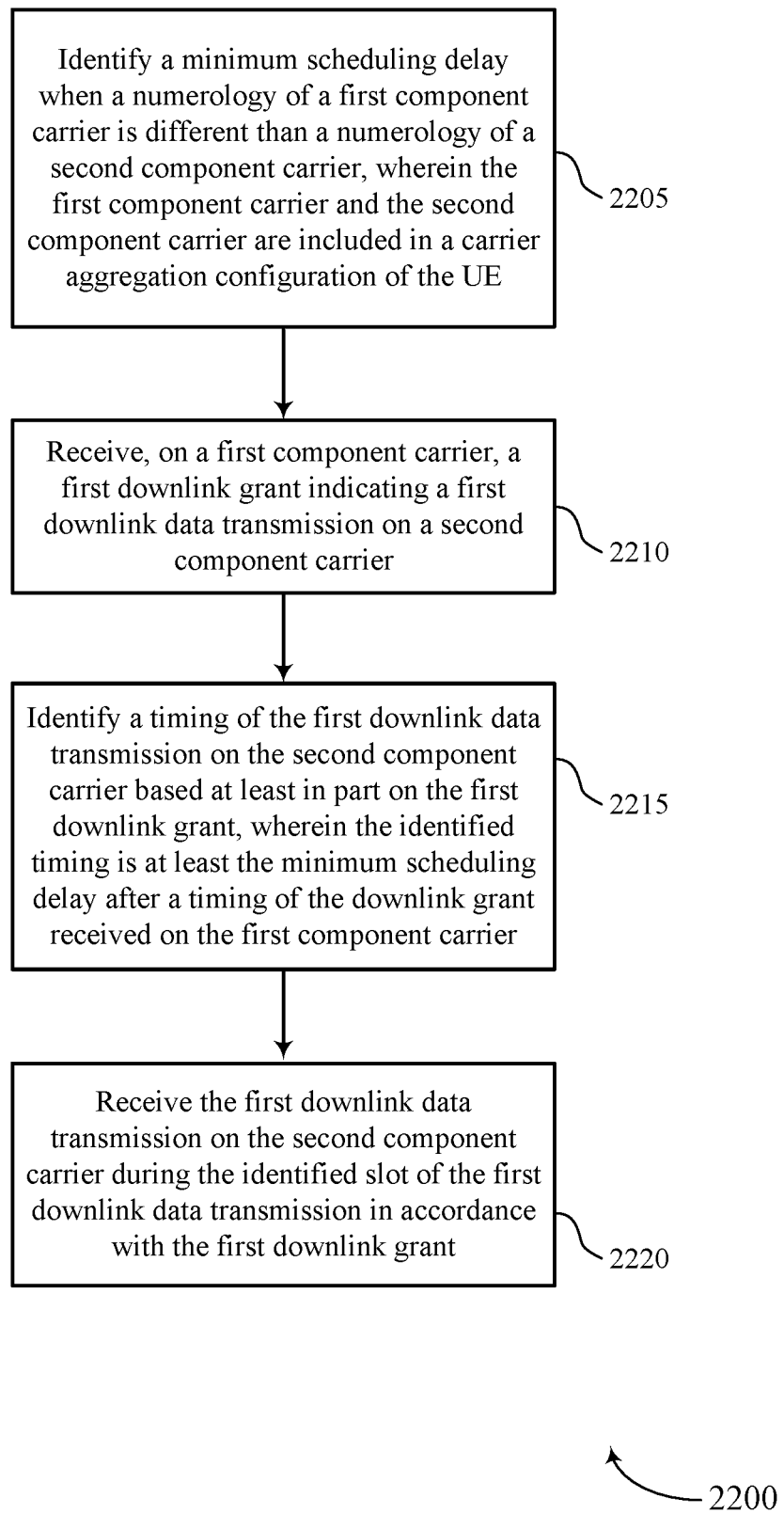
FIGS. 22 through 25 show flowcharts illustrating methods that support cross-carrier scheduling enhancements in NR in accordance with aspects of the present disclosure.

FIG. 22 shows a flowchart illustrating a method 2200 that supports cross-carrier scheduling enhancements in NR in accordance with aspects of the present disclosure. The operations of method 2200 may be implemented by a UE 115 or its components as described herein. For example, the operations of method 2200 may be performed by a communications manager as described with reference to FIGS. 14 through 17. In some examples, a UE may execute a set of instructions to control the functional elements of the UE to perform the functions described below. Additionally, or alternatively, a UE may perform aspects of the functions described below using special-purpose hardware.

At 2205, the UE may identify a minimum scheduling delay when a numerology of a first component carrier is different than a numerology of a second component carrier, wherein the first component carrier and the second component carrier are included in a carrier aggregation configuration of the UE. The operations of 2205 may be performed according to the methods described herein. In some examples, aspects of the operations of 2205 may be performed by a minimum scheduling delay manager as described with reference to FIGS. 14 through 17.

At 2210, the UE may receive, on the first CC, a first downlink grant indicating a first downlink data transmission on the second CC. The operations of 2210 may be performed according to the methods described herein. In some examples, aspects of the operations of 2210 may be performed by a downlink grant manager as described with reference to FIGS. 14 through 17.

At 2215, the UE may identify a timing of the first downlink data transmission on the second component carrier based at least in part on the first downlink grant. For instance, the UE may receive the downlink grant on a PDCCH (e.g., at 2210), and the downlink grant may indicate a timing for the downlink data transmissions. The identified timing may be at least the minimum scheduling delay after a timing of the downlink grant received on the first component carrier. The operations of 2215 may be performed according to the methods described herein. In some examples, aspects of the operations of 2215 may be performed by a timing identification manager as described with reference to FIGS. 14 through 17.

At 2220, the UE may receive the first downlink data transmission on the second CC during the identified timing of the first downlink data transmission in accordance with the first downlink grant. The operations of 2220 may be performed according to the methods described herein. In some examples, aspects of the operations of 2220 may be performed by a data manager as described with reference to FIGS. 14 through 17.

Figure 23:
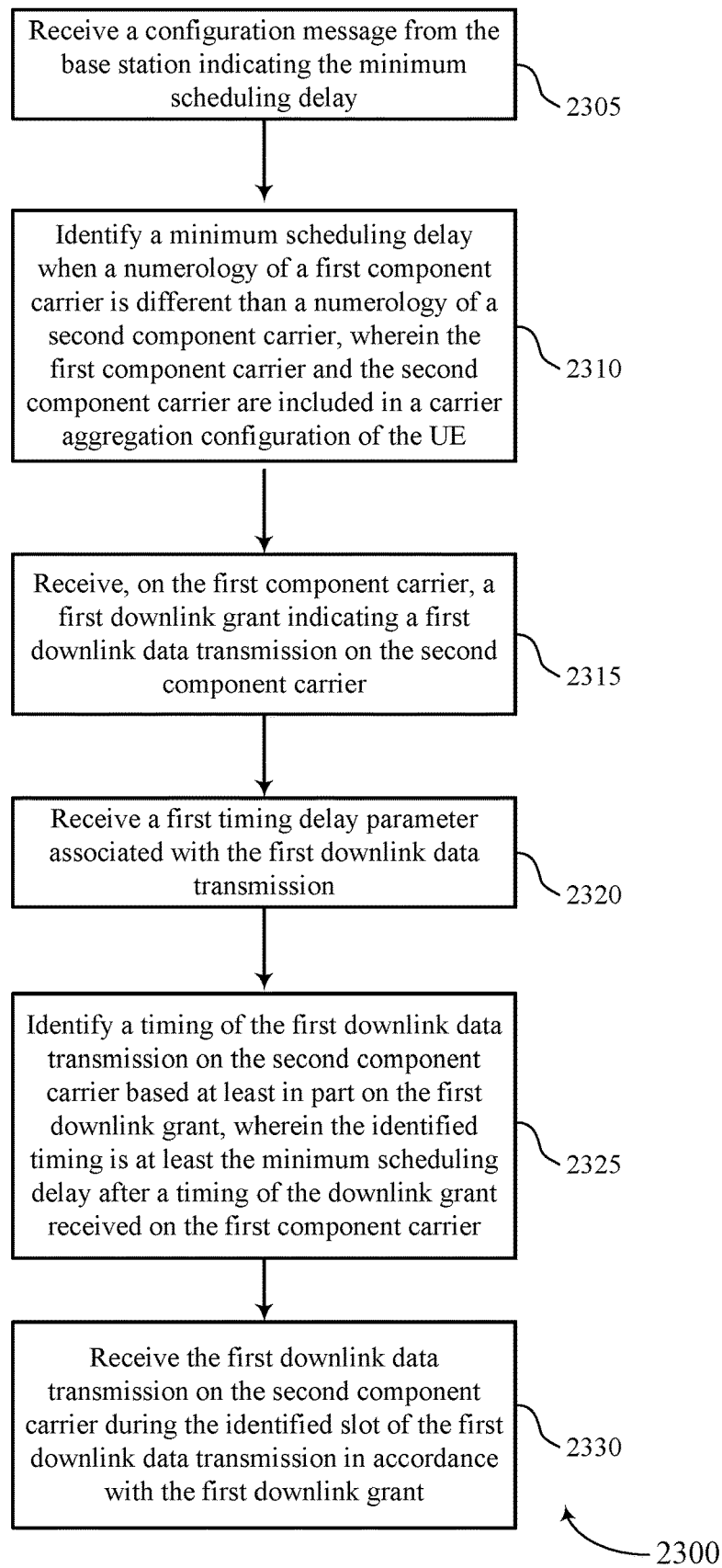

FIG. 23 shows a flowchart illustrating a method 2300 that supports cross-carrier scheduling enhancements in NR in accordance with aspects of the present disclosure. The operations of method 2300 may be implemented by a UE 115 or its components as described herein. For example, the operations of method 2300 may be performed by a communications manager as described with reference to FIGS. 14 through 17. In some examples, a UE may execute a set of instructions to control the functional elements of the UE to perform the functions described below. Additionally, or alternatively, a UE may perform aspects of the functions described below using special-purpose hardware.

At 2305, the UE may receive a configuration message indicating the minimum scheduling delay. The operations of 2305 may be performed according to the methods described herein. In some examples, aspects of the operations of 2305 may be performed by a minimum scheduling delay manager as described with reference to FIGS. 14 through 17.

At 2310, the UE may identify a minimum scheduling delay when a numerology of a first component carrier is different than a numerology of a second component carrier, wherein the first component carrier and the second component carrier are included in a carrier aggregation configuration of the UE. The operations of 2310 may be performed according to the methods described herein. In some examples, aspects of the operations of 2310 may be performed by a minimum scheduling delay manager as described with reference to FIGS. 14 through 17.

At 2315, the UE may receive, on the first CC, a first downlink grant indicating a first downlink data transmission on the second CC. The operations of 2315 may be performed according to the methods described herein. In some examples, aspects of the operations of 2315 may be performed by a downlink grant manager as described with reference to FIGS. 14 through 17.

At 2320, the UE may receive a first timing delay parameter (e.g., K0) associated with the first downlink data transmission. The operations of 2320 may be performed according to the methods described herein. In some examples, aspects of the operations of 2320 may be performed by a timing delay parameter manager as described with reference to FIGS. 14 through 17.

At 2325, the UE may identify a timing (e.g., based at least in part on the first timing delay parameter) of the first downlink data transmission on the second component carrier based at least in part on the first downlink grant, wherein the identified timing is at least the minimum scheduling delay after a timing of the downlink grant received on the first component carrier. The operations of 2325 may be performed according to the methods described herein. In some examples, aspects of the operations of 2325 may be performed by a timing identification manager as described with reference to FIGS. 14 through 17.

At 2330, the UE may receive the first downlink data transmission on the second CC during the identified timing of the first downlink data transmission in accordance with the first downlink grant. The operations of 2330 may be performed according to the methods described herein. In some examples, aspects of the operations of 2330 may be performed by a data manager as described with reference to FIGS. 14 through 17.

Figure 24:
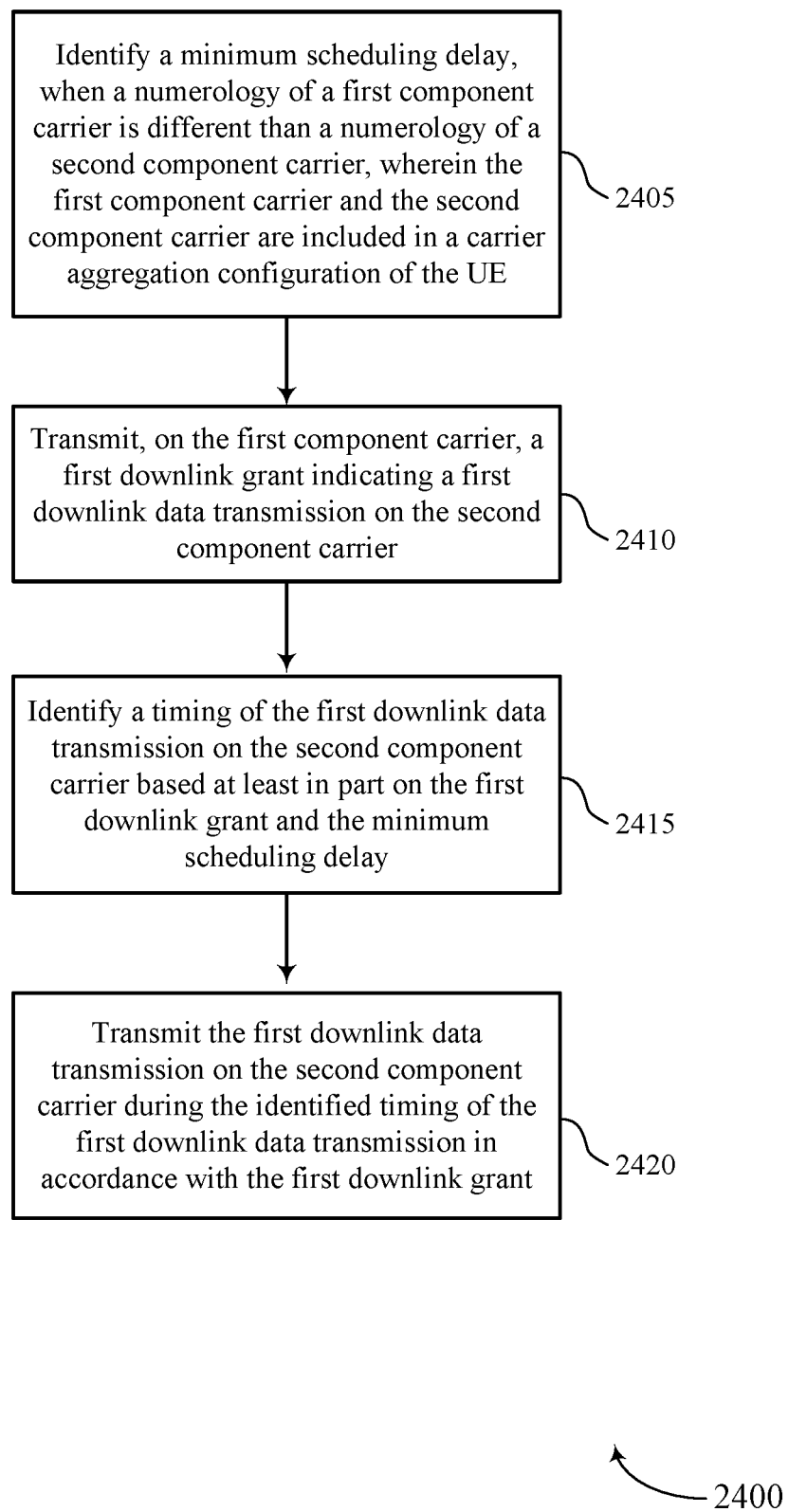

FIG. 24 shows a flowchart illustrating a method 2400 that supports cross-carrier scheduling enhancements in NR in accordance with aspects of the present disclosure. The operations of method 2400 may be implemented by a base station 105 or its components as described herein. For example, the operations of method 2400 may be performed by a communications manager as described with reference to FIGS. 18 through 21. In some examples, a base station may execute a set of instructions to control the functional elements of the base station to perform the functions described below. Additionally, or alternatively, a base station may perform aspects of the functions described below using special-purpose hardware.

At 2405, the base station may identify a minimum scheduling delay, when a numerology of a first component carrier is different than a numerology of a second component carrier, wherein the first component carrier and the second component carrier are included in a carrier aggregation configuration of the UE. The operations of 2405 may be performed according to the methods described herein. In some examples, aspects of the operations of 2405 may be performed by a minimum scheduling delay manager as described with reference to FIGS. 18 through 21.

At 2410, the base station may transmit, on the first CC, a first downlink grant indicating a first downlink data transmission on the second CC. The operations of 2410 may be performed according to the methods described herein. In some examples, aspects of the operations of 2410 may be performed by a downlink grant manager as described with reference to FIGS. 18 through 21.

At 2415, the base station may identify a timing of the first downlink data transmission on the second component carrier based at least in part on the first downlink grant and the minimum scheduling delay. The operations of 2415 may be performed according to the methods described herein. In some examples, aspects of the operations of 2415 may be performed by a timing identification manager as described with reference to FIGS. 18 through 21.

At 2420, the base station may transmit the first downlink data transmission on the second CC during the identified timing of the first downlink data transmission in accordance with the first downlink grant. The operations of 2420 may be performed according to the methods described herein. In some examples, aspects of the operations of 2420 may be performed by a data manager as described with reference to FIGS. 18 through 21.

Figure 25:
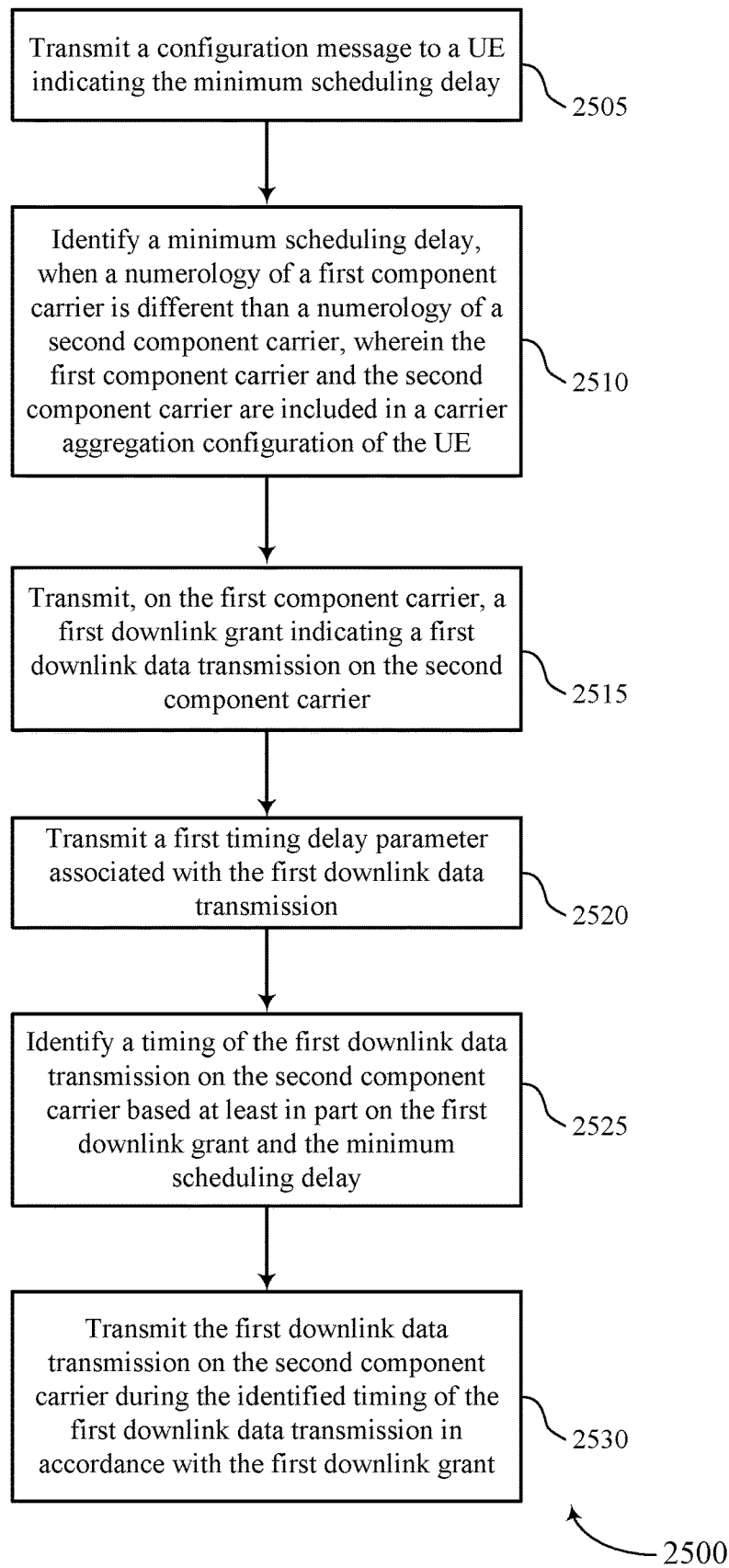

FIG. 25 shows a flowchart illustrating a method 2500 that supports cross-carrier scheduling enhancements in NR in accordance with aspects of the present disclosure. The operations of method 2500 may be implemented by a base station 105 or its components as described herein. For example, the operations of method 2500 may be performed by a communications manager as described with reference to FIGS. 18 through 21. In some examples, a base station may execute a set of instructions to control the functional elements of the base station to perform the functions described below. Additionally, or alternatively, a base station may perform aspects of the functions described below using special-purpose hardware.

At 2505, the base station may transmit a configuration message to a UE indicating the minimum scheduling delay. The operations of 2505 may be performed according to the methods described herein. In some examples, aspects of the operations of 2505 may be performed by a minimum scheduling delay manager as described with reference to FIGS. 18 through 21.

At 2510, the base station may identify a minimum scheduling delay, when a numerology of a first component carrier is different than a numerology of a second component carrier, wherein the first component carrier and the second component carrier are included in a carrier aggregation configuration of the UE. The operations of 2510 may be performed according to the methods described herein. In some examples, aspects of the operations of 2510 may be performed by a minimum scheduling delay manager as described with reference to FIGS. 18 through 21.

At 2515, the base station may transmit, on the first CC, a first downlink grant indicating a first downlink data transmission on the second CC. The operations of 2515 may be performed according to the methods described herein. In some examples, aspects of the operations of 2515 may be performed by a downlink grant manager as described with reference to FIGS. 18 through 21.

At 2520, the base station may transmit a first timing delay parameter associated with the first downlink data transmission. The operations of 2520 may be performed according to the methods described herein. In some examples, aspects of the operations of 2520 may be performed by a timing delay parameter manager as described with reference to FIGS. 18 through 21.

At 2525, the base station may identify a timing of the first downlink data transmission on the second component carrier based at least in part on the first downlink grant and the minimum scheduling delay. The operations of 2525 may be performed according to the methods described herein. In some examples, aspects of the operations of 2525 may be performed by a timing identification manager as described with reference to FIGS. 18 through 21.

At 2530, the base station may transmit the first downlink data transmission on the second CC during the identified timing of the first downlink data transmission in accordance with the first downlink grant. The operations of 2530 may be performed according to the methods described herein. In some examples, aspects of the operations of 2530 may be performed by a data manager as described with reference to FIGS. 18 through 21.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous embodiments or aspects described herein. Thus, example 1 is a method for wireless communications at a UE that includes: identifying a minimum scheduling delay when a numerology of a first component carrier is different than a numerology of a second component carrier, where the first component carrier and the second component carrier are included in a carrier aggregation configuration of the UE; receiving, on the first component carrier, a first downlink grant indicating a first downlink data transmission on the second component carrier; identifying a timing of the first downlink data transmission on the second component carrier based on the first downlink grant, where the identified timing is at least the minimum scheduling delay after a timing of the downlink grant received on the first component carrier; and receiving the first downlink data transmission on the second component carrier during the identified timing of the first downlink data transmission in accordance with the first downlink grant.

In example 2, identifying the minimum scheduling delay in the method of example 1 may include receiving a configuration message from the base station indicating the minimum scheduling delay.

In example 3, identifying the minimum scheduling delay in the method of examples 1-2 may include identifying a preconfigured value indicating the minimum scheduling delay based, at least in part, on subcarrier spacing (SCS) of the first component carrier.

In example 4, the method of examples 1-3, may include determining that the first timing delay parameter satisfies the minimum scheduling delay.

In example 5, the method of examples 1-4 may include receiving, on the first component carrier, a second downlink grant indicating a second downlink data transmission on the second component carrier and a second timing delay parameter associated with the second downlink data transmission; and determining that the second timing delay parameter does not satisfy the minimum scheduling delay.

In example 6, the method of examples 1-5 may include identifying the timing of the first downlink data transmission based on the minimum scheduling delay or the first timing delay parameter.

In some aspects of examples 1-6, the first timing delay parameter may be with reference to a last symbol of a physical downlink control channel carrying the first downlink grant on the first component carrier.

In example 7 of the method of examples 1-6, may include receiving, on the first component carrier, a second downlink grant indicating a second downlink data transmission on the second component carrier and a second timing delay parameter associated with the second downlink data transmission; determining that the second timing delay parameter does not satisfy the minimum scheduling delay; and ignoring at least a portion of the second downlink grant based on the determining.

In example 8, the method of examples 1-7 may include buffering, based on the minimum scheduling delay, the first downlink data transmission on the second component carrier.

In some aspects of examples 1-8, the first downlink grant includes a first timing delay parameter associated with the first downlink data transmission.

In some aspects of examples 1-8, the minimum scheduling delay is based at least in part on one or more of a number of downlink control symbols of the first component carrier or a subcarrier spacing of the second component carrier.

In some aspects of examples 1-8, the minimum scheduling delay may be based on a modem reconfiguration latency associated with transitioning a wireless modem from a low power state to a higher power state capable of supporting data reception on the second component carrier.

In some aspects of examples 1-8, the minimum scheduling delay may be specific to the second component carrier, and where the minimum scheduling delay may be determined from a table using a subcarrier spacing (SCS) of the first component carrier and an SCS of the second component carrier.

Example 9 is a method for wireless communication at a base station, comprising: identifying a minimum scheduling delay when a numerology of a first component carrier is different than a numerology of a second component carrier, where the first component carrier and the second component carrier are included in a carrier aggregation configuration of the UE; transmitting, on the first component carrier, a first downlink grant indicating a first downlink data transmission on the second component carrier, where the first component carrier and the second component carrier are included in a carrier aggregation configuration [of the UE] [for the base station]; identifying a timing of the first downlink data transmission on the second component carrier based on the first downlink grant, where the identified timing is at least the minimum scheduling delay after a timing of the downlink grant transmitted on the first component carrier; and transmitting the first downlink data transmission on the second component carrier during the identified timing of the first downlink data transmission in accordance with the first downlink grant.

In example 10, the method of example 9 may include transmitting a configuration message to a UE indicating the minimum scheduling delay.

In example 11, the method of examples 9-10 may include determining that the first timing delay parameter satisfies the minimum scheduling delay.

In example 12, the method of examples 9-11 may include identifying the timing of the first downlink data transmission may be based on the minimum scheduling delay or the first timing delay parameter.

In example 13, the method of examples 9-12 may include transmitting, on the first component carrier, a second downlink grant indicating a second downlink data transmission on the second component carrier and a second timing delay parameter associated with the second downlink data transmission; determining that the second timing delay parameter does not satisfy the minimum scheduling delay; identifying a timing of the second downlink data transmission as a timing (e.g., an earliest timing) that satisfies the minimum scheduling delay following the second downlink grant; and transmitting the second downlink data transmission during the identified timing of the second downlink data transmission in accordance with the second downlink grant.

In example 14, the method of examples 9-13 may include identifying the minimum scheduling delay based at least in part on one or more of a number of downlink control symbols of the first component carrier or a subcarrier spacing of the second component carrier.

In some aspects of examples 9-13, the minimum scheduling delay may be based on a modem reconfiguration latency associated with transitioning a wireless modem from a low power state to a higher power state capable of supporting data reception on the second component carrier.

In some aspects of examples 9-13, the minimum scheduling delay may be specific to the second component carrier, and where the minimum scheduling delay may be determined from a table using a subcarrier spacing (SCS) of the first component carrier and an SCS of the second component carrier.

In some aspects of examples 9-13, the numerology of the first component carrier includes a first subcarrier spacing, and the numerology of the second component carrier includes a second subcarrier spacing that may be less than the subcarrier spacing of the first subcarrier spacing.

In some aspects of examples 9-13, the first downlink grant may include a first timing delay parameter associated with the first downlink data transmission.

In some aspects of examples 9-13, the first timing delay parameter may be with reference to a last symbol of a physical downlink control channel carrying the first downlink grant on the first component carrier.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a user equipment (UE), comprising:
   a processor;
   memory coupled with the processor; and
   instructions stored in the memory and executable by the processor to cause the apparatus to:
      apply a minimum scheduling delay when a subcarrier spacing (SCS) of a first component carrier is different than a subcarrier spacing (SCS) of a second component carrier;
      receive, on the first component carrier, a first downlink control information (DCI) scheduling a first downlink data transmission on the second component carrier, the first DCI comprising a first slot offset associated with the first downlink data transmission;
      identify a timing of the first downlink data transmission on the second component carrier based at least in part on the first DCI, wherein the identified timing is at least the minimum scheduling delay after a timing of the first DCI received on the first component carrier; and
      receive the first downlink data transmission on the second component carrier during the identified timing of the first downlink data transmission in accordance with the first DCI.

2. The apparatus of claim 1, wherein the instructions to apply the minimum scheduling delay are executable by the processor to cause the apparatus to:
   receive a configuration message from a base station indicating the minimum scheduling delay.

3. The apparatus of claim 1, wherein the instructions to apply the minimum scheduling delay are executable by the processor to cause the apparatus to:
   identify a number of physical downlink shared channel symbols indicating the minimum scheduling delay based, at least in part, on the SCS of the first component carrier.

4. The apparatus of claim 3, wherein the instructions are further executable by the processor to cause the apparatus to:
   buffer, based at least in part on the minimum scheduling delay, the first downlink data transmission on the second component carrier.

5. The apparatus of claim 1, wherein the first component carrier and the second component carrier are included in a carrier aggregation configuration of the UE.

6. The apparatus of claim 1, wherein the instructions are further executable by the processor to cause the apparatus to:
   receive, on the first component carrier, a second DCI indicating a second downlink data transmission on the second component carrier and a second slot offset associated with the second downlink data transmission; and
   determine that the second slot offset does not satisfy the minimum scheduling delay.

7. The apparatus of claim 1, wherein identifying the timing of the first downlink data transmission is based at least in part on the minimum scheduling delay or the first slot offset.

8. The apparatus of claim 1, wherein the first slot offset is with reference to a last symbol of a physical downlink control channel carrying the first DCI on the first component carrier.

9. The apparatus of claim 1, wherein the instructions to identify the timing of the first downlink data transmission are executable by the processor to cause the apparatus to:
   determine that the first slot offset satisfies the minimum scheduling delay.

10. The apparatus of claim 1, wherein the instructions are further executable by the processor to cause the apparatus to:
    receive, on the first component carrier, a second DCI indicating a second downlink data transmission on the second component carrier and a second slot offset associated with the second downlink data transmission;
    determine that the second slot offset does not satisfy the minimum scheduling delay; and
    ignore at least a portion of the second DCI based at least in part on the determining.

11. The apparatus of claim 1, wherein applying the minimum scheduling delay is based at least in part on a number of downlink control symbols of the first component carrier or the SCS of the second component carrier.

12. The apparatus of claim 1, wherein the minimum scheduling delay is based at least in part on a modem reconfiguration latency associated with transitioning a wireless modem from a low power state to a higher power state capable of supporting data reception on the second component carrier.

13. The apparatus of claim 1, wherein:
the minimum scheduling delay is specific to the second component carrier, and
the minimum scheduling delay is determined from a table using the SCS of the first component carrier and the SCS of the second component carrier.

14. An apparatus for wireless communications by a base station, comprising:
a processor;
memory coupled with the processor; and
instructions stored in the memory and executable by the processor to cause the apparatus to:
apply a minimum scheduling delay when a subcarrier spacing (SCS) of a first component carrier is different than an SCS of a second component carrier;
transmit, on the first component carrier, a first downlink control information (DCI) scheduling a first downlink data transmission on the second component carrier, the first DCI comprising a first slot offset associated with the first downlink data transmission;
identify a timing of the first downlink data transmission on the second component carrier based at least in part on the first DCI, wherein the identified timing is at least the minimum scheduling delay after a timing of the first DCI transmitted on the first component carrier; and
transmit the first downlink data transmission on the second component carrier during the identified timing of the first downlink data transmission in accordance with the first DCI.

15. The apparatus of claim 14, wherein the instructions are further executable by the processor to cause the apparatus to:
transmit a configuration message to a user equipment (UE) indicating the minimum scheduling delay.

16. The apparatus of claim 14, wherein the first component carrier and the second component carrier are included in a carrier aggregation configuration of a user equipment (UE) for communicating with the base station.

17. The apparatus of claim 14, wherein the instructions to identify the timing of the first downlink data transmission are executable by the processor to cause the apparatus to:
determine that the first slot offset satisfies the minimum scheduling delay.

18. The apparatus of claim 14, wherein the instructions are further executable by the processor to cause the apparatus to:
transmit, on the first component carrier, a second DCI indicating a second downlink data transmission on the second component carrier and a second slot offset associated with the second downlink data transmission;
determine that the second slot offset does not satisfy the minimum scheduling delay;
identify a timing of the second downlink data transmission as a timing that satisfies the minimum scheduling delay following the second DCI; and
transmit the second downlink data transmission during the identified timing of the second downlink data transmission in accordance with the second DCI.

19. The apparatus of claim 14, wherein the timing of the first downlink data transmission is based at least in part on the minimum scheduling delay or the first slot offset.

20. The apparatus of claim 14, wherein the first slot offset is with reference to a last symbol of a physical downlink control channel carrying the first DCI on the first component carrier.

21. The apparatus of claim 14, wherein identifying the minimum scheduling delay is based at least in part on a number of downlink control symbols of the first component carrier or the SCS of the second component carrier.

22. The apparatus of claim 14, wherein the minimum scheduling delay is based at least in part on a modem reconfiguration latency associated with transitioning a wireless modem from a low power state to a higher power state capable of supporting data reception on the second component carrier.

23. The apparatus of claim 14, wherein:
the minimum scheduling delay is specific to the second component carrier, and
the minimum scheduling delay is determined from a table using the SCS of the first component carrier and the SCS of the second component carrier.

24. The apparatus of claim 14, wherein the SCS of the second component carrier is less than the SCS of the first component carrier.

25. A method of wireless communications by a user equipment (UE), comprising:
applying a minimum scheduling delay when a subcarrier spacing (SCS) of a first component carrier is different than an SCS of a second component carrier;
receiving, on the first component carrier, a first downlink control information (DCI) scheduling a first downlink data transmission on the second component carrier, the first DCI comprising a first slot offset associated with the first downlink data transmission;
identifying a timing of the first downlink data transmission on the second component carrier based at least in part on the first DCI, wherein the identified timing is at least the minimum scheduling delay after a timing of the first DCI received on the first component carrier; and
receiving the first downlink data transmission on the second component carrier during the identified timing of the first downlink data transmission in accordance with the first DCI.

26. The method of claim 25, further comprising:
receiving, on the first component carrier, a second DCI indicating a second downlink data transmission on the second component carrier and a second slot offset associated with the second downlink data transmission; and
determining that the second slot offset does not satisfy the minimum scheduling delay.

27. The method of claim 25, wherein the first slot offset is with reference to a last symbol of a physical downlink control channel carrying the first downlink control information on the first component carrier.

28. A method of wireless communications at an apparatus of a base station, comprising:
applying a minimum scheduling delay when a subcarrier spacing (SCS) of a first component carrier is different than a SCS of a second component carrier;
transmitting, on the first component carrier, a first downlink control information (DCI) scheduling a first downlink data transmission on the second component carrier, the first DCI comprising a first slot offset associated with the first downlink data transmission;

identifying a timing of the first downlink data transmission on the second component carrier based at least in part on the first DCI, wherein the identified timing is at least the minimum scheduling delay after a timing of the first DCI transmitted on the first component carrier; and transmitting the first downlink data transmission on the second component carrier during the identified timing of the first downlink data transmission in accordance with the first DCI.

29. The method of claim 28, further comprising:

transmitting, on the first component carrier, a second DCI indicating a second downlink data transmission on the second component carrier and a second slot offset associated with the second downlink data transmission;

determining that the second slot offset does not satisfy the minimum scheduling delay;

identifying a timing of the second downlink data transmission as a timing that satisfies the minimum scheduling delay following the second DCI; and transmitting the second downlink data transmission during the identified timing of the second downlink data transmission in accordance with the second DCI.

30. The method of claim 28, wherein:

the minimum scheduling delay is specific to the second component carrier, and the minimum scheduling delay is determined from a table using the SCS of the first component carrier and the SCS of the second component carrier.

* * * * *